(12) United States Patent
Moon et al.

(10) Patent No.: US 7,619,819 B2
(45) Date of Patent: Nov. 17, 2009

(54) METHOD AND APPARATUS FOR DRUG PRODUCT TRACKING USING ENCODED OPTICAL IDENTIFICATION ELEMENTS

(75) Inventors: John A. Moon, Wallingford, CT (US); Martin A. Putnam, Cheshire, CT (US); Alan Kersey, South Glastonbury, CT (US); David Fournier, Northborough, MA (US); Joseph Pinto, Wallingford, CT (US)

(73) Assignee: Illumina, Inc., San Diego, CA (US)

( * ) Notice: Subject to any disclaimer, the term of this patent is extended or adjusted under 35 U.S.C. 154(b) by 134 days.

(21) Appl. No.: 11/187,262

(22) Filed: Jul. 21, 2005

(65) Prior Publication Data

US 2006/0028727 A1    Feb. 9, 2006

Related U.S. Application Data

(63) Continuation-in-part of application No. 10/661,082, filed on Sep. 12, 2003, now Pat. No. 7,126,755, which is a continuation-in-part of application No. 10/645,689, filed on Aug. 20, 2003, now abandoned.

(60) Provisional application No. 60/589,644, filed on Jul. 21, 2004, provisional application No. 60/609,712, filed on Sep. 13, 2004, provisional application No. 60/623,811, filed on Oct. 29, 2004, provisional application No. 60/405,087, filed on Aug. 20, 2002, provisional application No. 60/410,541, filed on Sep. 12, 2002.

(51) Int. Cl.
*G02B 5/18* (2006.01)

(52) U.S. Cl. .......................... 359/569; 359/2; 250/566; 424/467

(58) Field of Classification Search ....................... None
See application file for complete search history.

(56) References Cited

U.S. PATENT DOCUMENTS 3,614,193 A    10/1971    Beiser (Continued)

FOREIGN PATENT DOCUMENTS

CH    598661 A    5/1978

(Continued)

OTHER PUBLICATIONS

Jain KK, Nanodiagnostics: application of nanotechnology in molecular diagnostics, Expert Review of Molecular Diagnostics 3(2):153-161 (2003), XP008038849.

(Continued)

*Primary Examiner*—Arnel C Lavarias
(74) *Attorney, Agent, or Firm*—Small Patent Law Group; Dean D. Small; Jason P. Gross

(57) ABSTRACT

A method and apparatus for drug product tracking (or other pharmaceutical, health care or cosmetics products, and/or the packages or containers they are supplied with) using diffraction grating-based encoded optical identification elements includes an optical substrate having at least one diffraction grating disposed therein. The encoded element may be used to label any desired item, such as drugs or medicines, or other pharmaceutical or health care products or cosmetics. The label may be used for many different purposes, such as for sorting, tracking, identification, verification, authentication, anti-theft/anti-counterfeit, security/anti-terrorism, or for other purposes.

34 Claims, 32 Drawing Sheets

U.S. PATENT DOCUMENTS

| | | |
|---|---|---|
| 3,858,979 A | 1/1975 | Elbe |
| 3,880,497 A | 4/1975 | Bryngdahl |
| 3,891,302 A | 6/1975 | Dabby et al. |
| 3,903,415 A | 9/1975 | Holzapfel |
| 3,916,182 A | 10/1975 | Dabby et al. |
| 3,968,476 A | 7/1976 | McMahon |
| 4,011,435 A | 3/1977 | Phelps |
| 4,023,010 A | 5/1977 | Horst et al. |
| 4,053,228 A | 10/1977 | Schiller |
| 4,053,433 A | 10/1977 | Lee |
| 4,131,337 A | 12/1978 | Moraw et al. |
| 4,168,146 A | 9/1979 | Grubb et al. |
| 4,301,139 A | 11/1981 | Feingers et al. |
| 4,386,274 A | 5/1983 | Altshuler |
| 4,400,616 A | 8/1983 | Chevillat et al. |
| 4,445,229 A | 4/1984 | Tasto et al. |
| 4,447,546 A | 5/1984 | Hirschfeld |
| 4,537,504 A | 8/1985 | Baltes et al. |
| 4,560,881 A | 12/1985 | Briggs |
| 4,562,157 A | 12/1985 | Lowe et al. |
| 4,647,544 A | 3/1987 | Nicoli et al. |
| 4,678,752 A | 7/1987 | Thorne et al. |
| 4,685,480 A | 8/1987 | Eck |
| 4,688,240 A | 8/1987 | Hosemann |
| 4,690,907 A | 9/1987 | Hibino et al. |
| 4,701,754 A | 10/1987 | Provonchee |
| 4,716,121 A | 12/1987 | Block et al. |
| 4,725,110 A | 2/1988 | Glenn et al. |
| 4,740,468 A | 4/1988 | Weng et al. |
| 4,740,688 A | 4/1988 | Edwards |
| 4,748,110 A | 5/1988 | Paul |
| 4,762,420 A | 8/1988 | Bowley |
| 4,767,719 A | 8/1988 | Finlan |
| 4,770,295 A | 9/1988 | Carveth et al. |
| 4,807,950 A | 2/1989 | Glenn et al. |
| 4,815,027 A | 3/1989 | Tokumitsu |
| 4,816,659 A | 3/1989 | Bianco et al. |
| 4,822,746 A | 4/1989 | Walt |
| 4,841,140 A | 6/1989 | Sullivan et al. |
| 4,877,747 A | 10/1989 | Stewart |
| 4,880,752 A | 11/1989 | Keck et al. |
| 4,882,288 A | 11/1989 | North et al. |
| 4,921,805 A | 5/1990 | Gebeyehu et al. |
| 4,931,384 A | 6/1990 | Layton et al. |
| 4,937,048 A | 6/1990 | Sakai et al. |
| 4,958,376 A | 9/1990 | Leib |
| 4,992,385 A | 2/1991 | Godfrey |
| 5,002,867 A | 3/1991 | Macevicz |
| 5,003,600 A | 3/1991 | Deason et al. |
| RE33,581 E | 4/1991 | Nicoli et al. |
| 5,028,545 A | 7/1991 | Soini |
| 5,030,558 A | 7/1991 | Litman et al. |
| 5,033,826 A | 7/1991 | Kolner |
| 5,065,008 A | 11/1991 | Hakamata et al. |
| 5,067,155 A | 11/1991 | Bianco et al. |
| 5,081,012 A | 1/1992 | Flanagan et al. |
| 5,089,387 A | 2/1992 | Tsay et al. |
| 5,090,807 A | 2/1992 | Tai |
| 5,091,636 A | 2/1992 | Takada et al. |
| 5,095,194 A | 3/1992 | Barbanell |
| 5,100,238 A | 3/1992 | Nailor et al. |
| 5,104,209 A | 4/1992 | Hill et al. |
| 5,105,305 A | 4/1992 | Betzig et al. |
| 5,114,864 A | 5/1992 | Walt |
| 5,115,121 A | 5/1992 | Bianco et al. |
| 5,118,608 A | 6/1992 | Layton et al. |
| 5,129,974 A | 7/1992 | Aurenius |
| 5,138,468 A | 8/1992 | Barbanell |
| 5,141,848 A | 8/1992 | Donovan et al. |
| 5,143,853 A | 9/1992 | Walt |
| 5,144,461 A | 9/1992 | Horan |
| 5,160,701 A | 11/1992 | Brown, III et al. |
| 5,166,813 A | 11/1992 | Metz |
| 5,192,980 A | 3/1993 | Dixon et al. |
| 5,196,350 A | 3/1993 | Backman et al. |
| 5,200,794 A | 4/1993 | Nishiguma et al. |
| 5,218,594 A | 6/1993 | Tanno |
| 5,239,178 A | 8/1993 | Derndinger et al. |
| 5,244,636 A | 9/1993 | Walt et al. |
| 5,283,777 A | 2/1994 | Tanno et al. |
| 5,291,006 A | 3/1994 | Nishiguma et al. |
| 5,291,027 A | 3/1994 | Kita et al. |
| 5,300,764 A | 4/1994 | Hoshino et al. |
| 5,307,332 A | 4/1994 | Tinet |
| 5,310,686 A | 5/1994 | Sawyers et al. |
| 5,329,352 A | 7/1994 | Jacobsen |
| 5,342,790 A | 8/1994 | Levine et al. |
| 5,349,442 A | 9/1994 | Deason et al. |
| 5,352,582 A | 10/1994 | Lichtenwalter et al. |
| 5,364,797 A | 11/1994 | Olson et al. |
| 5,367,588 A | 11/1994 | Hill et al. |
| 5,372,783 A | 12/1994 | Lackie |
| 5,374,816 A | 12/1994 | Bianco |
| 5,374,818 A | 12/1994 | Bianco et al. |
| 5,388,173 A | 2/1995 | Glenn |
| 5,394,234 A | 2/1995 | Bianco et al. |
| 5,395,558 A | 3/1995 | Tsai |
| 5,426,297 A | 6/1995 | Dunphy et al. |
| 5,432,329 A | 7/1995 | O'Boyle et al. |
| 5,442,433 A | 8/1995 | Hoshino et al. |
| 5,448,659 A | 9/1995 | Tsutsui et al. |
| 5,451,528 A | 9/1995 | Raymoure et al. |
| 5,455,178 A | 10/1995 | Fattinger |
| 5,461,475 A | 10/1995 | Lerner et al. |
| 5,465,176 A | 11/1995 | Bianco et al. |
| 5,468,649 A | 11/1995 | Shah et al. |
| 5,506,674 A | 4/1996 | Inoue et al. |
| 5,514,785 A | 5/1996 | Van Ness et al. |
| 5,528,045 A | 6/1996 | Hoffman et al. |
| 5,547,849 A | 8/1996 | Baer et al. |
| 5,559,613 A | 9/1996 | Deveaud-Pledran et al. |
| 5,585,639 A | 12/1996 | Dorsel et al. |
| 5,587,832 A | 12/1996 | Krause |
| 5,607,188 A | 3/1997 | Bahns et al. |
| 5,610,287 A | 3/1997 | Nikiforov |
| 5,620,853 A | 4/1997 | Smethers et al. |
| 5,621,515 A | 4/1997 | Hoshino |
| 5,624,850 A | 4/1997 | Kumar et al. |
| 5,625,472 A | 4/1997 | Mizrahi et al. |
| 5,627,040 A | 5/1997 | Bierre et al. |
| 5,627,663 A | 5/1997 | Horan et al. |
| 5,633,724 A | 5/1997 | King et al. |
| 5,633,790 A | 5/1997 | Gritter et al. |
| 5,633,975 A | 5/1997 | Gary et al. |
| 5,667,976 A | 9/1997 | Van Ness et al. |
| 5,671,308 A | 9/1997 | Inoue et al. |
| 5,682,244 A | 10/1997 | Barlow et al. |
| 5,712,912 A | 1/1998 | Tomko et al. |
| 5,721,435 A | 2/1998 | Troll |
| 5,729,365 A | 3/1998 | Sweatt |
| 5,736,330 A | 4/1998 | Fulton |
| 5,742,432 A | 4/1998 | Bianco |
| 5,745,615 A | 4/1998 | Atkins et al. |
| 5,745,617 A | 4/1998 | Starodubov et al. |
| 5,759,778 A | 6/1998 | Li et al. |
| 5,760,961 A | 6/1998 | Tompkin et al. |
| 5,766,956 A | 6/1998 | Groger et al. |
| 5,771,251 A | 6/1998 | Kringlebotn et al. |
| 5,776,694 A | 7/1998 | Sheiness et al. |
| 5,793,502 A | 8/1998 | Bianco et al. |
| 5,798,273 A | 8/1998 | Shuler et al. |
| 5,799,231 A | 8/1998 | Gates et al. |
| 5,801,857 A | 9/1998 | Heckenkamp et al. |
| 5,804,384 A | 9/1998 | Muller et al. |

| Patent | Type | Date | Inventor |
|---|---|---|---|
| 5,812,272 | A | 9/1998 | King et al. |
| 5,824,472 | A | 10/1998 | Betlach et al. |
| 5,824,478 | A | 10/1998 | Muller |
| 5,824,557 | A | 10/1998 | Burke et al. |
| 5,830,622 | A | 11/1998 | Canning et al. |
| 5,831,698 | A | 11/1998 | Depp et al. |
| 5,837,475 | A | 11/1998 | Dorsal et al. |
| 5,837,552 | A | 11/1998 | Cotton |
| 5,841,555 | A | 11/1998 | Bianco et al. |
| 5,846,737 | A | 12/1998 | Kang |
| 5,874,187 | A | 2/1999 | Colvin et al. |
| 5,881,197 | A | 3/1999 | Dong et al. |
| 5,895,750 | A | 4/1999 | Mushahwar et al. |
| 5,922,550 | A | 7/1999 | Everhart et al. |
| 5,922,617 | A | 7/1999 | Wang |
| 5,925,562 | A | 7/1999 | Nova et al. |
| 5,925,878 | A | 7/1999 | Challener |
| 5,945,679 | A | 8/1999 | Dorsel et al. |
| 5,972,542 | A | 10/1999 | Starodubov |
| 5,976,896 | A | 11/1999 | Kumar et al. |
| 5,981,166 | A | 11/1999 | Mandecki |
| 5,986,838 | A | 11/1999 | Thomas, III |
| 5,989,923 | A | 11/1999 | Lowe et al. |
| 5,992,742 | A * | 11/1999 | Sullivan et al. ......... 235/462.01 |
| 5,998,796 | A | 12/1999 | Liu et al. |
| 6,001,510 | A | 12/1999 | Meng et al. |
| 6,005,691 | A | 12/1999 | Grot et al. |
| 6,017,754 | A | 1/2000 | Chesnut et al. |
| 6,025,129 | A | 2/2000 | Nova et al. |
| 6,025,283 | A | 2/2000 | Roberts |
| 6,027,694 | A | 2/2000 | Boulton et al. |
| 6,030,581 | A | 2/2000 | Virtanen |
| 6,035,082 | A | 3/2000 | Murphy et al. |
| 6,036,807 | A | 3/2000 | Brongers |
| 6,043,880 | A | 3/2000 | Andrews et al. |
| 6,046,925 | A | 4/2000 | Tsien et al. |
| 6,049,727 | A | 4/2000 | Crothall |
| 6,057,107 | A | 5/2000 | Fulton |
| 6,060,256 | A | 5/2000 | Everhart et al. |
| 6,067,167 | A | 5/2000 | Atkinson et al. |
| 6,067,392 | A | 5/2000 | Wakami et al. |
| 6,078,048 | A | 6/2000 | Stevens et al. |
| 6,084,995 | A | 7/2000 | Clements et al. |
| 6,087,186 | A | 7/2000 | Cargill et al. |
| 6,096,496 | A * | 8/2000 | Frankel ........................ 435/4 |
| 6,096,596 | A | 8/2000 | Gonzalez |
| 6,097,485 | A | 8/2000 | Lievan |
| 6,103,535 | A | 8/2000 | Pilevar et al. |
| 6,118,127 | A | 9/2000 | Liu et al. |
| 6,128,077 | A | 10/2000 | Jovin et al. |
| 6,137,931 | A | 10/2000 | Ishikawa et al. |
| 6,143,247 | A | 11/2000 | Sheppard, Jr. et al. |
| 6,156,501 | A | 12/2000 | McGall et al. |
| 6,159,748 | A | 12/2000 | Hechinger |
| 6,160,240 | A | 12/2000 | Momma et al. |
| 6,160,656 | A | 12/2000 | Mossberg et al. |
| 6,164,548 | A | 12/2000 | Curiel |
| 6,165,592 | A | 12/2000 | Berger et al. |
| 6,165,648 | A | 12/2000 | Colvin et al. |
| 6,174,648 | B1 | 1/2001 | Terao et al. |
| 6,194,563 | B1 | 2/2001 | Cruickshank |
| 6,204,969 | B1 | 3/2001 | Jang |
| 6,214,560 | B1 | 4/2001 | Yguerabide et al. |
| 6,218,194 | B1 | 4/2001 | Lyndin et al. |
| 6,221,579 | B1 | 4/2001 | Everhart et al. |
| 6,229,635 | B1 | 5/2001 | Wulf |
| 6,229,827 | B1 | 5/2001 | Fernald et al. |
| 6,229,941 | B1 | 5/2001 | Yoon et al. |
| 6,242,056 | B1 | 6/2001 | Spencer et al. |
| 6,259,450 | B1 | 7/2001 | Chiabrera et al. |
| 6,268,128 | B1 | 7/2001 | Collins et al. |
| 6,277,628 | B1 | 8/2001 | Johann et al. |
| 6,284,459 | B1 | 9/2001 | Nova et al. |
| 6,285,806 | B1 | 9/2001 | Kersey et al. |
| 6,288,220 | B1 | 9/2001 | Kambara et al. |
| 6,292,282 | B1 | 9/2001 | Mossberg et al. |
| 6,292,319 | B1 | 9/2001 | Thomas, III |
| 6,301,047 | B1 | 10/2001 | Hoshino et al. |
| 6,304,263 | B1 | 10/2001 | Chiabrera et al. |
| 6,306,587 | B1 | 10/2001 | Royer et al. |
| 6,309,601 | B1 | 10/2001 | Juncosa et al. |
| 6,312,961 | B1 | 11/2001 | Voirin et al. |
| 6,313,771 | B1 | 11/2001 | Munroe et al. |
| 6,314,220 | B1 | 11/2001 | Mossberg et al. |
| 6,319,668 | B1 | 11/2001 | Nova et al. |
| 6,321,007 | B1 | 11/2001 | Sanders |
| 6,322,932 | B1 | 11/2001 | Colvin et al. |
| RE37,473 | E | 12/2001 | Challener |
| 6,329,963 | B1 | 12/2001 | Chiabrera et al. |
| 6,331,273 | B1 | 12/2001 | Nova et al. |
| 6,340,588 | B1 | 1/2002 | Nova et al. |
| 6,352,854 | B1 | 3/2002 | Nova et al. |
| 6,355,198 | B1 | 3/2002 | Kim et al. |
| 6,355,432 | B1 | 3/2002 | Fodor et al. |
| 6,356,681 | B1 | 3/2002 | Chen et al. |
| 6,359,734 | B1 | 3/2002 | Staub et al. |
| 6,361,958 | B1 | 3/2002 | Shieh et al. |
| 6,363,097 | B1 | 3/2002 | Linke et al. |
| 6,371,370 | B2 | 4/2002 | Sadler et al. |
| 6,372,428 | B1 | 4/2002 | Nova et al. |
| 6,383,754 | B1 | 5/2002 | Kaufman et al. |
| 6,391,562 | B2 | 5/2002 | Kambara et al. |
| 6,395,558 | B1 | 5/2002 | Duveneck et al. |
| 6,399,295 | B1 | 6/2002 | Kaylor et al. |
| 6,399,935 | B1 | 6/2002 | Jovin et al. |
| 6,403,320 | B1 | 6/2002 | Read et al. |
| 6,406,841 | B1 | 6/2002 | Lee et al. |
| 6,406,848 | B1 | 6/2002 | Bridgham et al. |
| 6,416,714 | B1 | 7/2002 | Nova et al. |
| 6,416,952 | B1 | 7/2002 | Pirrung et al. |
| 6,417,010 | B1 | 7/2002 | Cargill et al. |
| 6,428,707 | B1 | 8/2002 | Berg et al. |
| 6,428,957 | B1 | 8/2002 | Delenstarr |
| 6,429,022 | B1 | 8/2002 | Kunz et al. |
| 6,433,849 | B1 | 8/2002 | Lowe |
| 6,436,651 | B1 | 8/2002 | Everhart et al. |
| 6,440,667 | B1 | 8/2002 | Fodor et al. |
| 6,456,762 | B1 | 9/2002 | Nishiki et al. |
| RE37,891 | E | 10/2002 | Collins et al. |
| 6,462,770 | B1 | 10/2002 | Cline et al. |
| 6,489,606 | B1 | 12/2002 | Kersey et al. |
| 6,496,287 | B1 | 12/2002 | Seiberle et al. |
| 6,506,342 | B1 | 1/2003 | Frankel |
| 6,514,767 | B1 | 2/2003 | Natan |
| 6,515,753 | B2 | 2/2003 | Maher et al. |
| 6,522,406 | B1 | 2/2003 | Rovira et al. |
| 6,524,793 | B1 | 2/2003 | Chandler et al. |
| 6,533,183 | B2 | 3/2003 | Aasmul et al. |
| 6,542,673 | B1 | 4/2003 | Holter et al. |
| 6,544,739 | B1 | 4/2003 | Fodor et al. |
| 6,545,758 | B1 | 4/2003 | Sandstorm |
| 6,560,017 | B1 | 5/2003 | Bianco |
| 6,565,770 | B1 | 5/2003 | Mayer et al. |
| 6,576,424 | B2 | 6/2003 | Fodor et al. |
| 6,578,712 | B2 | 6/2003 | Lawandy |
| 6,592,036 | B2 | 7/2003 | Sadler et al. |
| 6,594,421 | B1 | 7/2003 | Johnson et al. |
| 6,609,728 | B1 | 8/2003 | Voerman et al. |
| 6,613,581 | B1 | 9/2003 | Wada et al. |
| 6,618,342 | B1 | 9/2003 | Johnson et al. |
| 6,622,916 | B1 | 9/2003 | Bianco |
| 6,628,439 | B2 | 9/2003 | Shiozawa et al. |
| 6,632,655 | B1 | 10/2003 | Mehta et al. |
| 6,635,470 | B1 | 10/2003 | Vann |
| 6,635,863 | B1 | 10/2003 | Nihommori et al. |
| 6,646,243 | B2 | 11/2003 | Pirrung et al. |

| Patent/Pub No. | Date | Name |
|---|---|---|
| 6,657,758 B1 | 12/2003 | Garner |
| 6,660,147 B1 | 12/2003 | Woudenberg et al. |
| 6,678,429 B2 | 1/2004 | Mossberg et al. |
| RE38,430 E | 2/2004 | Rosenstein |
| 6,689,316 B1 | 2/2004 | Blyth et al. |
| 6,692,031 B2 | 2/2004 | McGrew |
| 6,692,912 B1 | 2/2004 | Boles et al. |
| 6,794,658 B2 | 9/2004 | MacAulay |
| 6,806,954 B2 | 10/2004 | Sandstrom |
| 6,858,184 B2 | 2/2005 | Pelrine |
| 6,874,639 B2 | 4/2005 | Lawandy |
| 6,881,789 B2 | 4/2005 | Bosse |
| 6,892,001 B2 | 5/2005 | Ohta et al. |
| 6,905,885 B2 | 6/2005 | Colston et al. |
| 6,908,737 B2 | 6/2005 | Ravkin et al. |
| 6,919,009 B2 | 7/2005 | Stonas |
| 6,982,996 B1 | 1/2006 | Putnam et al. |
| 7,045,049 B1 | 5/2006 | Natan |
| 7,065,032 B2 | 6/2006 | Horimai |
| 7,092,160 B2 | 8/2006 | Putnam et al. |
| 7,106,513 B2 | 9/2006 | Moon et al. |
| 7,126,755 B2 * | 10/2006 | Moon et al. ............... 359/569 |
| 7,190,522 B2 * | 3/2007 | Moon et al. ............... 359/569 |
| 7,215,628 B2 | 5/2007 | Horimai |
| 7,225,082 B1 | 5/2007 | Natan |
| 7,321,541 B2 | 1/2008 | Horimai |
| 7,339,148 B2 | 3/2008 | Kawano |
| 2001/0007775 A1 | 7/2001 | Seul et al. |
| 2002/0000471 A1 | 1/2002 | Aasmul et al. |
| 2002/0006664 A1 | 1/2002 | Sabatini |
| 2002/0018430 A1 | 2/2002 | Heckenkamp et al. |
| 2002/0022273 A1 | 2/2002 | Empedocles et al. |
| 2002/0025534 A1 | 2/2002 | Goh et al. |
| 2002/0031783 A1 | 3/2002 | Empedocles |
| 2002/0034747 A1 | 3/2002 | Bruchez et al. |
| 2002/0039732 A1 | 4/2002 | Bruchez |
| 2002/0074513 A1 | 6/2002 | Abel et al. |
| 2002/0084329 A1 | 7/2002 | Kaye et al. |
| 2002/0090650 A1 | 7/2002 | Empedocles et al. |
| 2002/0094528 A1 | 7/2002 | Salafsky |
| 2002/0097658 A1 | 7/2002 | Worthington |
| 2002/0155490 A1 | 10/2002 | Skinner et al. |
| 2002/0174918 A1 | 11/2002 | Fugimura et al. |
| 2002/0197456 A1 | 12/2002 | Pope |
| 2003/0008323 A1 | 1/2003 | Ravkin et al. |
| 2003/0021003 A1 | 1/2003 | Ono et al. |
| 2003/0032203 A1 | 2/2003 | Sabatini et al. |
| 2003/0077038 A1 | 4/2003 | Murashima et al. |
| 2003/0082568 A1 | 5/2003 | Phan |
| 2003/0082587 A1 | 5/2003 | Seul et al. |
| 2003/0129654 A1 * | 7/2003 | Ravkin et al. ............... 435/7.1 |
| 2003/0138208 A1 | 7/2003 | Pawlak et al. |
| 2003/0142704 A1 | 7/2003 | Lawandy |
| 2003/0142713 A1 | 7/2003 | Lawandy |
| 2003/0153006 A1 | 8/2003 | Washizu et al. |
| 2003/0162296 A1 | 8/2003 | Lawandy |
| 2003/0184730 A1 | 10/2003 | Price |
| 2003/0203390 A1 | 10/2003 | Kaye et al. |
| 2003/0228610 A1 | 12/2003 | Seul |
| 2004/0027968 A1 | 2/2004 | Horimai |
| 2004/0047030 A1 | 3/2004 | MacAulay |
| 2004/0062178 A1 | 4/2004 | Horimai |
| 2004/0075907 A1 | 4/2004 | Moon et al. |
| 2004/0100636 A1 | 5/2004 | Somekh et al. |
| 2004/0100892 A1 | 5/2004 | Horimai |
| 2004/0125370 A1 | 7/2004 | Montagu |
| 2004/0125424 A1 * | 7/2004 | Moon et al. ............... 359/2 |
| 2004/0126875 A1 | 7/2004 | Putnam |
| 2004/0132205 A1 | 7/2004 | Moon et al. |
| 2004/0156471 A1 | 8/2004 | Sakata |
| 2004/0170356 A1 | 9/2004 | Iazikov et al. |
| 2004/0175842 A1 | 9/2004 | Roitman et al. |
| 2004/0209376 A1 | 10/2004 | Natan et al. |
| 2004/0233485 A1 | 11/2004 | Moon |
| 2004/0263923 A1 | 12/2004 | Moon et al. |
| 2005/0042764 A1 | 2/2005 | Sailor et al. |
| 2005/0220408 A1 | 10/2005 | Putnam |
| 2005/0227252 A1 * | 10/2005 | Moon et al. ............... 435/6 |
| 2005/0270603 A1 | 12/2005 | Putnam et al. |
| 2006/0023310 A1 | 2/2006 | Putnam et al. |
| 2006/0028727 A1 | 2/2006 | Moon et al. |
| 2006/0050544 A1 | 3/2006 | Horimai |
| 2006/0057729 A1 * | 3/2006 | Moon et al. ............... 436/57 |
| 2006/0063271 A1 | 3/2006 | Putnam et al. |
| 2006/0067179 A1 | 3/2006 | Matsumoto |
| 2006/0071075 A1 | 4/2006 | Moon et al. |
| 2006/0072177 A1 | 4/2006 | Putnam et al. |
| 2006/0118630 A1 | 6/2006 | Kersey et al. |
| 2006/0119913 A1 | 6/2006 | Moon |
| 2006/0132877 A1 | 6/2006 | Kersey |
| 2006/0134324 A1 | 6/2006 | Putnam et al. |
| 2006/0139635 A1 | 6/2006 | Kersey et al. |
| 2006/0140074 A1 | 6/2006 | Horimai |
| 2006/0160208 A1 | 7/2006 | Putnam et al. |
| 2007/0121181 A1 | 5/2007 | Moon et al. |
| 2008/0170664 A1 | 7/2008 | Kalman |
| 2008/0192311 A1 | 8/2008 | Horimai |
| 2009/0040885 A1 | 2/2009 | Horimai |

FOREIGN PATENT DOCUMENTS

| | | |
|---|---|---|
| DE | 2416652 | 10/1975 |
| EP | 0 395 300 | 10/1990 |
| EP | 0 723 149 | 7/1996 |
| EP | 0 798 573 A1 | 10/1997 |
| EP | 0 911 667 A1 | 4/1999 |
| EP | 0 916 981 | 5/1999 |
| EP | 0 972 817 A1 | 1/2000 |
| EP | 1182054 A2 | 2/2002 |
| EP | 1 219 979 A1 | 7/2002 |
| GB | 2 118 189 | 10/1983 |
| GB | 2 129 551 | 5/1984 |
| GB | 2 138 821 | 10/1984 |
| GB | 2 299 235 | 9/1996 |
| GB | 2 306 484 | 5/1997 |
| GB | 2 319 838 | 6/1998 |
| GB | 2 372 100 | 8/2002 |
| JP | 10166075 | 6/1998 |
| JP | 2000-035521 | 2/2000 |
| WO | WO 91/06496 | 5/1991 |
| WO | WO 93/09668 | 5/1993 |
| WO | WO 94/28119 | 12/1994 |
| WO | WO 96/24061 | 8/1996 |
| WO | WO 96/36436 A1 | 11/1996 |
| WO | WO 97/12680 | 4/1997 |
| WO | WO 97/15690 | 5/1997 |
| WO | WO 97/17258 | 5/1997 |
| WO | WO 97/31282 | 8/1997 |
| WO | WO 97/34171 | 9/1997 |
| WO | WO 98/04740 | 2/1998 |
| WO | WO 98/24549 | 6/1998 |
| WO | WO 99/02266 | 1/1999 |
| WO | WO 99/09042 | 2/1999 |
| WO | WO 99/32654 | 7/1999 |
| WO | WO 99/42209 | 8/1999 |
| WO | WO 00/08443 | 2/2000 |
| WO | WO 00/16893 A2 | 3/2000 |
| WO | WO 00/37914 | 6/2000 |
| WO | WO-00/37914 | 6/2000 |
| WO | WO-00/37969 | 6/2000 |
| WO | WO 00/37969 | 6/2000 |
| WO | WO 00/39617 | 7/2000 |
| WO | WO 00/61198 | 10/2000 |
| WO | WO 01/58583 A1 | 8/2001 |
| WO | WO 01/71322 A2 | 9/2001 |
| WO | WO-01/78889 | 10/2001 |

| | | |
|---|---|---|
| WO | WO 01/78889 A2 | 10/2001 |
| WO | WO 01/90225 | 11/2001 |
| WO | WO-02/059306 A2 | 8/2002 |
| WO | WO 02/059306 A2 | 8/2002 |
| WO | WO 02/059603 | 8/2002 |
| WO | WO 02064829 | 8/2002 |
| WO | WO 03/061983 | 7/2003 |
| WO | WO 03091731 | 11/2003 |
| WO | WO 2004011940 | 2/2004 |
| WO | WO 2004015418 | 2/2004 |
| WO | WO 2004/019276 A1 | 3/2004 |
| WO | WO 2004/024328 A1 | 3/2004 |
| WO | WO 2004/025561 | 3/2004 |
| WO | WO 2004/025562 | 3/2004 |
| WO | WO 2004/025563 A1 | 3/2004 |
| WO | WO 2004046697 | 6/2004 |
| WO | WO 2004/066210 | 8/2004 |
| WO | WO 2005/026729 A3 | 3/2005 |
| WO | WO 2005/027031 A2 | 3/2005 |
| WO | WO 2005/029047 A2 | 3/2005 |
| WO | WO 2005/033681 A1 | 4/2005 |
| WO | WO 2005/050207 A3 | 6/2005 |
| WO | WO 2005/079544 A2 | 9/2005 |
| WO | WO 2006/020363 A2 | 2/2006 |
| WO | WO 2006/055735 A2 | 5/2006 |
| WO | WO 2006/055736 A1 | 5/2006 |
| WO | WO 2006/076053 A1 | 7/2006 |

OTHER PUBLICATIONS

Othonos, X. Lee; Superimposed Multiple Bragg Gratings, Nov. 10, 1994, vol. 30, No. 23.
Po Ki Yuen, Microbarcode Sorting Device; Science & Technology, Corning Incorparated, Corning, New York 14831-0007, USA.
International Search Report for International Application No. PCT/US2003/26315.
International Search Report for International Application No. PCT/US2003/26316.
International Search Report for International Application No. PCT/US2003/28862.
International Search Report for International Application No. PCT/US2003/28874.
International Search Report for International Application No. PCT/US2003/28875.
International Search Report for International Application No. PCT/US2003/28887.
International Search Report for International Application No. PCT/US2003/28890.
International Search Report for International Application No. PCT/US2003/29164.
International Search Report for International Application No. PCT/US2003/29244.
International Search Report for International Application No. PCT/US2004/01685.
International Search Report for International Application No. PCT/US2004/30037.
International Search Report for International Application No. PCT/US2004/30038.
International Search Report for International Application No. PCT/US2004/30300.
International Search Report for International Application No. PCT/US2004/32084.
International Search Report for International Application No. PCT/US2004/38416.
International Search Report for International Application No. PCT/US2005/05743.
International Search Report for International Application No. PCT/US2005/05745.
International Search Report for International Application No. PCT/US2005/26289.
International Search Report for International Application No. PCT/US2005/33694.
International Search Report for International Application No. PCT/US2005/41730.
International Search Report for International Application No. PCT/US2005/41731.
"Electronically Scanned Confocal Imaging System"; IBM Technical Disclosure Bulletin; vol. 36; No. 06B; Jun. 1993; pp. 261-262.
Hideki Kambara; Recent Progress In fluorescent DNA Analyzers and Methods; Current Topics in Analytical checmistry; vol. 1, (1998) pp. 21-36.
G. Kakarantzas et al.;"Transmission Filters Based on periodically Micro-tapered Fibre"; CLE0/2000/Friday Morning; 8:45 a.m.; pp. 574-575.
Michael C. Needels et al.; "Generation and Screening of an Oligonucleotide-Encoded Synthetic Peptide Library"; Proc Natl. Acad. Sci. USA, vol. 90;pp. 10700-10704, Nov. 1993.
W.R. Rigby; "An Anodizing Process for the Production of Inorganic Microfiltration Membranes"; 2436Transactions of the Institute of Metal Finishing;68(Aug. 1990),Part 3 p. 95-98.
Burstein Technology, Inc.; "Angel Strategies Tombstone"; 1 page.
Vander Lugt; "Design Relationships For Holographic Memories"; Applied Optics, vol. 12, No. 7, Jul. 1973; pp. 1675-1685.
Andrew Marshall; "DNA Chips: Array of Possibilities"; Nature Biotechnology vol. 16 Jan. 1998; pp. 27-31.
Thomas Laurell; "Enhanced Enzyme Activity in Silicon Integrated Enzyme Reactors Utilizing Porous Silicon as the Coupling Matrix"; Sensor & Actuators B 31 (1996); pp. 161-166.
Michael J. Kozal; "Extensive Polymorphisms Observed in HIV-1 Clade B Protease Gene Using High-Density Oligonucleotide Arrays"; Nature Medicine, vol. 2, No. 7, Jul. 1996; pp. 753-759.
Masato Mitsuhashi; "Gene Manipulation on Plastic Plates"; Nature, vol. 357, Jun. 11, 1992; pp. 519-520.
"Ben Beune Patent Licensing Director of Philips IP&S"; Replication & Duplication—News &Technology; Jan.-Feb. 2002; pp. 1-2.
"Compact Disc Arrayer"; V&P Scientific; Nov. 17, 2003; pp. 1-4.
De Beer et al., "Forward-Scattering Degenerate Four-Wave Mixing for Sensitive Absorption Detection in Microseparation Systems Coupling to Micro-Column Liquid Chromatography"; Journal of Chromatography A. 811 (1998); pp. 35-45.
Fonjallaz et al., "Interferometric Side Diffraction Technique for the Characterisation of Fiber Gratings"; 1999 OSA Conference, Sep. 23-25; 3 pgs.
Kashyap R.; "Fiber Bragg Gratings"; Academic Press, Ch. 9; pp. 430-433.
Kogelnik H; "Coupled Wave Theory for Thick Hologram Gratings"; The Bell System Technical Journal, 48(9):2909-2947 (1969).
Krug P., "Measurement of Index Modulation Along an Optical Fiber Bragg Grating"; Optics Letters, 20(17):1767-1769.
Leith et al., "Holographic Data Storage in Three-Dimensional Media"; Applied Optics, vol. 5, No. 8, Aug. 1966; 21 pgs.
Shelia R. Nicerwarner-Peña, "Submicrometer Metallic Barcodes"; Science, vol. 294; Oct. 5, 2001; 5 pgs.
Ivan Oransky; "Sequencing on Compact Disc? Microgenomics of Breast Cancer; Better Binding Site Prediction"; vol. 17 / Issue 13 / 35 / Jun. 30, 2003; 13 pgs.
Mark O. Worthington; "Curriculum Vitae"; Jan. 5, 2004; 4 pgs.
Yoshinobu Kohara; "DNA Probes on Beads Arrayed in a Capillary, 'Bead-Array',Exhibited High Hybridization Performance"; Nucleic Acids Research, 2002, vol. 30, No. 16 e87; 7 pgs.
Patil et al. "Porous Polysterene Beads as Carriers for Self-Emulsifying System Containing Loratadine"; (AAPS PharmSciTech, Mar. 24, 2006, vol. 7, pp. E1-E7).
Lide (CRC Handbook of Chemistry and Physics, 71st ed.), 1990.
"Introduction to Flow Cytometry: A Learning Guide," BD Biosciences, San Jose, CA, Apr. 2000.
US 6,780,301, 08/2004, Natan (withdrawn)

* cited by examiner

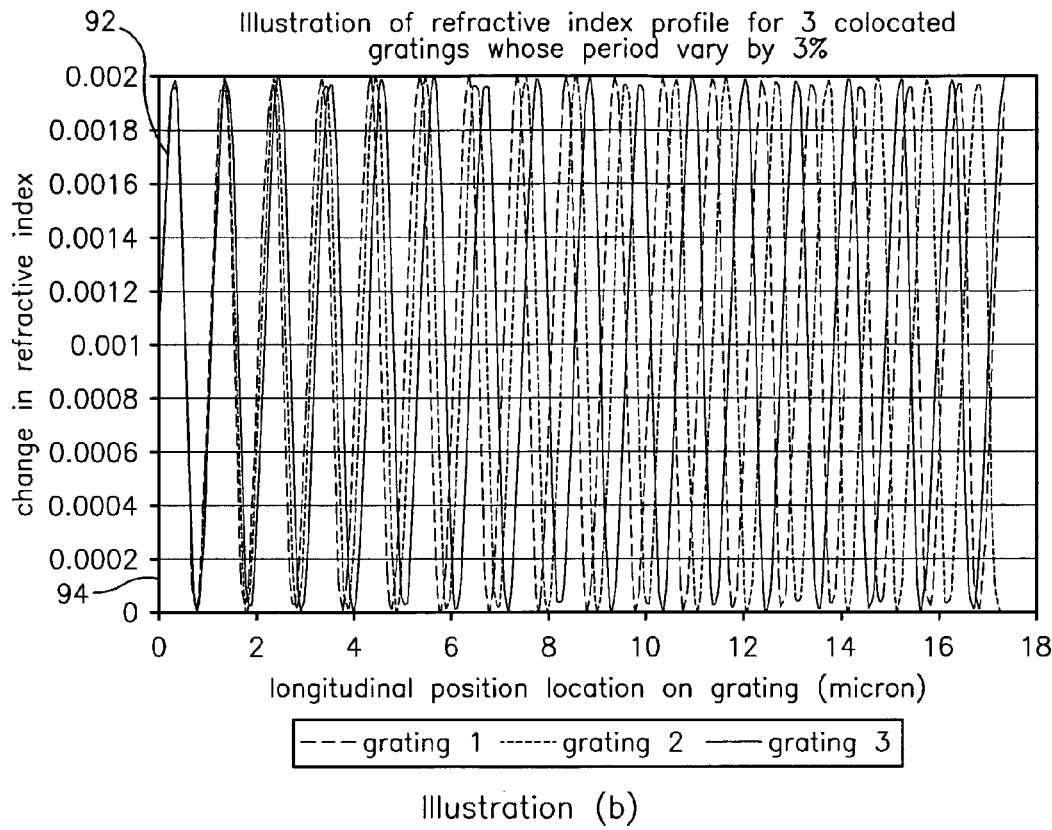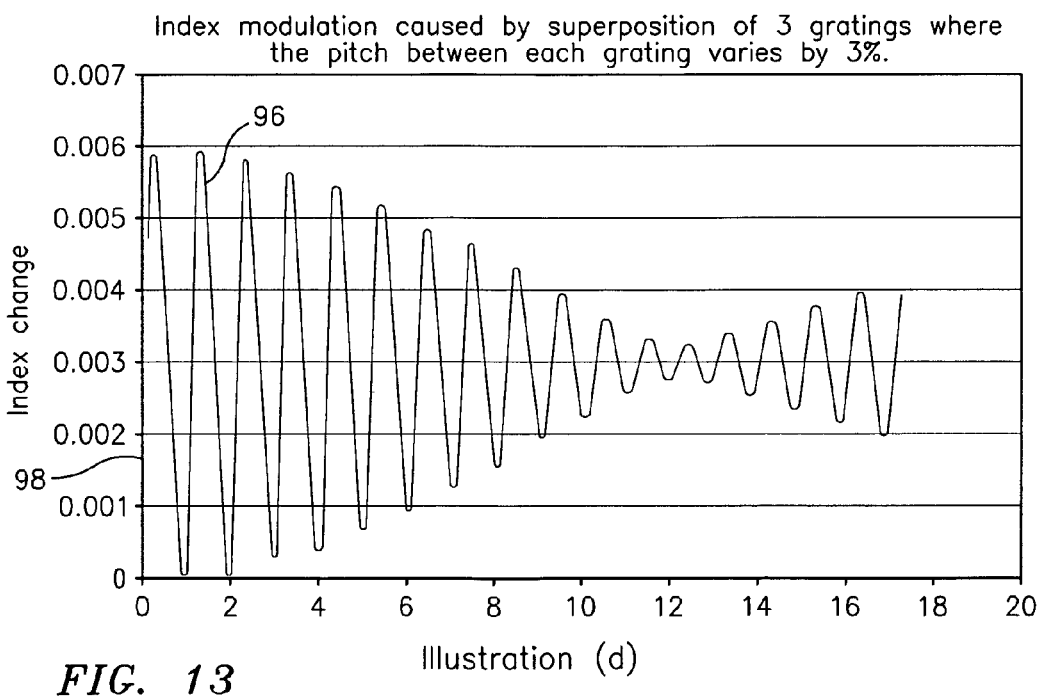
FIG. 13

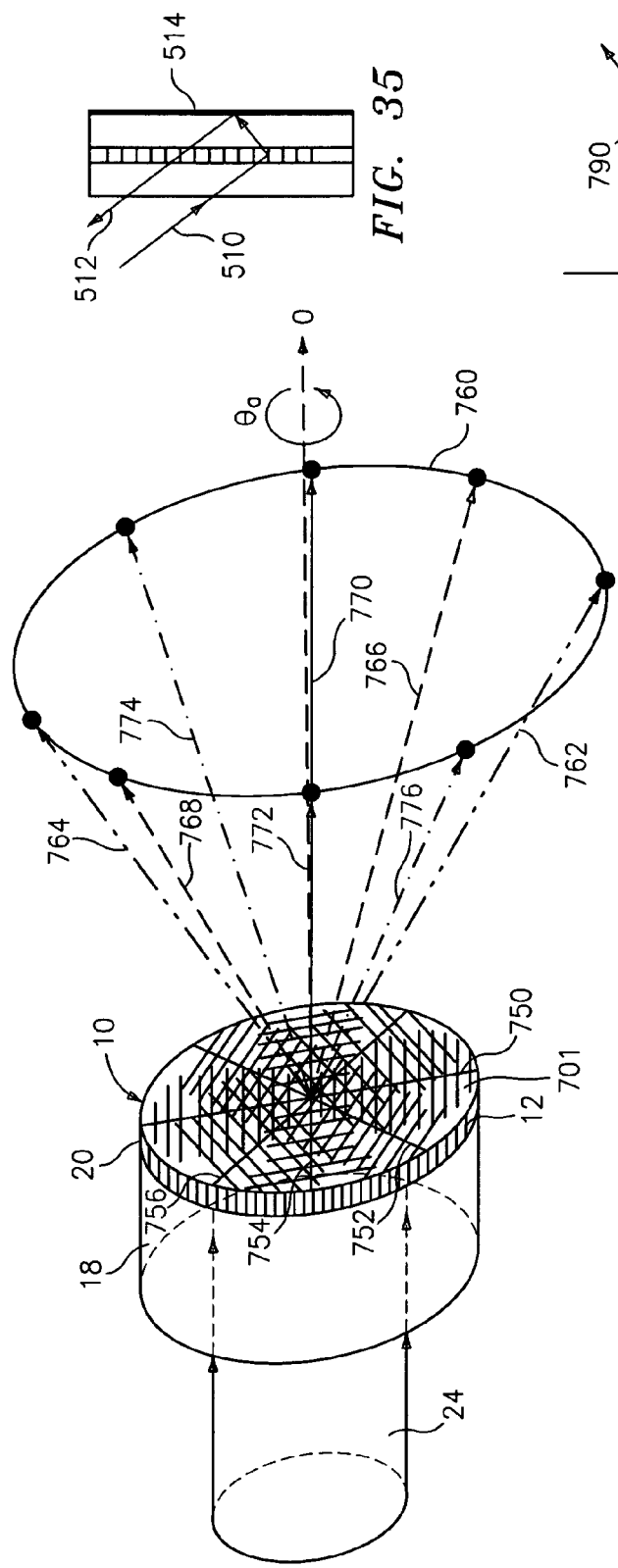
FIG. 35
FIG. 18
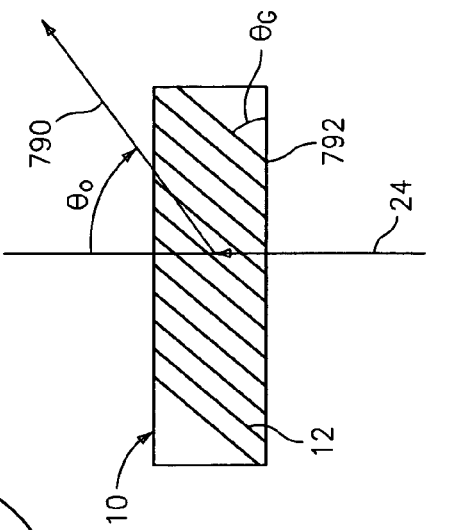
FIG. 19
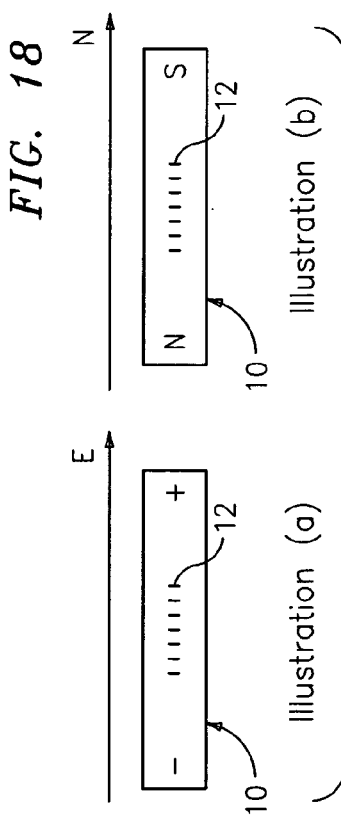
FIG. 36

Illustration(a)   Illustration(b)   Illustration(c)

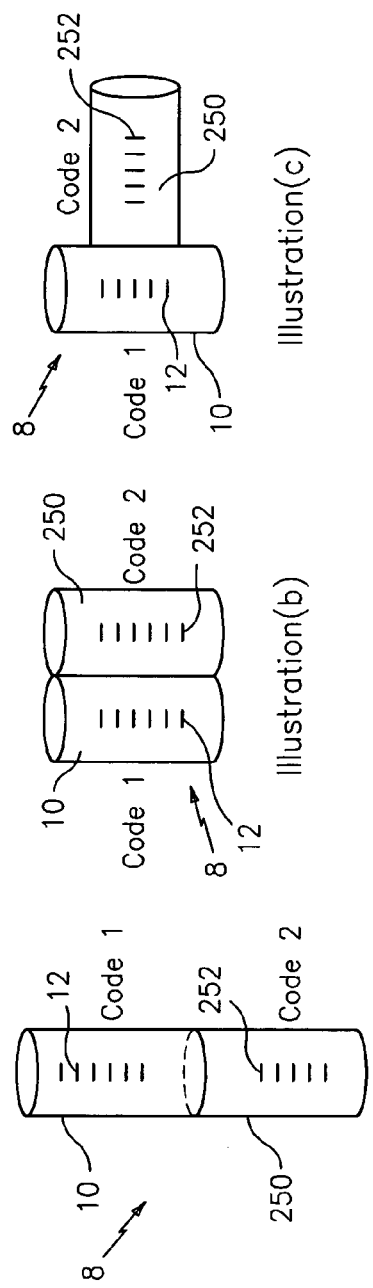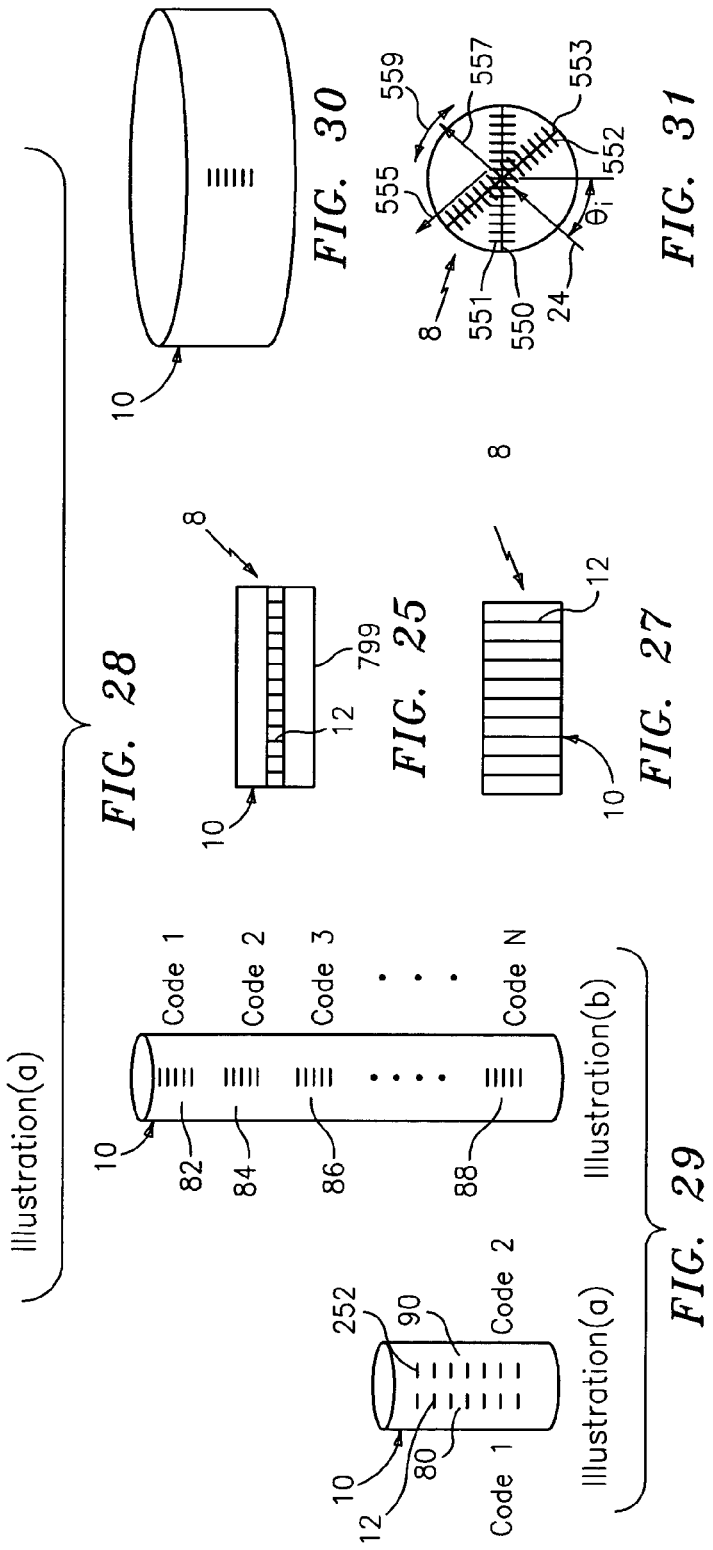

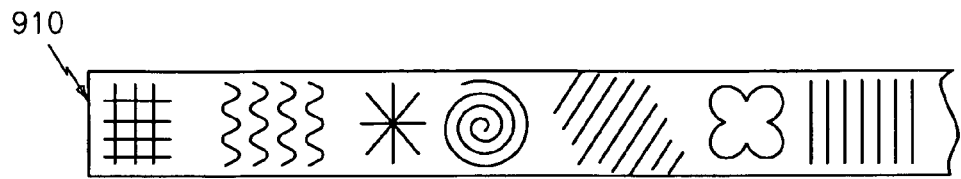
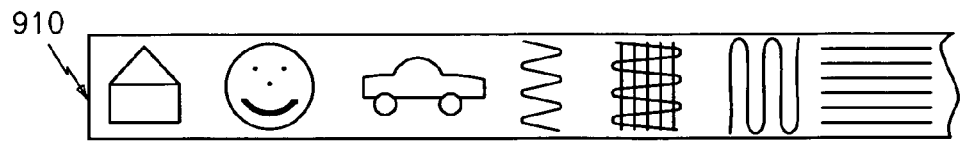
FIG. 45
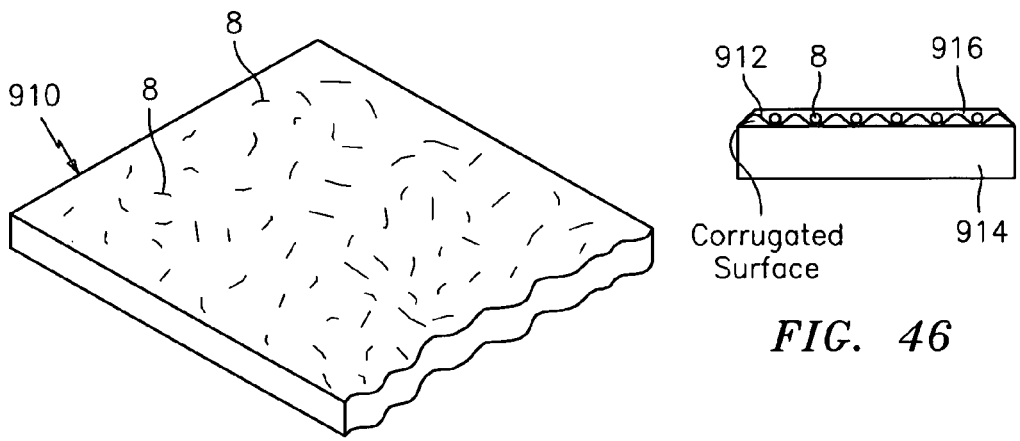
FIG. 44
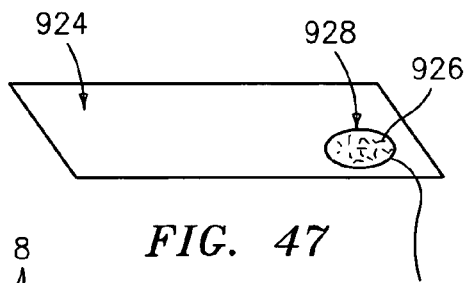
FIG. 46
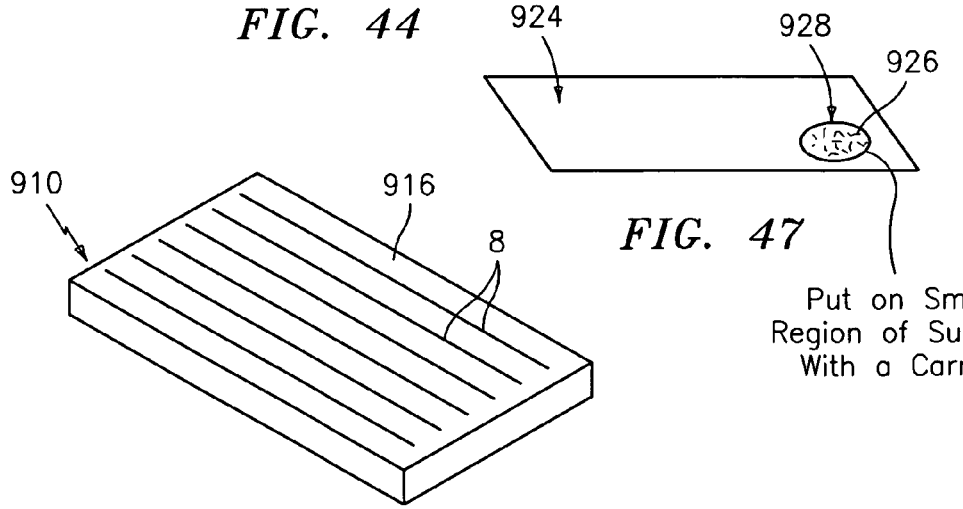
FIG. 44a
FIG. 47
Put on Small Region of Surface With a Carrier Serilaized Codes Small Spool With Serilaized Codes

FIG. 60

METHOD AND APPARATUS FOR DRUG PRODUCT TRACKING USING ENCODED OPTICAL IDENTIFICATION ELEMENTS

This application claims the benefit of U.S. Provisional Patent Applications, Ser. Nos. 60/589,644, filed Jul. 21, 2004; Ser. No. 60/609,712, filed Sep. 13, 2004; Ser. No. 60/623,811, filed Oct. 29, 2004; and is a continuation-in-part of U.S. patent application, Ser. No. 10/661,082, filed Sep. 12, 2003, now U.S. Pat. No. 7,126,755 which is a continuation-in-part of U.S. patent application Ser. No. 10/645,689, filed Aug. 20, 2003, now abandoned which claimed the benefit of U.S. provisional applications, Ser. No. 60/405,087 filed Aug. 20, 2002 and Ser. No. 60/410,541, filed Sep. 12, 2002; all of which are incorporated herein by reference in their entirety.

The following cases contain subject matter related to that disclosed herein and are incorporated herein by reference in their entirety: U.S. patent application Ser. No. 10/661,234, filed Sep. 12, 2003, entitled "Diffraction Grating-Based Optical Identification Element", U.S. patent application Ser. No. 10/661,031, filed Sep. 12, 2003, entitled "Diffraction Grating-Based Encoded Micro-particles for Multiplexed Experiments", U.S. patent application Ser. No. 10/661,115, filed Sep. 12, 2003, entitled "Assay Stick", U.S. patent application Ser. No. 10/661,836, filed Sep. 12, 2003, entitled "Method and Apparatus for Aligning Microbeads in order to Interrogate the Same"; U.S. patent application Ser. No. 10/661,254, filed Sep. 12, 2003, entitled "Chemical Synthesis Using Diffraction Grating-based Encoded Optical Elements"; U.S. patent application Ser. No. 10/661,116, filed Sep. 12, 2003, entitled "Method of Manufacturing of a Diffraction grating-based identification Element"; and U.S. patent application Ser. No. 10/763,995 filed Jan. 22, 2004, entitled, "Hybrid Random Bead/Chip Based Microarray"; and U.S. patent application, Ser. No. 10/956,791, filed Oct. 1, 2004.

TECHNICAL FIELD

This invention relates to drug tracking, and more particularly to drug product tracking using encoded optical identification elements.

BACKGROUND ART

It is often desirable to uniquely label or identify items, such as large or small objects, plants, and/or animals for sorting, tracking, identification, verification, authentication, or for other purposes. Existing technologies, such as bar codes, electronic microchips/transponders, radio-frequency identification (RFID), and fluorescence (or other optical techniques), are often inadequate. For example, existing technologies may be too large for certain applications, may not provide enough different codes, cannot be made flexible or bendable, or cannot withstand harsh environments, e.g., harsh temperature, pressure, chemical, nuclear and/or electromagnetic environments.

It is also been a problem in the pharmaceutical industry to have counterfeit drugs be produced causing loss of security, traceability, and safety in the drug supply.

Therefore, it would be desirable to obtain a labeling technique that provides the capability of providing many codes (e.g., greater than 1 million codes), that can be made very small, can be made flexible or bendable, and/or that can withstand harsh environments.

SUMMARY OF THE INVENTION

Objects of the present invention include provision of a labeling technique that allows for a large number of distinct codes, can be made very small, can be made flexible or bendable, and/or can withstand harsh environments.

According to a first aspect of the present invention, an optical identification element for identifying a drug, comprises an optical substrate; at least a portion of the substrate having at least one diffraction grating disposed therein, the grating having at least one refractive index pitch superimposed at a common location; the grating providing an output optical signal when illuminated by an incident light signal; the optical output signal being indicative of a code; and the element being at least partially disposed on the drug or the packaging or containers associated therewith.

According to a second aspect of the present invention, a method of reading a code in an optical identification element that is disposed on a drug, the element having a diffraction grating with one or more refractive index pitches superimposed at a common location, comprises: illuminating the element with incident light, the substrate providing an output light signal; and reading the output light signal and detecting a code therefrom.

According further to the present invention, the element is at least partially embedded or attached to the drug or the packaging or containers associated therewith.

According further to the present inventions, said refractive index variation comprises at least one refractive index pitch superimposed at said grating location.

According still further to the present invention, said refractive index variation comprises a plurality of refractive index pitches superimposed at said grating location. According still further to the present invention, said substrate is made of a material selected from the group: glass, silica, plastic, rubber, and polymer.

The present invention provides a method and apparatus for labeling an item, using diffraction grating-based encoded optical identification elements, capable of having many optically readable codes. The element has a substrate containing an optically readable composite diffraction grating having one or more of collocated index spacing or pitches A. The invention allows for a high number of uniquely identifiable codes (e.g., millions, billions, or more). The codes may be digital binary codes and thus are digitally readable or may be other numerical bases if desired.

The encoded element 8 may be used to label any desired item, such as large or small objects, products, solids, powders, liquids, gases, plants, minerals, cells and/or animals, or any combination of or portion of one or more thereof.

The elements 8 may be used on or within any consumer goods, law enforcement applications, explosives, collectibles, sporting goods, forestry, textiles/apparel, firearms, documents, secure notes, bottles, blister packs, plastics, resins, films, adhesives, laminates, security threads, printing, paper, and/or polymers.

The label may be used for many different purposes, such as for sorting, tracking, identification, verification, authentication, anti-theft/anti-counterfeit, security/anti-terrorism, forensics, or for other purposes. In a manufacturing environment, the elements 8 may be used to track inventory for production information or sales of goods/products.

The element may be made of a glass material, such as silica or other glasses, or may be made of plastic or polymer, or any other material capable of having a diffraction grating disposed therein. The element may be cylindrical in shape or any other geometry, provided the design parameters are met.

Also, the elements may be very small "microbeads" (or microelements or microparticles or encoded particles) for small applications (about 1-1000 microns), or larger "macrobeads" (or macroelements) for larger applications (e.g., 1-1000 mm or much larger). Also, the element may be embedded within or part of a larger substrate or object. The element may also be in the form of a thread or fiber or filaments to be weaved into a material.

Also, the encoded element may be embedded in a film or coating, which may be an adhesive film or coating or tape, having one or a plurality of particles or filaments therein. For example a roll of encoded adhesive tape that may be easily attached to an item for labeling.

The code in the element is interrogated using free-space optics and can be made alignment insensitive. The element may be optically interrogated to read the code from the side or end of the element.

The gratings (or codes) are embedded inside (including on or near the surface) of the substrate and may be permanent non-removable codes that can operate in harsh environments (chemical, temperature, pressure, nuclear, electromagnetic, etc.).

The code is not affected by spot imperfections, scratches, cracks or breaks in the substrate. In addition, the codes are spatially invariant. Thus, splitting or slicing an element axially produces more elements with the same code. Accordingly, when a bead is axially split-up, the code is not lost, but instead replicated in each piece.

The foregoing and other objects, features and advantages of the present invention will become more apparent in light of the following detailed description of exemplary embodiments thereof.

BRIEF DESCRIPTION OF THE DRAWINGS

FIG. 18 is a perspective view showing azimuthal multiplexing of a thin grating for an optical identification element, in accordance with the present invention.

FIG. 19 is side view of a blazed grating for an optical identification element, in accordance with the present invention.

FIG. 25 is a side view of an optical identification element having a coating, in accordance with the present invention.

FIG. 27 is a side view of an optical identification element having a grating across an entire dimension, in accordance with the present invention.

FIG. 28, illustrations (a)-(c), are perspective views of alternative embodiments for an optical identification element, in accordance with the present invention.

FIG. 29, illustrations (a)-(b), are perspective views of an optical identification element having multiple grating locations, in accordance with the present invention.

FIG. 30, is a perspective view of an alternative embodiment for an optical identification element, in accordance with the present invention.

FIG. 31 is a view an optical identification element having a plurality of gratings located rotationally around the optical identification element, in accordance with the present invention.

FIG. 35 is a side view an optical identification element having a reflective coating thereon, in accordance with the present invention.

FIG. 36 illustrations (a)-(b) are side views of an optical identification element polarized along an electric or magnetic field, in accordance with the present invention.

FIGS. 44-48 show various embodiments for using the present invention for labeling, in accordance with the present invention.

FIGS. 54-66 show various embodiments for reading encoded elements in reflection, in accordance with the present invention.

BEST MODE FOR CARRYING OUT THE INVENTION

Figure 1:
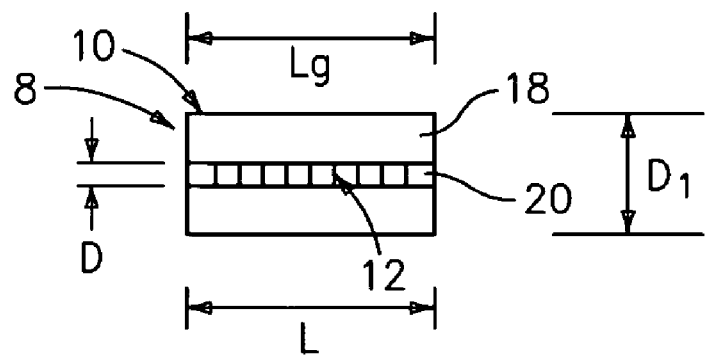
FIG. 1 is a side view of an optical identification element, in accordance with the present invention.

Referring to FIG. 1, a diffraction grating-based optical identification element 8 (or encoded element or coded element) comprises a known optical substrate 10, having an optical diffraction grating 12 disposed (or written, impressed, embedded, imprinted, etched, grown, deposited or otherwise formed) in the volume of or on a surface of a substrate 10. The grating 12 is a periodic or aperiodic variation in the effective refractive index and/or effective optical absorption of at least a portion of the substrate 10.

The optical identification element described herein is the same as that 5 described in Copending patent application Ser. No. 10/661,234, filed on Sep. 12, 2003, which is incorporated herein by reference in its entirety.

In particular, the substrate 10 has an inner region 20 where the grating 12 is located. The inner region 20 may be photosensitive to allow the writing or impressing of the grating 12. The substrate 10 has an outer region 18 which does not have the grating 12 therein.

The grating 12 is a combination of one or more individual spatial periodic sinusoidal variations (or components) in the refractive index that are collocated at substantially the same location on the substrate 10 along the length of the grating region 20, each having a spatial period (or pitch) $\Lambda$. The resultant combination of these individual pitches is the grating 12, comprising spatial periods ($\Lambda 1$-$\Lambda n$) each representing a bit in the code. Thus, the grating 12 represents a unique optically readable code, made up of bits, where a bit corresponds to a unique pitch $\Lambda$ within the grating 12. Accordingly, for a digital binary (0-1) code, the code is determined by which spatial periods ($\Lambda 1$-$\Lambda n$) exist (or do not exist) in a given composite grating 12. The code or bits may also be determined by additional parameters (or additional degrees of multiplexing), and other numerical bases for the code may be used, as discussed herein and/or in the aforementioned patent application.

The grating 12 may also be referred to herein as a composite or collocated grating. Also, the grating 12 may be referred to as a "hologram", as the grating 12 transforms, translates, or filters an input optical signal to a predetermined desired optical output pattern or signal.

The substrate 10 has an outer diameter D1 and comprises silica glass ($SiO_2$) having the appropriate chemical composition to allow the grating 12 to be disposed therein or thereon. Other materials for the optical substrate 10 may be used if desired. For example, the substrate 10 may be made of any glass, e.g., silica, phosphate glass, borosilicate glass, or other glasses, or made of glass and plastic, or solely plastic. For high temperature or harsh chemical applications, the optical substrate 10 made of a glass material is desirable. If a flexible substrate is needed, plastic, rubber or polymer-based substrate may be used. The optical substrate 10 may be any material capable of having the grating 12 disposed in the grating region 20 and that allows light to pass through it to allow the code to be optically read.

The optical substrate 10 with the grating 12 has a length L and an outer diameter D1, and the inner region 20 diameter D. The length L can range from very small "microbeads" (or microelements, micro-particles, or encoded particles), about 1-1000 microns or smaller, to larger "macroelements" for larger applications (about 1.0-1000 mm or greater). In addition, the outer dimension D1 can range from small (less than 1000 microns) to large (1.0-1000 mm and greater). Other dimensions and lengths for the substrate 10 and the grating 12 may be used.

The optical substrate 10 with the grating 12 has a length L and an outer diameter D1, and the inner region 20 diameter D. The length L can range from very small (about 1-1000 microns or smaller) to large (about 1.0-1000 mm or greater). In addition, the outer dimension D1 can range from small (less than 1000 microns) to large (1.0-1000 mm and greater). Other dimensions and lengths for the substrate 10 and the grating 12 may be used. Also, the element may be embedded within or part of a larger substrate or object. The element may also be in the form of a thread or fiber to be weaved into a material.

The grating 12 may have a length Lg of about the length L of the substrate 10. Alternatively, the length Lg of the grating 12 may be shorter than the total length L of the substrate 10, as shown in FIG. 1.

The outer region 18 is made of pure silica ($SiO_2$) and has a refractive index n2 of about 1.458 (at a wavelength of about 1553 nm), and the inner grating region 20 of the substrate 10 has dopants, such as germanium and/or boron, to provide a refractive index n1 of about 1.453, which is less than that of outer region 18 by about 0.005. Other indices of refraction n1,n2 for the grating region 20 and the outer region 18, respectively, may be used, if desired, provided the grating 12 can be impressed in the desired grating region 20. For example, the grating region 20 may have an index of refraction that is larger than that of the outer region 18 or grating region 20 may have the same index of refraction as the outer region 18 if desired.

Figure 2:
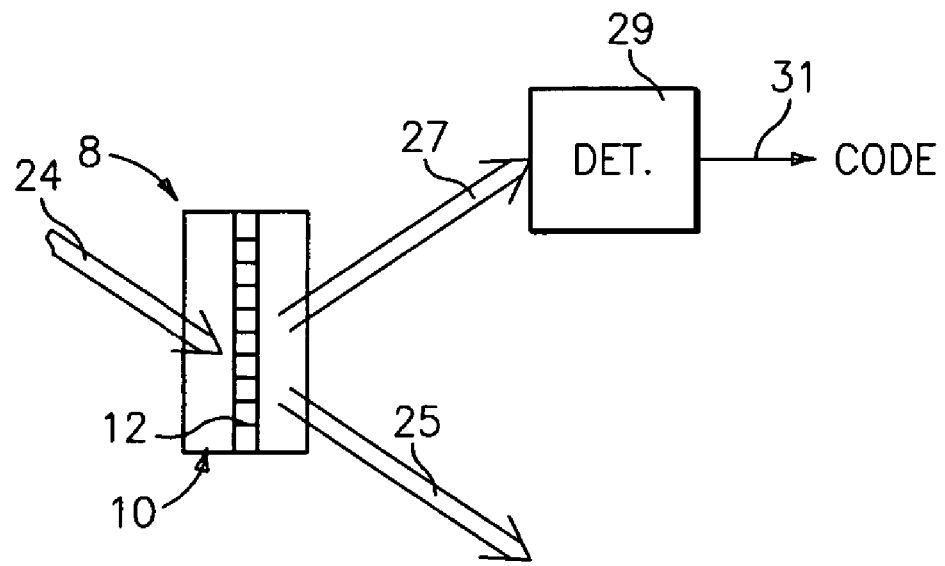
FIG. 2 is a top level optical schematic for reading a code in an optical identification element, in accordance with the present invention.

Referring to FIG. 2, an incident light 24 of a wavelength $\lambda$, e.g., 532 nm from a known frequency doubled Nd:YAG laser or about 632 nm from a known Helium-Neon laser, is incident on the grating 12 in the substrate 10. Any other input wavelength $\lambda$ can be used if desired provided $\lambda$ is within the optical transmission range of the substrate (discussed more herein and/or in the aforementioned patent application). A portion of the input light 24 passes straight through the grating 12, as indicated by a line 25. The remainder of the input light 24 is reflected by the grating 12, as indicated by a line 27 and provided to a detector 29. The output light 27 may be a plurality of beams, each having the same wavelength $\lambda$ as the input wavelength $\lambda$ and each having a different output angle indicative of the pitches ($\Lambda 1$-$\Lambda n$) existing in the grating 12. Alternatively, the input light 24 may be a plurality of wavelengths and the output light 27 may have a plurality of wavelengths indicative of the pitches ($\Lambda 1$-$\Lambda n$) existing in the grating 12. Alternatively, the output light may be a combination of wavelengths and output angles. The above techniques are discussed in more detail herein and/or in the aforementioned patent application.

The detector 29 has the necessary optics, electronics, software and/or firmware to perform the functions described herein. In particular, the detector reads the optical signal 27 diffracted or reflected from the grating 12 and determines the code based on the pitches present or the optical pattern, as discussed more herein or in the aforementioned patent application. An output signal indicative of the code is provided on a line 31.

The encoded element 8 may be used to label any desired item, such as large or small objects, products, solids, powders, liquids, gases, plants, minerals, and/or animals, or any combination of one or more thereof. The label may be used for many different purposes, such as for sorting, tracking, identification, verification, authentication, anti-theft/anti-counterfeit, security/anti-terrorism, forensics, or for other purposes. In a manufacturing environment, the elements 8 may be used to track inventory for production information or sales of goods/products.

For any of the labeled items described herein, the encoded elements 8 may be tiny discrete microbeads (1 to 1000 microns long) embedded into the surface of the item or the encoded element 8 may be a long strand of glass or plastic fiber that is woven, inserted, impressed, or injected into the item being labeled. Alternatively, in the appropriate cases, the diffraction grating 12 may be written or impressed directly into the material, as discussed herein. In any case, the properties of the encoded element 8 do not change. For labeled items that are pliable, bendable, or flexible, the element 8 may be made of a bendable material, such as a polymer or plastic. Also, if the item material is soft or compliant the beads may be pressed, pushed, hammered or shot into the material, either for side reading or end reading, depending on the application.

For any of the embodiments herein, the label on the item can be detected by scanning the item with incident light and detecting the reflected light as discussed herein and/or in the aforementioned patent application. When an element 8 is embedded or attached to an item that is not reflective or transparent to the incident light 24 and reflected light 27, and if the element 8 is not reflective, it may be desirable to illuminate the element from an axial end 8 to achieve best results for code reading.

In general, the encoded elements 8 may be used to label any products or components within a product and may be used for product manufacturing/production identification.

Figure 3:
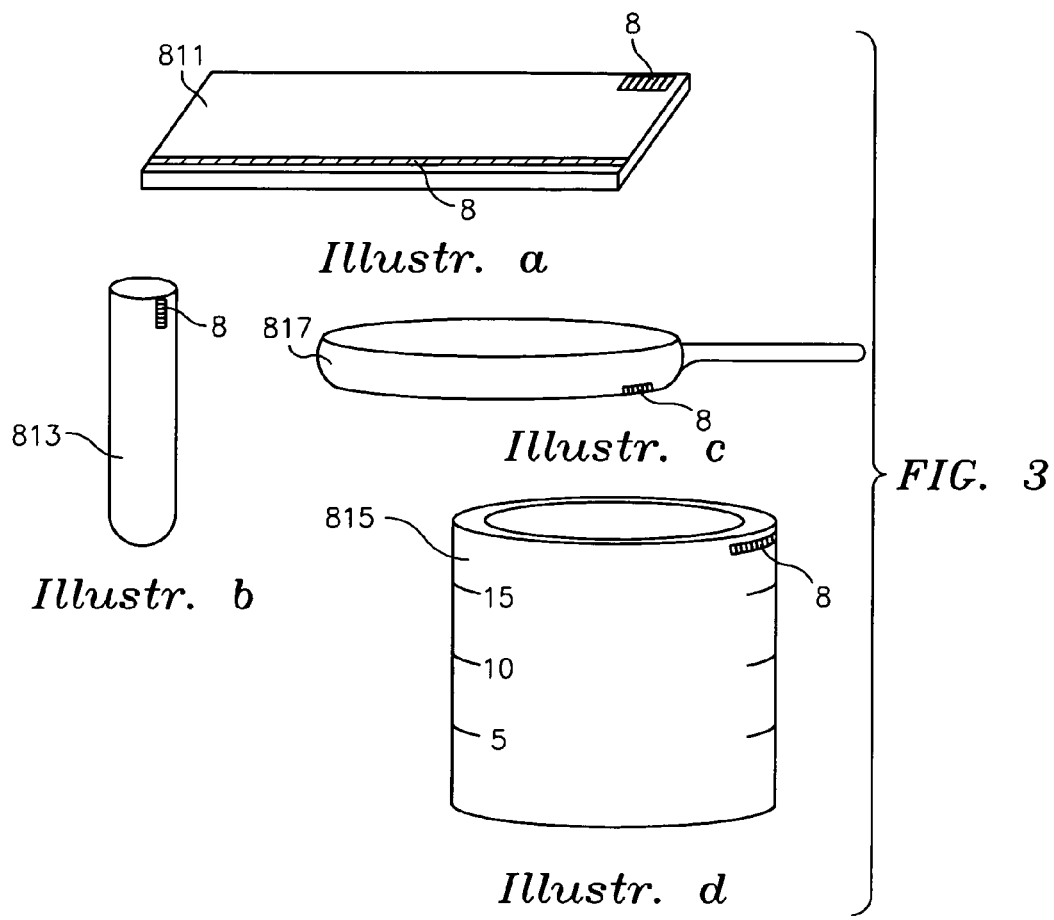
FIG. 3, illustrations (a)-(d) show various transparent items that can be labeled with an optical identification element, in accordance with the present invention.

Referring to FIG. 3, illustrations (a)-(d), encoded elements 8 may be used to label glass or plastic items, such as microscope slides 811, test tubes 813, beakers 815, cookware 817, storage containers and/or covers, multi-well plates, microwell plates, plastic bags, windshields, windows, glasses, contact lenses, other lenses, optical components, tape, bottles, displays, display cases, watch faces, mirrors, sample or Petri dishes, or any other item made of a material that is transparent or substantially transparent to the incident light 24 and reflected light 27 used for reading the code in the encoded elements 8. The invention may be used to identify such glass or plastic items by writing the diffraction grating 12 directly into the material or by embedding into or otherwise attaching the encoded elements 8 to the item. In the case where the code is written directly into the material, the material must have sufficient photosensitivity to allow the diffraction grating 12 to be written into the material with sufficient strength so the code can be optically read. We have found that borosilicate glass has sufficient photosensitivity to support the creation of a diffraction grating 12 therein. Other glasses may be used.

Figure 4:
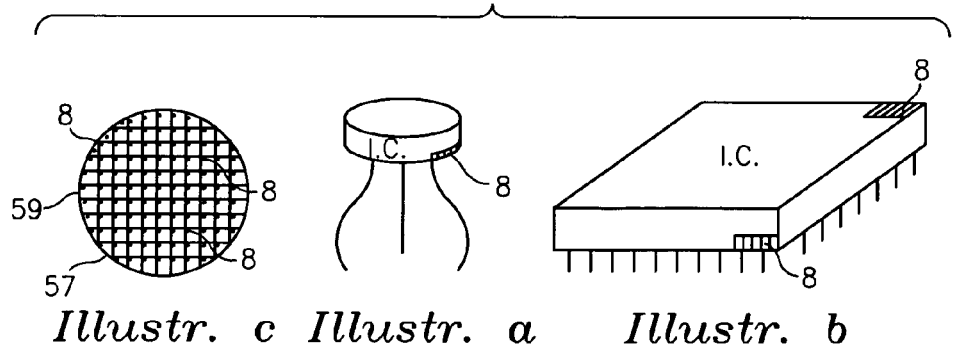
FIG. 4, illustrations (a)-(c) show various integrated circuits or silicon wafers, that can be labeled with an optical identification element, in accordance with the present invention.

Referring to FIG. 4, illustrations (a) and (b), the encoded elements 8 may be used to label micron size products, such as, microcircuits computer chips, integrated circuits (IC's), or other small products or portions thereof. Referring to FIG. 4, illustration (c), the elements 8 may also be used to label silicon wafers 59 or small portions or regions 57 thereof before being cut into small devices or microcircuits.

Figure 5:
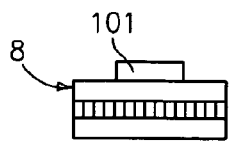
FIG. 5 shows a cell or the like disposed on an optical identification element, in accordance with the present invention.

Referring to FIG. 5, the elements 8 may be used to label any single or multiple cells 101 that are attached to or otherwise disposed on the element 8. The cells 101 may include: molecules, particles, elements, compounds, organisms, atoms, chemicals, acids, bases, nucleic acids, chemical libraries, DNA, polynucleotides, oligomers, RNA, proteins, peptides, polymers, hydrocarbons, or other cells. The cells 101 may be alive or dead, organic or inorganic, and may be individual or groups or chains of cells and may change or mutate over time.

Figure 6:
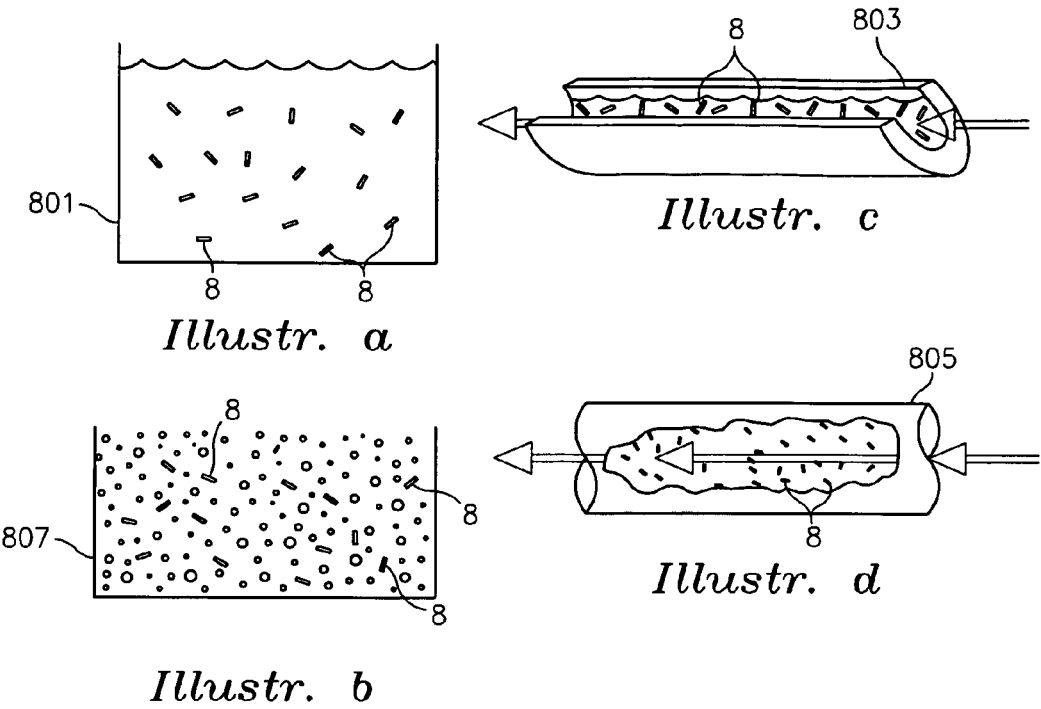
FIG. 6, illustrations (a)-(d) show fluids or powders that can be labeled with an optical identification element, in accordance with the present invention.

Referring to FIG. 6, illustrations, (a)-(d), the encoded elements 8 may be used to label a liquid or liquid products located in a container 801 or in an open or closed flowing pipe or conduit 803, 805 respectively. In that case, the elements 8 are mixed with the liquid. In addition, the elements 8 may also be used to label powders, such as powdered detergent, dirt, pulverized coal, gunpowder, anthrax, or any other powders located in a container 807, or in an open or closed flowing pipe or conduit 803,805, respectively. Also, the elements 8 may be used to label or identify any combination of fluids (liquids and/or gases) and/or powders. Also, the elements 8 may be used to label gases, such as gases in containers or gases flowing in a pipe or conduit, or gaseous by-products of reactions, such as combustion exhaust or other exhaust. Also, the elements 8 may be used to label liquid particles or droplets in gas, such as steam. The elements 8 may be used to track the flow of a liquid, powder, gas, etc. in an industrial plant to determine where the liquid is flowing or has flown.

The elements 8 may be removed from a fluid, powder and/or gas solution or mixture other material by electromagnetic attraction (if the elements are electro-magnetic), skimmed off the surface (if the elements 8 are less dense than the solution, i.e., buoyant or semi-buoyant), or from settling to the bottom of a container (if the elements 8 are more dense than the solution), or by filtering the solution with a strainer or filter.

Figure 7:
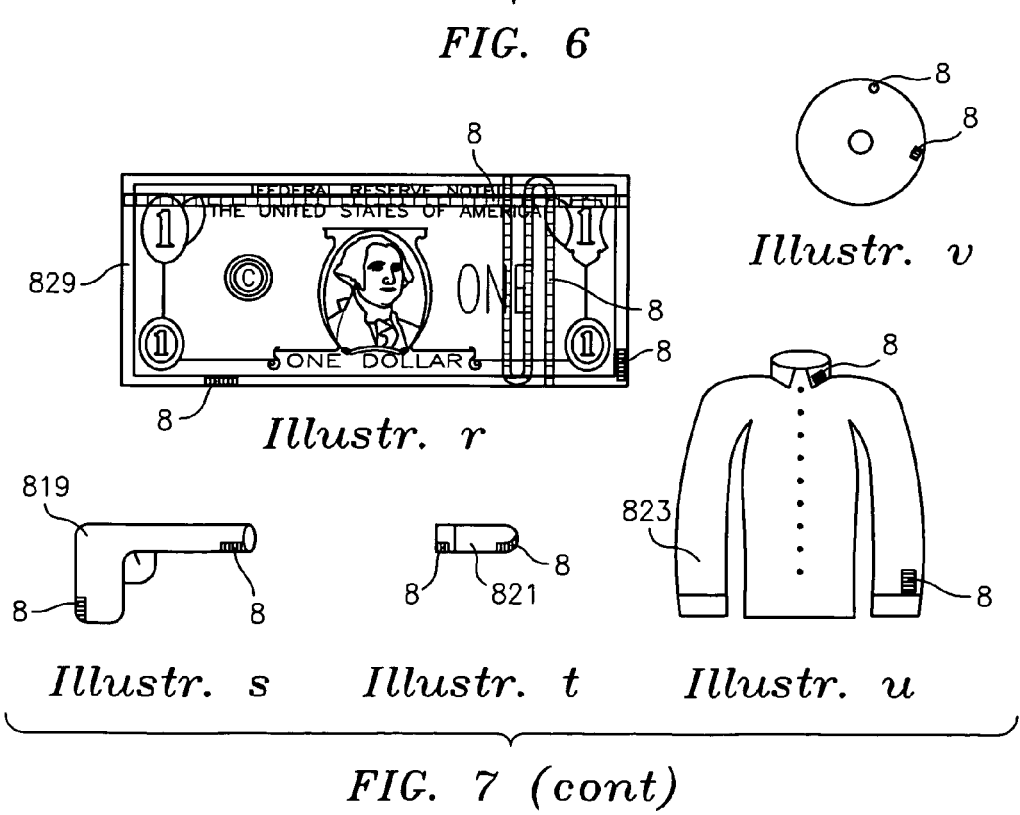
FIG. 7, illustrations (a)-(v) show various other items that can be labeled with an optical identification element, in accordance with the present invention.
Figure 7:
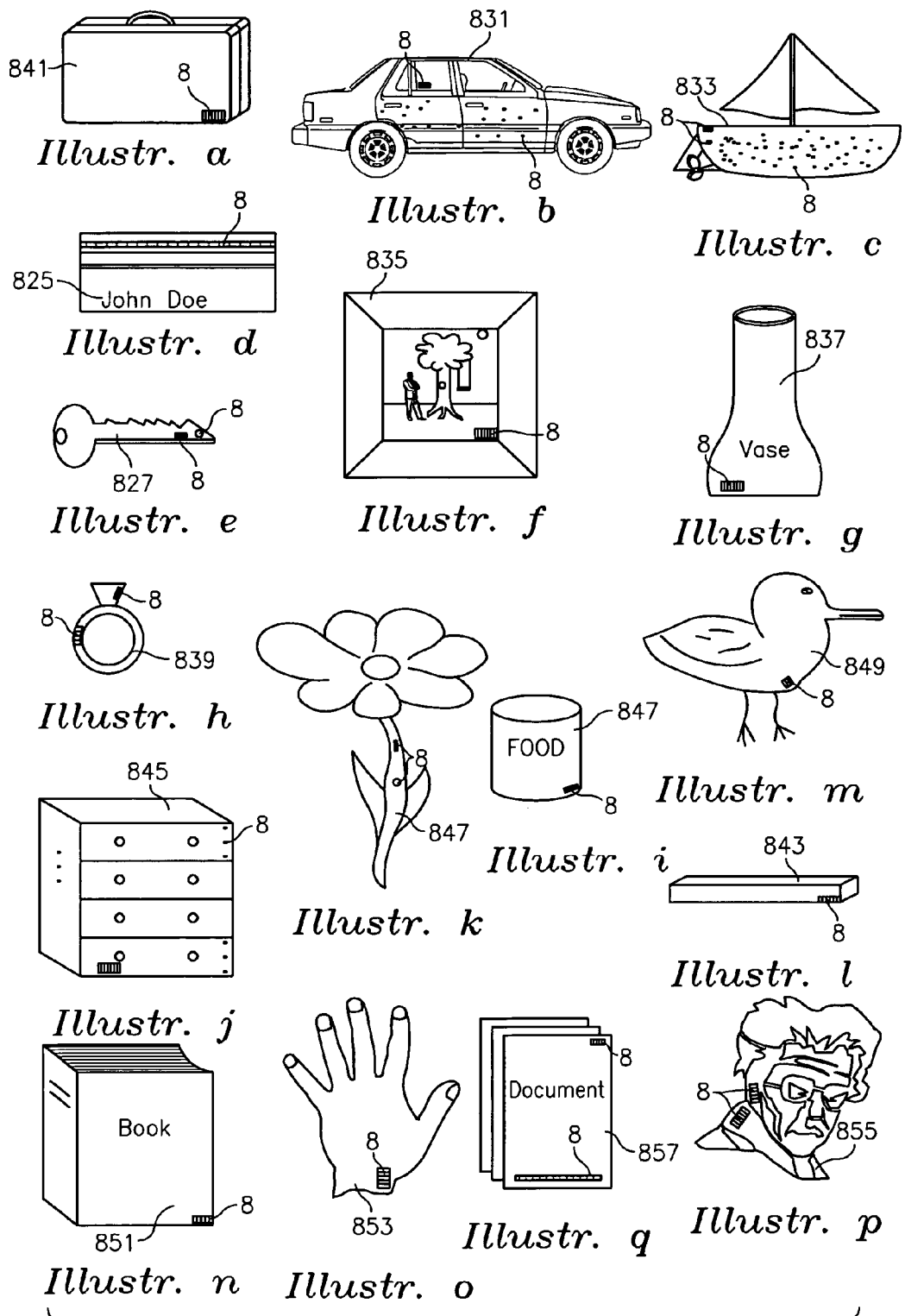

The elements can be placed in a fluid or powder and the fluid or powder is used for labeling an item. For example, the elements 8 may be mixed with paint (or other adhesive fluid) and sprayed on an item, such as a car or boat (see FIG. 7, illustrations (b) and (c)) or any other item that can be sprayed or painted. The same may be done with a dry powder that is sprayed on a newly painted or otherwise adhesive surface, or with an adhesive powder that is sprayed on a dry, or painted or adhesive surface.

Referring to FIG. 7, illustrations (a), (b), (c), (f), (g), and (h), in particular, the encoded elements 8 may be used to label large and/or valuable items such as cases 841 (e.g., suitcases, briefcases, garment bags, and the like), cars 831, boats 833, paintings 835, china 837, jewelry 839, and the like. Also, the elements 8 may be used as a way of putting the vehicle identification number (VIN) or other similar identification information in a hidden location and/or in many locations on an item that can only be read by the proper equipment. The elements 8 can be used to label photographs.

Referring to FIG. 7, illustrations (d), (e), and (r), the encoded elements 8 may also be used to label currency 829, coins, bills, or credit cards. Also, the elements 8 may be used an alternative or addition to magnetic strips currently used on many types of cards 825, e.g., access cards, key cards, ID cards, debit cards, credit cards, and the like. In addition, the elements 8 may be used as part of a key 827.

Referring to FIG. 7, illustration (i), the elements 8 may be used to label food containers 847 and the like.

Referring to FIG. 7, illustrations (j) and (l), the elements 8 may be used to label building materials 843, e.g., wood, pressboard, composite boards (e.g., made of wood, plastic, and/or metal particles), sheetrock, wallboard, wallpaper, molding, tiles and the like or other building materials. Similarly, the elements 8 may be used to label furniture or other home or office furnishings 845.

Referring to FIG. 7, illustrations (m), (o), and (p), the encoded elements 8 may be used to label any animals 849, creatures, people/humans 855, and/or plants, or parts thereof 853. Such a label could be used in addition to or instead of fingerprints, retina scans, DNA or other identification techniques or labels.

Referring to FIG. 7, illustrations (n) and (q), the encoded elements 8 may be used to label documents 857, books 851, and/or packages.

Referring to FIG. 7, illustrations (s) and (t), the encoded elements 8 may be used to label weapons, ammunition, explosive devices, guns 819, artillery, bullets 821, mortar, grenades, missiles, torpedoes, projectiles, fireworks, bombs, spacecraft, aircraft, satellites, jet engines, submarines and tanks.

Referring to FIG. 7, illustration (u), the encoded elements 8 may be used to label clothing 823, garments, uniforms, linens, leather, footware, headgear, or textiles.

Referring to FIG. 7, illustration (v), the encoded elements 8 may be used to label storage media, such as compact discs and digital video discs (DVD's), or any other devices that uses light to read information, video or audio tapes tapes, disc drives, and the like.

Figure 8:
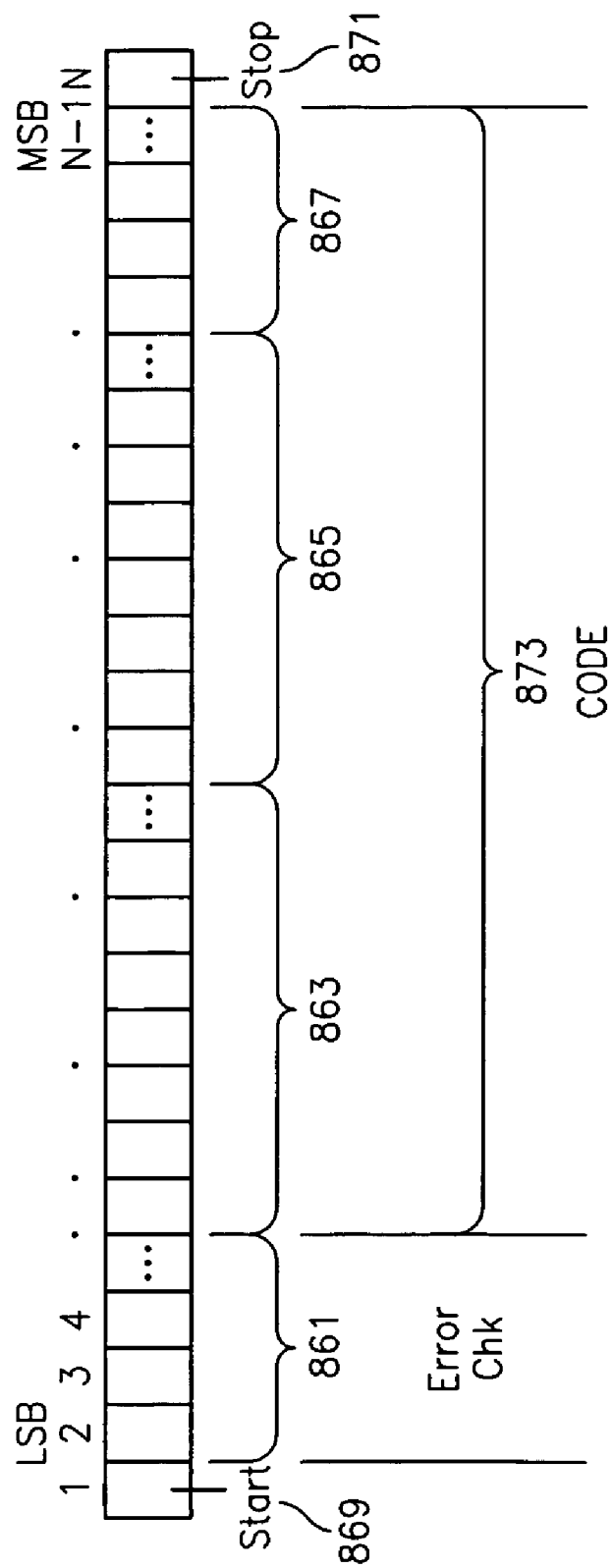
FIG. 8 shows a bit format for a code in an optical identification element, in accordance with the present invention.

Referring to FIG. 8, the code may be a simple code or may be a more complex code having many pieces of information located in the code. In addition, the code may have checks within the code to ensure the code is read correctly. It can be viewed as a serial digital message, word, or frame consisting of N bits.

In particular, there may be start and stop bits 869, 871, respectively. The start and stop bits may each take up more than one bit location if desired. In addition there may be an error check portion 861 of the message, such as a check sum or CRC (cyclic redundancy check) having a predetermined number of bits, and a code section 873 having a predetermined number of bits. The error check portion ensures that the code which is obtained from the bead is accurate. Accordingly, having a large number of bits in the element 8 allows for greater statistical accuracy in the code readout and decreases the likelihood of providing an erroneous code. Accordingly, if a code cannot be read without an error, no code will be provided, avoiding an erroneous result. Any known techniques for digital error checking for single or multi-bit errors may be used.

The code section 873 may be broken up into one or more groups of bits, for example, three bit groups 863,865,867, each bit group containing information about the bead itself or the item attached to the bead or how the bead is to be used, or other information. For example, the first bit group 863 may contain information regarding "identifying numbers", such as: lot number, quality control number, model number, serial number, inventory control number; the second bit group 865 may contain "type" information, such as: chemical or cell type, experiment type, item type, animal type; and the third bit group 867 may contain "date" information, such as: manufactured date, experiment date, creation date, initial tracking date. Any other bit groups, number of bit groups, or size of bit groups may be used if desired. Also, additional error or fault checking can be used if desired.

In particular, for a product manufacturing application, the code may have the serial number, the lot number, date of manufacture, etc. or have other information that identifies the item and/or information about the item. For a chemical or assay application, the code may have information about the chemical attached to the bead, the date and/or time of creation of the chemical or experiment, or other information of interest.

Figure 9:
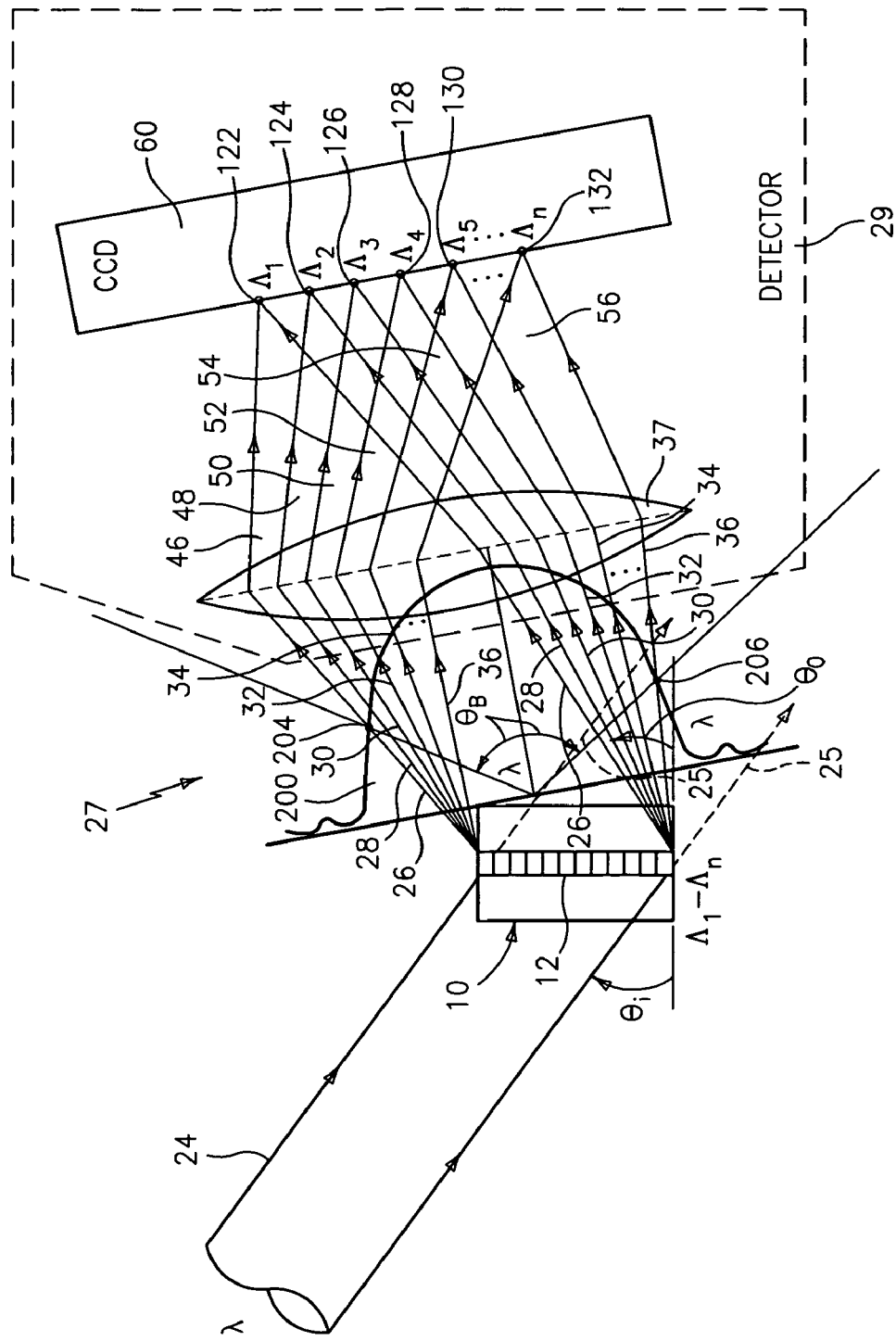
FIG. 9 is an optical schematic for reading a code in an optical identification element, in accordance with the present invention.

Referring to FIG. 9, The reflected light 27, comprises a plurality of beams 26-36 that pass through a lens 37, which provides focused light beams 46-56, respectively, which are imaged onto a CCD camera 60. The lens 37 and the camera 60, and any other necessary electronics or optics for performing the functions described herein, make up the reader 29. Instead of or in addition to the lens 37, other imaging optics may be used to provide the desired characteristics of the optical image/signal onto the camera 60 (e.g., spots, lines, circles, ovals, etc.), depending on the shape of the substrate 10 and input optical signals. Also, instead of a CCD camera other devices may be used to read/capture the output light.

Figure 10:
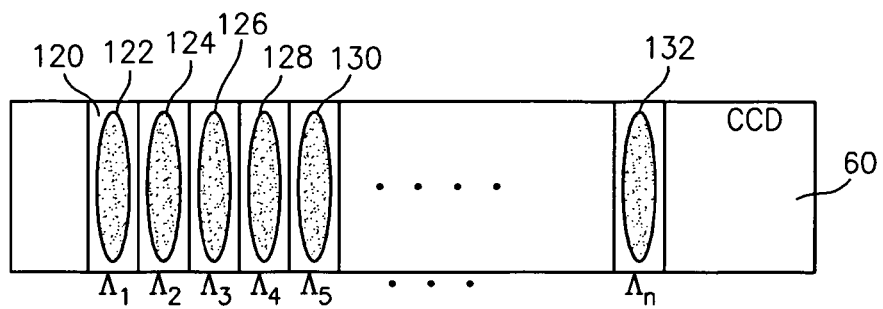
FIG. 10 is an image of a code on a CCD camera from an optical identification element, in accordance with the present invention.
Figure 11:
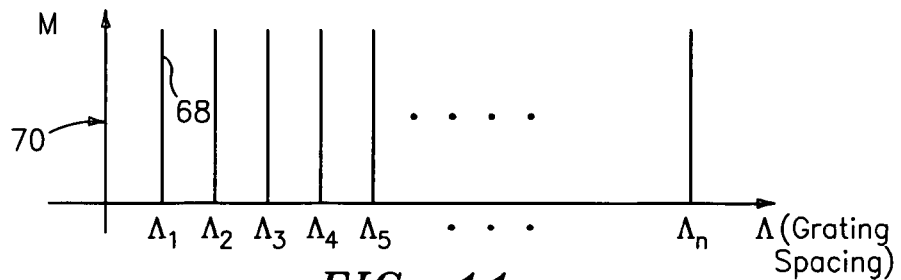
FIG. 11 is a graph showing a digital representation of bits in a code in an optical identification element, in accordance with the present invention.

Referring to FIG. 10, the image on the CCD camera 60 is a series of illuminated stripes indicating ones and zeros of a digital pattern or code of the grating 12 in the element 8. Referring to FIG. 11, lines 68 on a graph 70 are indicative of a digitized version of the image of FIG. 10 as indicated in spatial periods ($\Lambda 1$-$\Lambda n$).

Each of the individual spatial periods ($\Lambda 1$-$\Lambda n$) in the grating 12 is slightly different, thus producing an array of N unique diffraction conditions (or diffraction angles) discussed more hereinafter. When the element 8 is illuminated from the side, in the region of the grating 12, at an appropriate input angle, e.g., about 30 degrees, with a single input wavelength $\lambda$ (monochromatic) source, the diffracted (or reflected) beams 26-36 are generated. Other input angles $\theta i$ may be used if desired, depending on various design parameters as discussed herein and/or in the aforementioned patent application, and provided that a known diffraction equation (Eq. 1 below) is satisfied:

$$\sin(\theta_i)+\sin(\theta_o)=m\lambda/\Lambda \qquad \text{Eq. 1}$$

where Eq. 1 is the diffraction (or reflection or scatter) relationship between the input wavelength $\lambda$ (in free space or vacuum), input incident angle $\theta i$, output incident angle $\theta o$, and the spatial period $\Lambda$ of the grating 12. Further, m is the "order" of the reflection being observed. The value of m=1 or first order reflection is acceptable for illustrative purposes. Eq. 1 applies to light incident on outer surfaces of the substrate 10 that are parallel to the longitudinal axis of the grating (or the $k_B$ vector). It should be understood by those skilled in the art that because the angles $\theta i,\theta o$ are defined outside the substrate 10 and because the refractive index n of the substrate 10 is substantially a constant value throughout the substrate 10, the refractive index n does not appear in Eq. 1.

Thus, for a given input wavelength $\lambda$, grating spacing $\Lambda$, and incident angle of the input light $\theta i$, the angle $\theta o$ of the reflected output light may be determined. Solving Eq. 1 for $\theta o$ and plugging in m=1, gives:

$$\theta o=\sin^{-1}(\lambda/\Lambda-\sin(\theta i)) \qquad \text{Eq. 2}$$

For example, for an input wavelength $\lambda$=532 nm, a grating spacing $\Lambda$=0.532 microns (or 532 nm), and an input angle of incidence $\theta i$=30 degrees, the output angle of reflection will be $\theta o$=30 degrees. Alternatively, for an input wavelength $\lambda$=632 nm, a grating spacing Λ=0.532 microns (or 532 nm), and an input angle θi of 30 degrees, the output angle of reflection θo will be at 43.47 degrees, or for an input angle θi=36.44 degrees, the output angle of reflection will be θo=36.44 degrees. Any input angle that satisfies the design requirements discussed herein and/or in the aforementioned patent application may be used.

In addition, to have sufficient optical output power and signal to noise ratio, 20 the output light 27 should fall within an acceptable portion of the Bragg envelope (or normalized reflection efficiency envelope) curve 200, as indicated by points 204, 206, also defined as a Bragg envelope angle θB, as also discussed herein and/or in the aforementioned patent application. The curve 200 (for a planar slab geometry) may be defined as:

$$I(ki, ko) \approx [KD]^2 \text{sinc}^2 \left[ \frac{(ki-ko)D}{2} \right] \quad \text{Eq. 3}$$

where $K=2\pi\delta n/\lambda$ where, $\delta n$ is the local refractive index modulation amplitude of the grating and $\lambda$ is the input wavelength, $\text{sinc}(x)=\sin(x)/x$, and the vectors $k_i=2\pi\cos(\theta_i)/\lambda$ and $k_o=2\pi\cos(\theta_i)/\lambda$, are the projections of the incident light and the output (or reflected) light, respectively, onto the line normal to the axial direction of the grating 12 (or the grating vector $k_B$), D is the thickness or depth of the grating 12 as measured along the line (normal to the axial direction of the grating 12). While Eq. 3 is specific to a planar slab geometry, other grating geometries, such as a cylinder (or other shapes) may be used and will exhibit a similar Bragg envelope response curve. We have found that a value for $\delta n$ of about $10^{-4}$ in the grating region of the substrate is acceptable; however, other values may be used if desired.

Rewriting Eq. 3 gives the reflection efficiency profile of the Bragg envelope as:

$$I(ki, ko) \approx \left[ \frac{2\pi \cdot \delta n \cdot D}{\lambda} \right]^2 \left[ \frac{\text{Sin}(x)}{x} \right]^2 \quad \text{Eq. 4}$$

where: $x = (ki-ko)D/2 = (\pi D/\lambda) * (\cos\theta i - \cos\theta o)$

Thus, when the input angle θi is equal to the output (or reflected) angle $\theta_o$ (i.e., θi=$\theta_o$), the reflection efficiency I (Eqs. 3 & 4) is maximized, which is at the center or peak of the Bragg envelope. When θi=θo, the input light angle is referred to as the Bragg angle as is known. The efficiency decreases for other input and output angles (i.e., θi ≠$\theta_o$), as defined by Eqs. 3 & 4. Thus, for maximum reflection efficiency and thus output light power, for a given grating pitch Λ and input wavelength, the angle θi of the input light 24 should be set so that the angle θo of the reflected output light equals the input angle θi.

Also, as the thickness or diameter D of the grating decreases, the width of the sin(x)/x function (and thus the width of the Bragg envelope) increases and, the coefficient to or amplitude of the sinc$^2$ (or (sin(x)/x)$^2$) function (and thus the efficiency level across the Bragg envelope) also increases, and vice versa. Further, as the wavelength λ. increases, the half-width of the Bragg envelope as well as the efficiency level across the Bragg envelope both decrease. Thus, there is a trade-off between the brightness of an individual bit and the number of bits available under the Bragg envelope. Ideally, δn should be made as large as possible to maximize the brightness, which allows D to be made smaller.

From Eq. 3 and 4, the half-angle of the Bragg envelope $\theta_B$ is defined as:

$$\theta_B = \frac{\eta\lambda}{\pi D \sin(\theta_i)} \quad \text{Eq. 5}$$

where η is a reflection efficiency factor which is the value for x in the sinc$^2$(x) function where the value of sinc$^2$(x) has decreased to a predetermined value from the maximum amplitude as indicated by points 204, 206 on the curve 200.

We have found that the reflection efficiency is acceptable when η≦1.39. This value for η corresponds to when the amplitude of the reflected beam (i.e., from the sinc$^2$(x) function of Eqs. 3 & 4) has decayed to about 50% of its peak value. In particular, when x=1.39=η, sinc$^2$(x)=0.5. However, other values for efficiency thresholds or factor in the Bragg envelope may be used if desired.

The beams 26-36 are imaged onto the CCD camera 60 to produce the pattern of light and dark regions 120-132 representing a digital (or binary) code, where light=1 and dark=0 (or vice versa). The digital code may be generated by selectively creating individual index variations (or individual gratings) with the desired spatial periods Λ1-Λn. Other illumination, readout techniques, types of gratings, geometries, materials, etc. may be used as discussed in the aforementioned patent application.

Figure 12:
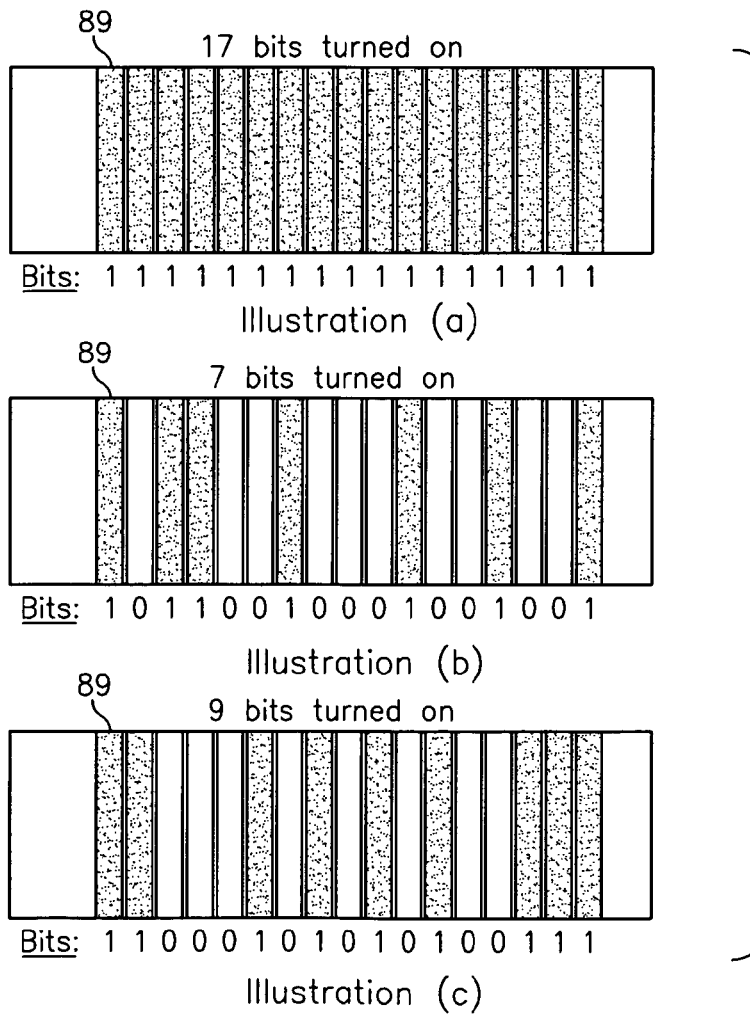
FIG. 12 illustrations (a)-(c) show images of digital codes on a CCD camera, in accordance with the present invention.

Referring to FIG. 12, illustrations (a)-(c), for the grating 12 in a cylindrical substrate 10 having a sample spectral 17 bit code (i.e., 17 different pitches Λ1-Λ17), the corresponding image on the CCD (Charge Coupled Device) camera 60 is shown for a digital pattern of 7 bits 89 turned on(10110010001001001); 9 bits 89 turned on of(11000101010100111); all 17 bits 89 turned on of (11111111111111111)

For the images in FIG. 12, the length of the substrate 10 was 450 microns, the outer diameter D1 was 65 microns, the inner diameter D was 14 microns, δn for the grating 12 was about $10^{-4}$, n1 in portion 20 was about 1.458 (at a wavelength of about 1550 nm), n2 in portion 18 was about 1.453, the average pitch spacing Λ for the grating 12 was about 0.542 microns, and the spacing between pitches ΔΛ was about 0.36% of the adjacent pitches Λ.

Figure 13:
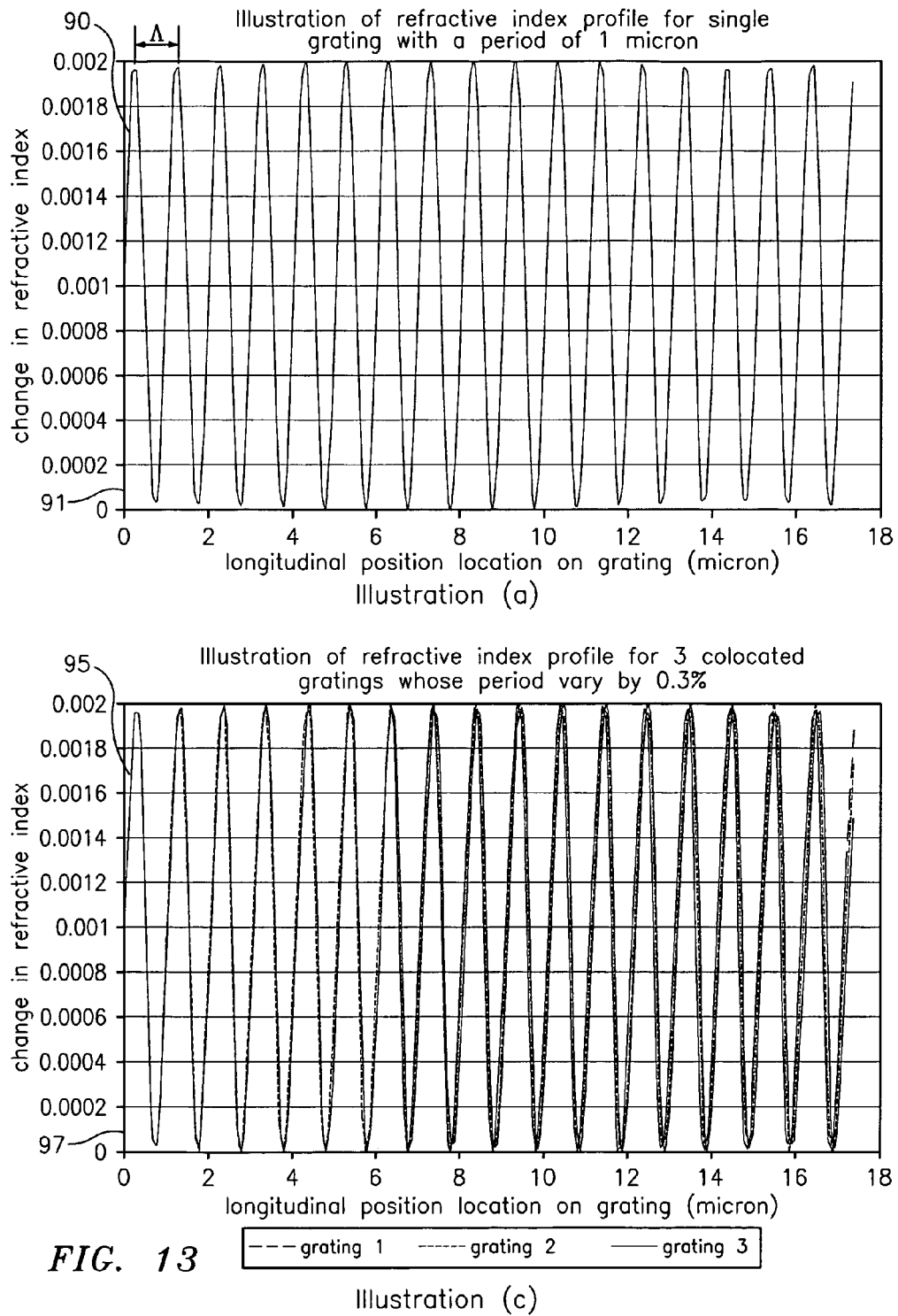
FIG. 13 illustrations (a)-(d) show graphs of different refractive index pitches and a summation graph, in accordance with the present invention.

Referring to FIG. 13, illustration (a), the pitch Λ of an individual grating is the axial spatial period of the sinusoidal variation in the refractive index n1 in the region 20 of the substrate 10 along the axial length of the grating 12 as indicated by a curve 90 on a graph 91. Referring to FIG. 13, illustration (b), a sample composite grating 12 comprises three individual gratings that are co-located on the substrate 10, each individual grating having slightly different pitches, Λ1, Λ2, Λ3, respectively, and the difference (or spacing) ΔΛ between each pitch Λ being about 3.0% of the period of an adjacent pitch Λ as indicated by a series of curves 92 on a graph 94. Referring to FIG. 13, illustration (c), three individual gratings, each having slightly different pitches, Λ1, Λ2, Λ3, respectively, are shown, the difference ΔΛ between each pitch Λ being about 0.3% of the pitch Λ of the adjacent pitch as shown by a series of curves 95 on a graph 97. The individual gratings in FIG. 13, illustrations (b) and (c) are shown to all start at 0 for illustration purposes; however, it should be understood that, the separate gratings need not all start in phase with each other. Referring to FIG. 13, illustration (d), the overlapping of the individual sinusoidal refractive index variation pitches Λ1-Λn in the grating region 20 of the substrate 10, produces a combined resultant refractive index variation in the composite grating 12 shown as a curve 96 on a graph 98 representing the combination of the three pitches shown in FIG. 13, illustration (b). Accordingly, the resultant refractive index variation in the grating region 20 of the substrate 10 may not be sinusoidal and is a combination of the individual pitches Λ (or index variation).

The maximum number of resolvable bits N, which is equal to the number of different grating pitches Λ (and hence the number of codes), that can be accurately read (or resolved) using side-illumination and side-reading of the grating 12 in the substrate 10, is determined by numerous factors, including: the beam width w incident on the substrate (and the corresponding substrate length L and grating length Lg), the thickness or diameter D of the grating 12, the wavelength λ of incident light, the beam divergence angle $\theta_R$, and the width of the Bragg envelope $\theta_B$ (discussed more in the aforementioned patent application), and may be determined by the equation:

$$N \cong \frac{\eta \beta L}{2D \sin(\theta_i)}$$ Eq. 6

Figure 14:
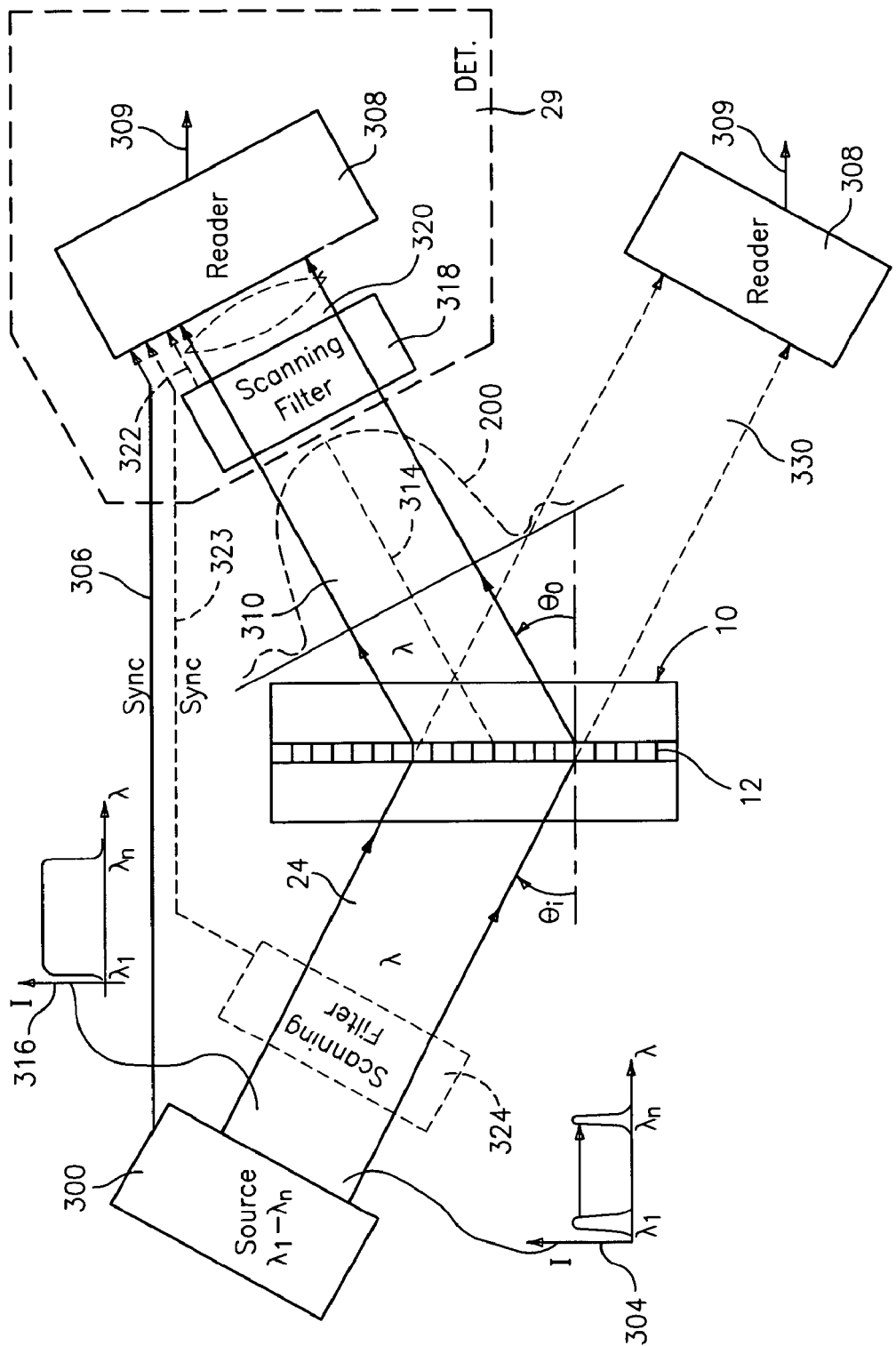
FIG. 14 is an alternative optical schematic for reading a code in an optical identification element, in accordance with the present invention.

Referring to FIG. 14, instead of having the input light 24 at a single wavelength λ (monochromatic) and reading the bits by the angle θo of the output light, the bits (or grating pitches Λ) may be read/detected by providing a plurality of wavelengths and reading the wavelength spectrum of the reflected output light signal. In this case, there would be one bit per wavelength, and thus, the code is contained in the wavelength information of the reflected output signal.

In this case, each bit (or Λ) is defined by whether its corresponding wavelength falls within the Bragg envelope, not by its angular position within the Bragg envelope 200. As a result, it is not limited by the number of angles that can fit in the Bragg envelope 200 for a given composite grating 12, as in the embodiment discussed hereinbefore. Thus, using multiple wavelengths, the only limitation in the number of bits N is the maximum number of grating pitches Λ that can be superimposed and optically distinguished in wavelength space for the output beam.

Figure 15:
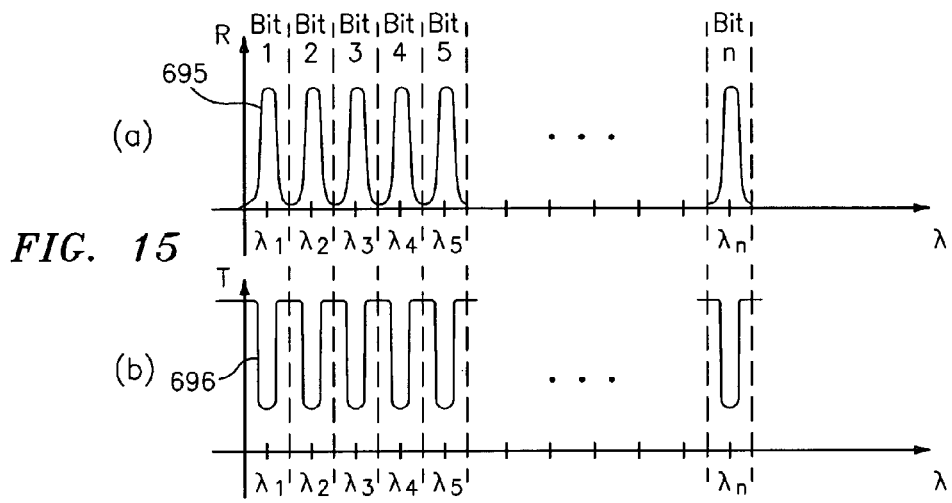
FIG. 15 illustrations (a)-(b) are graphs of reflection and transmission wavelength spectrum for an optical identification element, in accordance with the present invention.

Referring to FIGS. 14 and 15, illustration (a), the reflection wavelength spectrum (λ1-λn) of the reflected output beam 310 will exhibit a series of reflection peaks 695, each appearing at the same output Bragg angle θo. Each wavelength peak 695 (λ1-λn) corresponds to an associated spatial period (Λ1-Λn), which make up the grating 12.

One way to measure the bits in wavelength space is to have the input light angle θi equal to the output light angle θo, which is kept at a constant value, and to provide an input wavelength λ that satisfies the diffraction condition (Eq. 1) for each grating pitch Λ. This will maximize the optical power of the output signal for each pitch Λ detected in the grating 12.

Referring to 15, illustration (b), the transmission wavelength spectrum of the transmitted output beam 330 (which is transmitted straight through the grating 12) will exhibit a series of notches (or dark spots) 696. Alternatively, instead of detecting the reflected output light 310, the transmitted light 330 may be detected at the detector/reader 308. It should be understood that the optical signal levels for the reflection peaks 695 and transmission notches 696 will depend on the "strength" of the grating 12, i.e., the magnitude of the index variation n in the grating 12.

In FIG. 14, the bits may be detected by continuously scanning the input wavelength. A known optical source 300 provides the input light signal 24 of a coherent scanned wavelength input light shown as a graph 304. The source 300 provides a sync signal on a line 306 to a known reader 308. The sync signal may be a timed pulse or a voltage ramped signal, which is indicative of the wavelength being provided as the input light 24 to the substrate 10 at any given time. The reader 308 may be a photodiode, CCD camera, or other optical detection device that detects when an optical signal is present and provides an output signal on a line 309 indicative of the code in the substrate 10 or of the wavelengths present in the output light, which is directly related to the code, as discussed herein. The grating 12 reflects the input light 24 and provides an output light signal 310 to the reader 308. The wavelength of the input signal is set such that the reflected output light 310 will be substantially in the center 314 of the Bragg envelope 200 for the individual grating pitch (or bit) being read.

Alternatively, the source 300 may provide a continuous broadband wavelength input signal such as that shown as a graph 316. In that case, the reflected output beam 310 signal is provided to a narrow band scanning filter 318 which scans across the desired range of wavelengths and provides a filtered output optical signal 320 to the reader 308. The filter 318 provides a sync signal on a line 322 to the reader, which is indicative of which wavelengths are being provided on the output signal 320 to the reader and may be similar to the sync signal discussed hereinbefore on the line 306 from the source 300. In this case, the source 300 does not need to provide a sync signal because the input optical signal 24 is continuous. Alternatively, instead of having the scanning filter being located in the path of the output beam 310, the scanning filter may be located in the path of the input beam 24 as indicated by the dashed box 324, which provides the sync signal on a line 323.

Alternatively, instead of the scanning filters 318,324, the reader 308 may be a known optical spectrometer (such as a known spectrum analyzer), capable of measuring the wavelength of the output light.

The desired values for the input wavelengths λ (or wavelength range) for the input signal 24 from the source 300 may be determined from the Bragg condition of Eq. 1, for a given grating spacing Λ and equal angles for the input light θi and the angle light θo. Solving Eq. 1 for λ and plugging in m=1, gives:

$$\lambda = \Lambda[\sin(\theta o) + \sin(\theta i)]$$ Eq. 7

It is also possible to combine the angular-based code detection with the wavelength-based code detection, both discussed hereinbefore. In this case, each readout wavelength is associated with a predetermined number of bits within the Bragg envelope. Bits (or grating pitches Λ) written for different wavelengths do not show up unless the correct wavelength is used.

Accordingly, the bits (or grating pitches Λ) can be read using one wavelength and many angles, many wavelengths and one angle, or many wavelengths and many angles.

Figure 16:
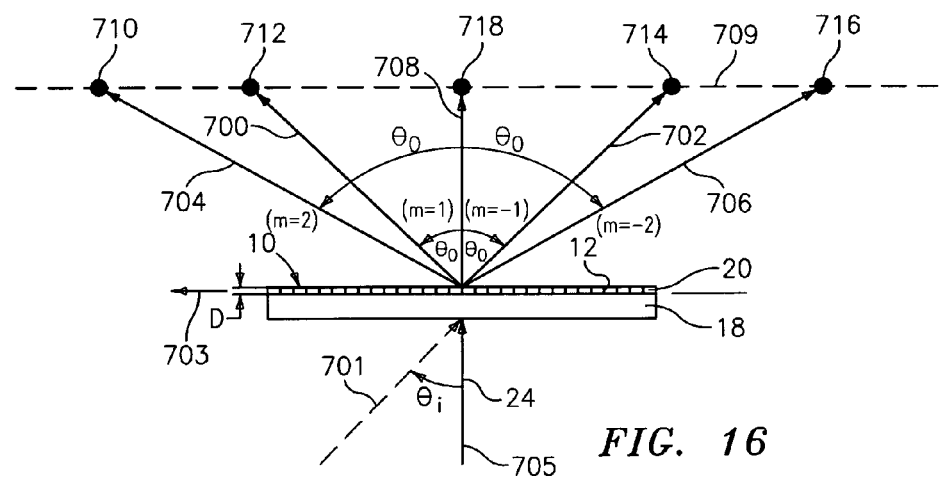
FIGS. 16-17 are side views of a thin grating for an optical identification element, in accordance with the present invention.

Referring to FIG. 16, the grating 12 may have a thickness or depth D which is comparable or smaller than the incident beam wavelength λ. This is known as a "thin" diffraction grating (or the full angle Bragg envelope is 180 degrees). In that case, the half-angle Bragg envelope θB is substantially 90 degrees; however, δ must be made large enough to provide sufficient reflection efficiency, per Eqs. 3 and 4. In particular, for a "thin" grating, $D*\delta n \approx \lambda/2$, which corresponds to a π phase shift between adjacent minimum and maximum refractive index values of the grating 12.

It should be understood that there is still a trade-off discussed hereinbefore with beam divergence angle $\theta_R$ and the incident beam width (or length L of the substrate), but the accessible angular space is theoretically now 90 degrees. Also, for maximum efficiency, the phase shift between adjacent minimum and maximum refractive index values of the grating 12 should approach a π phase shift; however, other phase shifts may be used.

In this case, rather than having the input light 24 coming in at the conventional Bragg input angle θi, as discussed hereinbefore and indicated by a dashed line 701, the grating 12 is illuminated with the input light 24 oriented on a line 705 orthogonal to the longitudinal grating vector 703. The input beam 24 will split into two (or more) beams of equal amplitude, where the exit angle $θ_o$ can be determined from Eq. 1 with the input angle $θ_i$=0 (normal to the longitudinal axis of the grating 12).

In particular, from Eq. 1, for a given grating pitch Λ1, the +/−1st order beams (m=+1 and m=−1), corresponds to output beams 700, 702, respectively. For the +/−2nd order beams (m=+2 and m=−2), corresponds to output beams 704, 706, respectively. The $0^{th}$ order (undiffracted) beam (m=0), corresponds to beam 708 and passes straight through the substrate. The output beams 700-708 project spectral spots or peaks 710-718, respectively, along a common plane, shown from the side by a line 709, which is parallel to the upper surface of the substrate 10.

For example, for a grating pitch Λ=1.0 um, and an input wavelength λ=400 nm, the exit angles $θ_o$ are ~+/−23.6 degrees (for m=+/−1), and +/−53.1 degrees (from m=+/−2), from Eq. 1. It should be understood that for certain wavelengths, certain orders (e.g., m=+/−2) may be reflected back toward the input side or otherwise not detectable at the output side of the grating 12.

Alternatively, one can use only the +/−$1^{st}$ order (m=+/−1) output beams for the code, in which case there would be only 2 peaks to detect, 712, 714. Alternatively, one can also use any one or more pairs from any order output beam that is capable of being detected. Alternatively, instead of using a pair of output peaks for a given order, an individual peak may be used.

Figure 17:
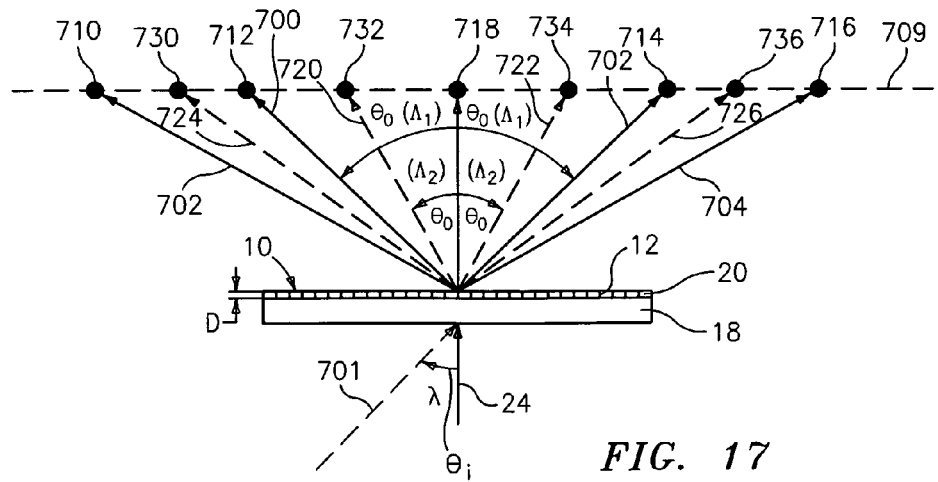

Referring to FIG. 17, if two pitches Λ1, Λ2 exist in the grating 12, two sets of peaks will exist. In particular, for a second grating pitch Λ2, the +/−1st order beams (m=+1 and m=−1), corresponds to output beams 720,722, respectively. For the +/−2nd order beams (m+2 and m=−2), corresponds to output beams 724,726, respectively. The $0^{th}$ order (undiffracted) beam (m=0), corresponds to beam 718 and passes straight through the substrate. The output beams 720-726 corresponding to the second pitch Λ2 project spectral spots or peaks 730-736, respectively, which are at a different location than the point 710-716, but along the same common plane, shown from the side by the line 709.

Thus, for a given pitch Λ (or bit) in a grating, a set of spectral peaks will appear at a specific location in space. Thus, each different pitch corresponds to a different elevation or output angle which corresponds to a predetermined set of spectral peaks. Accordingly, the presence or absence of a particular peak or set of spectral peaks defines the code.

In general, if the angle of the grating 12 is not properly aligned with respect to the mechanical longitudinal axis of the substrate 10, the readout angles may no longer be symmetric, leading to possible difficulties in readout. With a thin grating, the angular sensitivity to the alignment of the longitudinal axis of the substrate 10 to the input angle θi of incident radiation is reduced or eliminated. In particular, the input light can be oriented along substantially any angle θi with respect to the grating 12 without causing output signal degradation, due the large Bragg angle envelope. Also, if the incident beam 24 is normal to the substrate 10, the grating 12 can be oriented at any rotational (or azimuthal) angle without causing output signal degradation. However, in each of these cases, changing the incident angle θi will affect the output angle θo of the reflected light in a predetermined predictable way, thereby allowing for accurate output code signal detection or compensation.

Referring to FIG. 18, for a thin grating, in addition to multiplexing in the elevation or output angle based on grating pitch Λ, the bits can also be multiplexed in an azimuthal (or rotational) angle θa of the substrate. In particular, a plurality of gratings 750,752,754,756 each having the same pitch Λ are disposed in a surface 701 of the substrate 10 and located in the plane of the substrate surface 701. The input light 24 is incident on all the gratings 750,752,754,756 simultaneously. Each of the gratings provides output beams oriented based on the grating orientation. For example, the grating 750 provides the output beams 764,762, the grating 752 provides the output beams 766,768, the grating 754 provides the output beams 770,772, and the grating 756 provides the output beams 774, 776. Each of the output beams provides spectral peaks or spots (similar to that discussed hereinbefore), which are located in a plane 760 that is parallel to the substrate surface plane 701. In this case, a single grating pitch Λ can produce many bits depending on the number of gratings that can be placed at different azimuthal (rotational) angles on the surface of the substrate 10 and the number of output beam spectral peaks that can be spatially and optically resolved/detected. Each bit may be viewed as the presence or absence of a pair of peaks located at a predetermined location in space in the plane 760. Note that this example uses only the m=+/−$1^{st}$ order for each reflected output beam. Alternatively, the detection may also use the m=+/−2nd order. In that case, there would be two additional output beams and peaks (not shown) for each grating (as discussed hereinbefore) that may lie in the same plane as the plane 760 and may be on a concentric circle outside the circle 760.

In addition, the azimuthal multiplexing can be combined with the elevation or output angle multiplexing discussed hereinbefore to provide two levels of multiplexing. Accordingly, for a thin grating, the number of bits can be multiplexed based on the number of grating pitches Λ and/or geometrically by the orientation of the grating pitches.

Furthermore, if the input light angle θi is normal to the substrate 10, the edges of the substrate 10 no longer scatter light from the incident angle into the "code angular space", as discussed herein and/or in the aforementioned patent application.

Also, in the thin grating geometry, a continuous broadband wavelength source may be used as the optical source if desired.

Referring to FIG. 19, instead of or in addition to the pitches Λ in the grating 12 being oriented normal to the longitudinal axis, the pitches may be created at a angle θg. In that case, when the input light 24 is incident normal to the surface 792, will produce a reflected output beam 790 having an angle θo determined by Eq. 1 as adjusted for the blaze angle θg. This can provide another level of multiplexing bits in the code.

Figure 20:
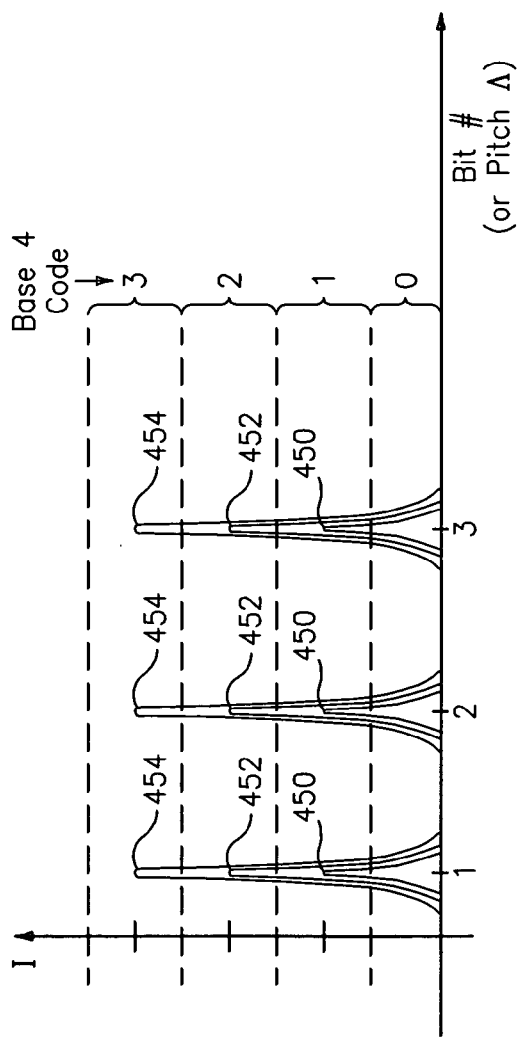
FIG. 20 is a graph of a plurality of states for each bit in a code for an optical identification element, in accordance with the present invention.

Referring to FIG. 20, instead of using an optical binary (0-1) code, an additional level of multiplexing may be provided by having the optical code use other numerical bases, if intensity levels of each bit are used to indicate code information. This could be achieved by having a corresponding magnitude (or strength) of the refractive index change (δn) for each grating pitch Λ. Four intensity ranges are shown for each bit number or pitch Λ, providing for a Base-4 code (where each bit corresponds to 0,1,2, or 3). The lowest intensity level, corresponding to a 0, would exist when this pitch Λ is not present in the grating 12. The next intensity level 450 would occur when a first low level δn1 exists in the grating that provides an output signal within the intensity range corresponding to a 1. The next intensity level 452 would occur when a second higher level δn2 exists in the grating 12 that provides an output signal within the intensity range corresponding to a 2. The next intensity level 454, would occur when a third higher level δn3 exists in the grating 12 that provides an output signal within the intensity range corresponding to a 3.

Figure 21:
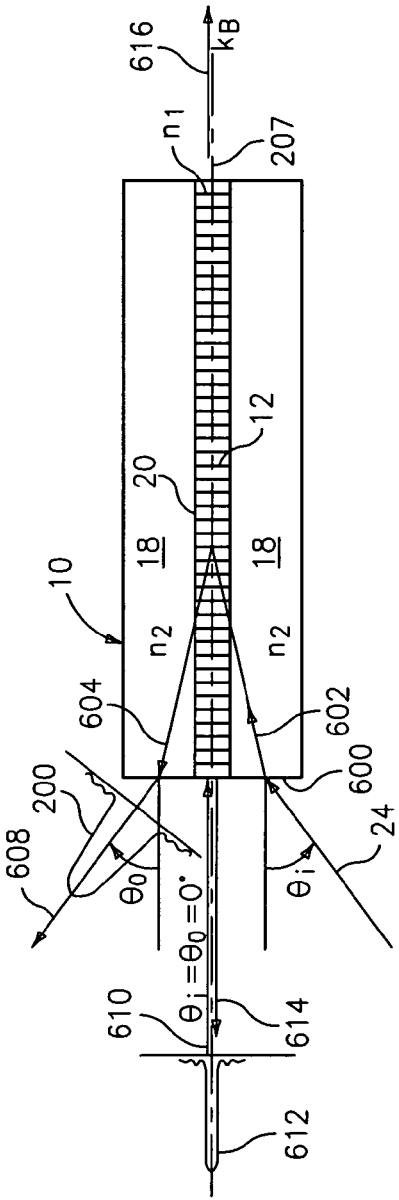
FIG. 21 is a side view of an optical identification element where light is incident on an end face, in accordance with the present invention.

Referring to FIG. 21, the input light 24 may be incident on the substrate 10 on an end face 600 of the substrate 10. In that case, the input light 24 will be incident on the grating 12 having a more significant component of the light (as compared to side illumination discussed hereinbefore) along the longitudinal grating axis 207 of the grating (along the grating vector $k_B$), as shown by a line 602. The light 602 reflects off the grating 12 as indicated by a line 604 and exits the substrate as output light 608. Accordingly, it should be understood by one skilled in the art that the diffraction equations discussed hereinbefore regarding output diffraction angle θo also apply in this case except that the reference axis would now be the grating axis 207. Thus, in this case, the input and output light angles θi,θo, would be measured from the grating axis 207 and length Lg of the grating 12 would become the thickness or depth D of the grating 12. As a result, a grating 12 that is 400 microns long, would result in the Bragg envelope 200 being narrow. It should be understood that because the values of n1 and n2 are close to the same value, the slight angle changes of the light between the regions 18,20 are not shown herein.

In the case where incident light 610 is incident along the same direction as the grating vector (Kb) 207, i.e., θi=0 degrees, the incident light sees the whole length Lg of the grating 12 and the grating provides a reflected output light angle θo=0 degrees, and the Bragg envelope 612 becomes extremely narrow, as the narrowing effect discussed above reaches a limit. In that case, the relationship between a given pitch Λ in the grating 12 and the wavelength of reflection λ is governed by a known "Bragg grating" relation:

$$\lambda = 2n_{eff}\Lambda \qquad \text{Eq. 8}$$

where $n_{eff}$ is the effective index of refraction of the substrate, λ is the input (and output wavelength) in free space (or vacuum) and Λ is the pitch. This relation, as is known, may be derived from Eq. 1 where θi=θo=90 degrees.

In that case, the code information is readable only in the spectral wavelength of the reflected beam, similar to that discussed hereinbefore for wavelength based code reading. Accordingly, the input signal in this case may be a scanned wavelength source or a broadband wavelength source. In addition, as discussed hereinbefore for wavelength based code reading, the code information may be obtained in reflection from the reflected beam 614 or in transmission by the transmitted beam 616 that passes through the grating 12.

It should be understood that for shapes of the substrate 10 or element 8 other than a cylinder, the effect of various different shapes on the propagation of input light through the element 8, substrate 10, and/or grating 12, and the associated reflection angles, can be determined using known optical physics including Snell's Law, shown below:

$$n_{in} \sin \theta in = n_{out} \sin \theta out \qquad \text{Eq. 9}$$

where $n_{in}$ is the refractive index of the first (input) medium, and $n_{out}$ is the refractive index of the second (output) medium, and θin and θout are measured from a line 620 normal to an incident surface 622.

Figures 22, 23:
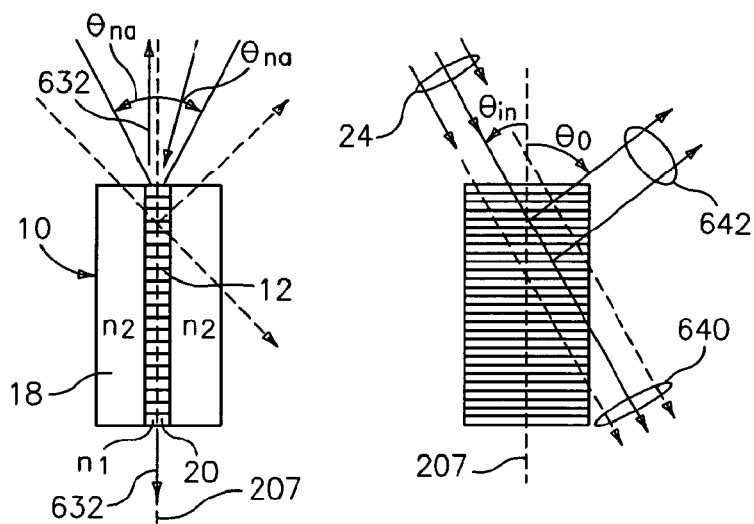
FIGS. 22-23 are side views of an optical identification element where light is incident on an end face, in accordance with the present invention.

Referring to FIG. 22, if the value of n1 in the grating region 20 is greater than the value of n2 in the non-grating region 18, the grating region 20 of the substrate 10 will act as a known optical waveguide for certain wavelengths. In that case, the grating region 20 acts as a "core" along which light is guided and the outer region 18 acts as a "cladding" which helps confine or guide the light. Also, such a waveguide will have a known "numerical aperture" (θna) that will allow light that is within the aperture θna to be directed or guided along the grating axis 207 and reflected axially off the grating 12 and returned and guided along the waveguide. In that case, the grating 12 will reflect light having the appropriate wavelengths related to the pitches Λ present in the grating 12 (as defined in Eq. 8) back along the region 20 (or core) of the waveguide, and will pass the remaining wavelengths of light as the light 632. Thus, having the grating region 20 act as an optical waveguide for wavelengths reflected by the grating 12 allows incident light that is not aligned exactly with the grating axis 207 to be guided along and aligned with the grating 12 axis 207 for optimal grating reflection.

If an optical waveguide is used any standard waveguide may be used, e.g., a 20 standard telecommunication single mode optical fiber (125 micron diameter or 80 micron diameter fiber with about a 8-10 micron diameter), or a larger diameter waveguide (greater than 0.5 mm diameter), such as is describe in U.S. patent application, Ser. No. 09/455,868, filed Dec. 6, 1999, entitled "Large Diameter Waveguide, Grating". Further, any type of optical waveguide may be used for the optical substrate 10, such as, a multi-mode, birefringent, polarization maintaining, polarizing, multi-core, multi-cladding, or microstructured optical waveguide, or a flat or planar waveguide (where the waveguide is rectangular shaped), or other waveguides.

Referring to FIG. 23, if the grating 12 extends across the entire dimension D of the substrate, the substrate 10 does not behave as a waveguide for the incident or reflected light and the incident light 24 will be diffracted (or reflected) as indicated by lines 642, and the codes detected as discussed hereinbefore for the end-incidence condition discussed hereinbefore with FIG. 21, and the remaining light 640 passes straight through.

Figure 24:
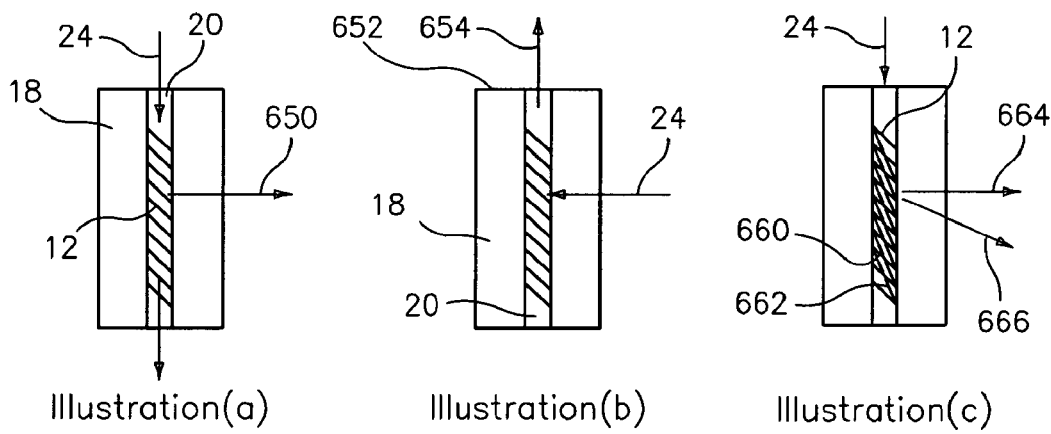
FIGS. 24, illustrations (a)-(c) are side views of an optical identification element having a blazed grating, in accordance with the present invention.

Referring to FIG. 24, illustrations (a)-(c), in illustration (a), for the end illumination condition, if a blazed or angled grating is used, as discussed hereinbefore, the input light 24 is coupled out of the substrate 10 at a known angle as shown by a line 650. Referring to FIG. 24, illustration (b), alternatively, the input light 24 may be incident from the side and, if the grating 12 has the appropriate blaze angle, the reflected light will exit from the end face 652 as indicated by a line 654. Referring to FIG. 24, illustration (c), the grating 12 may have a plurality of different pitch angles 660,662, which reflect the input light 24 to different output angles as indicated by lines 664, 666. This provides another level of multiplexing (spatially) additional codes, if desired.

The grating 12 may be impressed in the substrate 10 by any technique for writing, impressed, embedded, imprinted, or otherwise forming a diffraction grating in the volume of or on a surface of a substrate 10. Examples of some known techniques are described in U.S. Pat. Nos. 4,725,110 and 4,807,950, entitled "Method for Impressing Gratings Within Fiber Optics", to Glenn et al; and U.S. Pat. No. 5,388,173, entitled "Method and Apparatus for Forming Aperiodic Gratings in Optical Fibers", to Glenn, respectively, and U.S. Pat. No. 5,367,588, entitled "Method of Fabricating Bragg Gratings Using a Silica Glass Phase Grating Mask and Mask Used by Same", to Hill, and U.S. Pat. No. 3,916,182, entitled "Periodic Dielectric Waveguide Filter", Dabby et al, and U.S. Pat.

No. 3,891,302, entitled "Method of Filtering Modes in Optical Waveguides", to Dabby et al, which are all incorporated herein by reference to the extent necessary to understand the present invention.

Alternatively, instead of the grating 12 being impressed within the substrate material, the grating 12 may be partially or totally created by etching or otherwise altering the outer surface geometry of the substrate to create a corrugated or varying surface geometry of the substrate, such as is described in U.S. Pat. No. 3,891,302, entitled "Method of Filtering Modes in Optical Waveguides", to Dabby et al, which is incorporated herein by reference to the extent necessary to understand the present invention, provided the resultant optical refractive profile for the desired code is created.

Further, alternatively, the grating 12 may be made by depositing dielectric layers onto the substrate, similar to the way a known thin film filter is created, so as to create the desired resultant optical refractive profile for the desired code.

The substrate 10 (and/or the element 8) may have end-view cross-sectional shapes other than circular, such as square, rectangular, elliptical, clam-shell, D-shaped, or other shapes, and may have side-view sectional shapes other than rectangular, such as circular, square, elliptical, clam-shell, D-shaped, or other shapes. Also, 3D geometries other than a cylinder may be used, such as a sphere, a cube, a pyramid or any other 3D shape. Alternatively, the substrate 10 may have a geometry that is a combination of one or more of the foregoing shapes.

The shape of the element 8 and the size of the incident beam may be made to minimize any end scatter off the end face(s) of the element 8, as is discussed herein and/or in the aforementioned patent application. Accordingly, to minimize such scatter, the incident beam 24 may be oval shaped where the narrow portion of the oval is smaller than the diameter D1, and the long portion of the oval is smaller than the length L of the element 8. Alternatively, the shape of the end faces may be rounded or other shapes or may be coated with an antireflective coating.

It should be understood that the size of any given dimension for the region 20 of the grating 12 may be less than any corresponding dimension of the substrate 10. For example, if the grating 12 has dimensions of length Lg, depth Dg, and width Wg, and the substrate 12 has different dimensions of length L, depth D, and width W, the dimensions of the grating 12 may be less than that of the substrate 12. Thus, the grating 12, may be embedded within or part of a much larger substrate 12. Also, the element 8 may be embedded or formed in or on a larger object for identification of the object.

The dimensions, geometries, materials, and material properties of the substrate 10 are selected such that the desired optical and material properties are met for a given application. The resolution and range for the optical codes are scalable by controlling these parameters as discussed herein and/or in the aforementioned patent application.

Referring to FIG. 25, the substrate 10 may have an outer coating 799, such as a polymer or other material that may be dissimilar to the material of the substrate 10, provided that the coating 799 on at least a portion of the substrate, allows sufficient light to pass through the substrate for adequate optical detection of the code. The coating 799 may be on any one or more sides of the substrate 10. Also, the coating 799 may be a material that causes the element 8 to float or sink in certain fluids (liquid and/or gas) solutions.

Also, the substrate 10 may be made of a material that is less dense than certain fluid (liquids and/or gas) solutions, thereby allowing the elements 8 to float or be buoyant or partially buoyant. Also, the substrate may be made of a porous material, such as controlled pore glass (CPG) or other porous material, which may also reduce the density of the element 8 and may make the element 8 buoyant or partially-buoyant in certain fluids.

Figure 26:
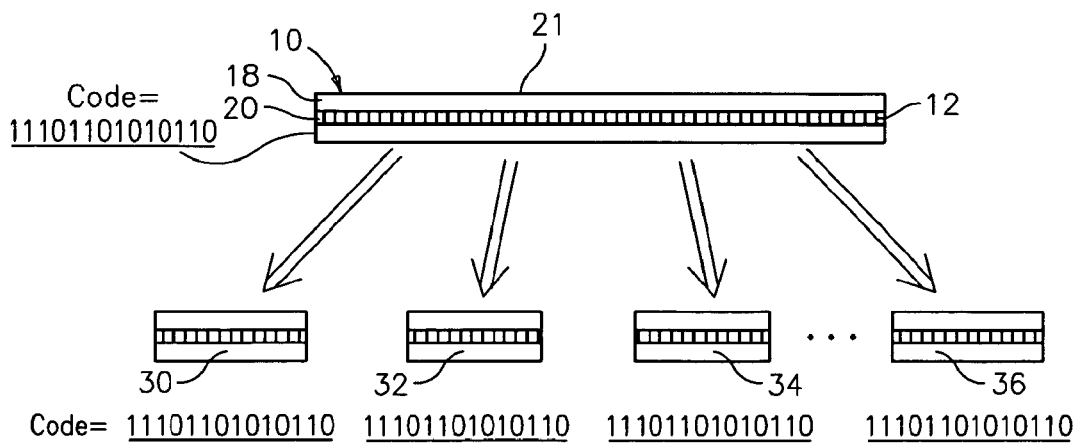
FIG. 26 is a side view of whole and partitioned optical identification element, in accordance with the present invention.

Referring to FIG. 26, the grating 12 is axially spatially invariant. As a result, the substrate 10 with the grating 12 (shown as a long substrate 21) may be axially subdivided or cut into many separate smaller substrates 30-36 and each substrate 30-36 will contain the same code as the longer substrate 21 had before it was cut. The limit on the size of the smaller substrates 30-36 is based on design and performance factors discussed herein and/or in the aforementioned patent application.

Referring to FIG. 27, one purpose of the outer region 18 (or region without the grating 12) of the substrate 10 is to provide mechanical or structural support for the inner grating region 20. Accordingly, the entire substrate 10 may comprise the grating 12, if desired. Alternatively, the support portion may be completely or partially beneath, above, or along one or more sides of the grating region 20, such as in a planar geometry, or a D-shaped geometry, or other geometries, as described herein and/or in the aforementioned patent application. The non-grating portion 18 of the substrate 10 may be used for other purposes as well, such as optical lensing effects or other effects (discussed herein or in the aforementioned patent application). Also, the end faces of the substrate 10 need not be perpendicular to the sides or parallel to each other. However, for applications where the elements 8 are stacked end-to-end, the packing density may be optimized if the end faces are perpendicular to the sides.

Referring to FIG. 28, illustrations (a)-(c), two or more substrates 10,250, each having at least one grating therein, may be attached together to form the element 8, e.g., by an adhesive, fusing or other attachment techniques. In that case, the gratings 12,252 may have the same or different codes.

Referring to FIG. 29, illustrations (a) and (b), the substrate 10 may have multiple regions 80,90 and one or more of these regions may have gratings in them. For example, there may be gratings 12,252 side-by-side (illustration (a)), or there may be gratings 82-88, spaced end-to-end (illustration (b)) in the substrate 10.

Referring to FIG. 30, the length L of the element 8 may be shorter than its diameter D, thus, having a geometry such as a plug, puck, wafer, disc or plate.

Referring to FIG. 31, to facilitate proper alignment of the grating axis with the angle θi of the input beam 24, the substrate 10 may have a plurality of the gratings 12 having the same codes written therein at numerous different angular or rotational (or azimuthal) positions of the substrate 10. In particular, two gratings 550, 552, having axial grating axes 551, 553, respectively may have a common central (or pivot or rotational) point where the two axes 551,553 intersect. The angle θi of the incident light 24 is aligned properly with the grating 550 and is not aligned with the grating 552, such that output light 555 is reflected off the grating 550 and light 557 passes through the grating 550 as discussed herein. If the element 8 is rotated as shown by the arrows 559, the angle θi of incident light 24 will become aligned properly with the grating 552 and not aligned with the grating 550 such that output light 555 is reflected off the grating 552 and light 557 passes through the grating 552. When multiple gratings are located in this rotational orientation, the bead may be rotated as indicated by a line 559 and there may be many angular positions that will provide correct (or optimal) incident input angles θi to the grating. While this example shows a circular cross-section, this technique may be used with any shape cross-section.

Figure 32:
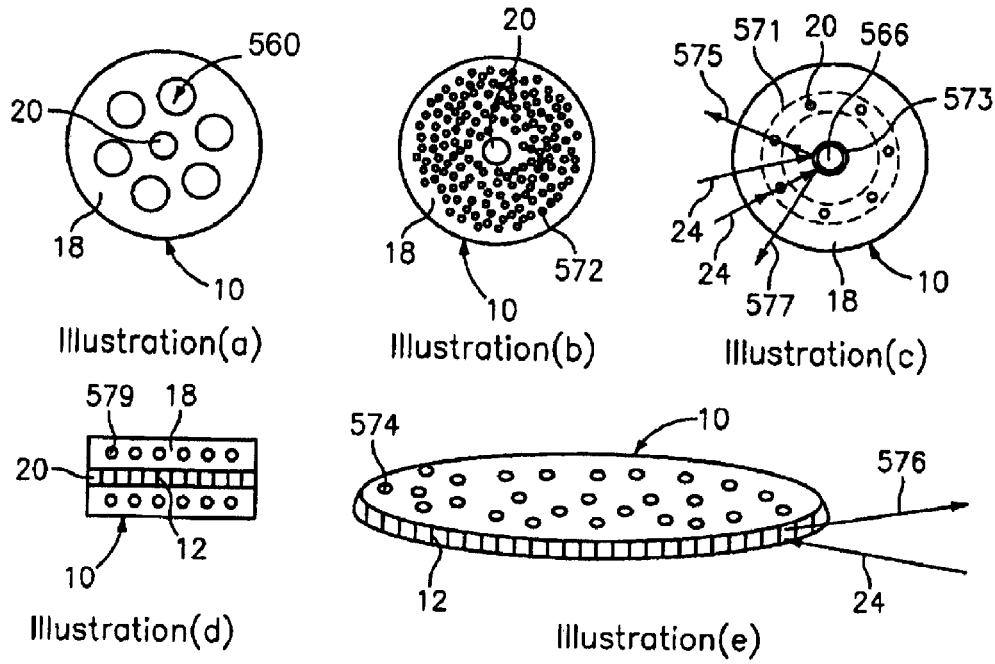
FIG. 32 illustrations (a)-(e) show various geometries of an optical identification element that may have holes therein, in accordance with the present invention.

Referring to FIG. 32, illustrations (a), (b), (c), (d), and (e) the substrate 10 may have one or more holes located within the substrate 10. In illustration (a), holes 565 may be located at various points along all or a portion of the length of the substrate 10. The holes need not pass all the way through the substrate 10. Any number, size and spacing for the holes 560 may be used if desired. In illustration (b), holes 572 may be located very close together to form a honeycomb-like area of all or a portion of the cross-section. In illustration (c), one (or more) inner hole 566 may be located in the center of the substrate 10 or anywhere inside of where the grating region(s) 20 are located. The inner hole 566 may be coated with a reflective coating 573 to reflect light to facilitate reading of one or more of the gratings 12 and/or to reflect light diffracted off one or more of the gratings 12. The incident light 24 may reflect off the grating 12 in the region 20 and then reflect off the surface 573 to provide output light 577. Alternatively, the incident light 24 may reflect off the surface 573, then reflect off the grating 12 and provide the output light 575. In that case the grating region 20 may run axially or circumferentially 571 around the substrate 10. In illustration (d), the holes 579 may be located circumferentially around the grating region 20 or transversely across the substrate 10. In illustration (e), the grating 12 may be located circumferentially 576 around the outside of the substrate 10, and there may be holes 574 inside the substrate 10.

Figure 33:
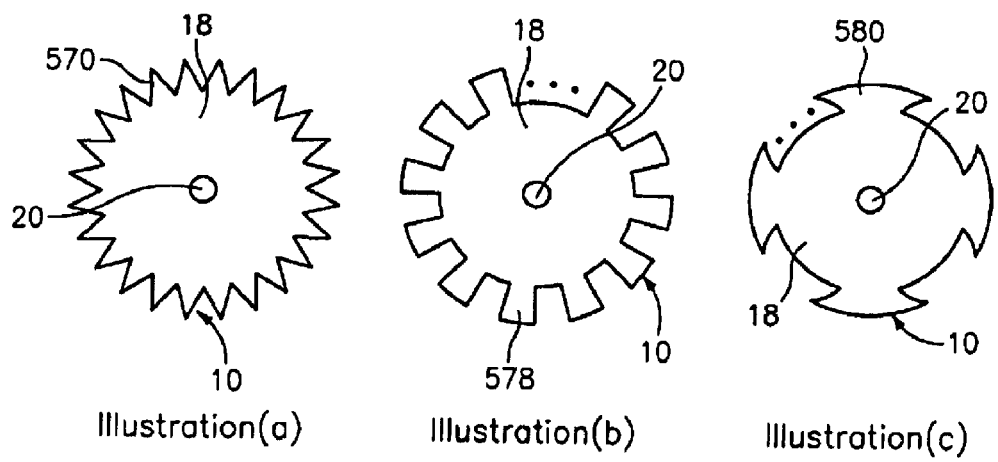
FIG. 33 illustrations (a)-(c) show various geometries of an optical identification element that may have teeth thereon, in accordance with the present invention.

Referring to FIG. 33, illustrations (a), (b), and (c), the substrate 10 may have one or more protruding portions or teeth 570, 578,580 extending radially and/or circumferentially from the substrate 10. Alternatively, the teeth 570, 578, 580 may have any other desired shape.

Figure 34:
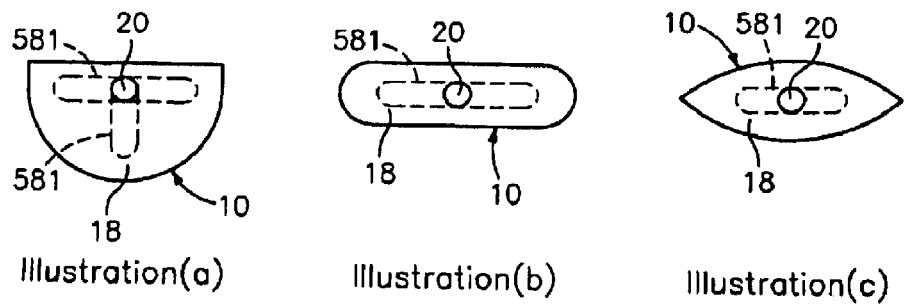
FIG. 34 illustrations (a)-(c) show various geometries of an optical identification element, in accordance with the present invention.

Referring to FIG. 34, illustrations (a), (b), (c) a D-shaped substrate, a flat-sided substrate and an eye-shaped (or clamshell or teardrop shaped) substrate 10, respectively, are shown. Also, the grating region 20 may have end cross-sectional shapes other than circular and may have side cross-sectional shapes other than rectangular, such as any of the geometries described herein for the substrate 10. For example, the grating region 20 may have a oval cross-sectional shape as shown by dashed lines 581, which may be oriented in a desired direction, consistent with the teachings herein. Any other geometries and dimensions for the substrate 10 or the grating region 20 may be used if desired, as described herein. For example, other dimensions that we have found useful are D1=about 25-30 microns, and D=about 6-8 microns and length L=about 230-260 microns. Any other dimensions may be used if desired, provided it meets the performance requirements of the application.

Referring to FIG. 35, at least a portion of a side of the substrate 10 may be coated with a reflective coating 514 to allow incident light 510 to be reflected back to the same side from which the incident light came, as indicated by reflected light 512.

Referring to FIG. 36, illustrations (a) and (b), alternatively, the substrate 10 can be electrically and/or magnetically polarized, by a dopant or coating, which may be used to ease handling and/or alignment or orientation of the substrate 10 and/or the grating 12, or used for other purposes. Alternatively, the bead may be coated with conductive material, e.g., metal coating on the inside of a holey substrate, or metallic dopant inside the substrate. In these cases, such materials can cause the substrate 10 to align in an electric or magnetic field. Alternatively, the substrate can be doped with an element or compound that fluoresces or glows under appropriate illumination, e.g., a rare earth dopant, such as Erbium, or other rare earth dopant or fluorescent or luminescent molecule. In that case, such fluorescence or luminescence may aid in locating and/or aligning substrates.

Referring to FIGS. 37-40, in addition, the elements 8 may be used to label drugs, or other medical, pharmaceutical, health care or cosmetics products, and/or the packages or containers they are supplied with (as used herein, the term "drug" shall include such products). Such labeling can provide product identification at the pill (or liquid) level or package/container level, which provides traceability of these products to their manufacturer, thereby reducing counterfeit products in the marketplace.

Figure 37:
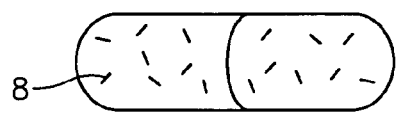
FIGS. 37-43 show various embodiments for using the present invention for labeling drugs or packages associated therewith, in accordance with the present invention.
Figure 38:

Referring to FIG. 37, 38, one or more beads 8 can be located inside and/or on the outer surface of a pill or capsule 900, e.g., a solid/powder pill or a liquid/gel/fluid pill. The beads 8 may be inserted into the manufacturing process for the pill 900 at a convenient point in the process, such as when the pill 900 is in a wet or dry granular stage in the process.

Figure 39:
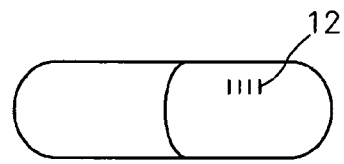
Figure 40:
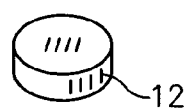

Referring to FIGS. 39, 40, alternatively, the grating 12 itself may be embedded or written directly into the outer surface or coating of the pills 900, e.g., by photo-imprinting the grating 12 directly into the surface coating material. In that case, there may be in a membrane or coating surrounding part or all of the pill, or in the case of a capsule-type pill, the diffraction grating 12 may be disposed directly in the casing of the capsule. Also, the coating or casing would have the necessary material properties, such as photosensitivity, to allow the grating 12 to be imprinted therein. Material properties are described in copending US patent application, publication number: WO 2004/025559; PCT/US 03/28874 (CV-0038A) and WO 2004/025344 A1; PCT/US 03/28890 (CV-0044) and techniques for photo-imprinting are described in US patent application, publication number; WO 2004/025344 A1; PCT/US 03/028890 (CV-0044) which is incorporated herein by reference in its entirety.

Figure 41:
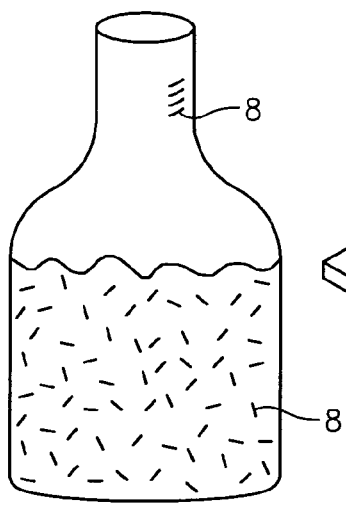

Referring to FIG. 41, alternatively, the beads 8 may be disposed within a liquid medicine 902 contained in a container 904.

Figure 42:
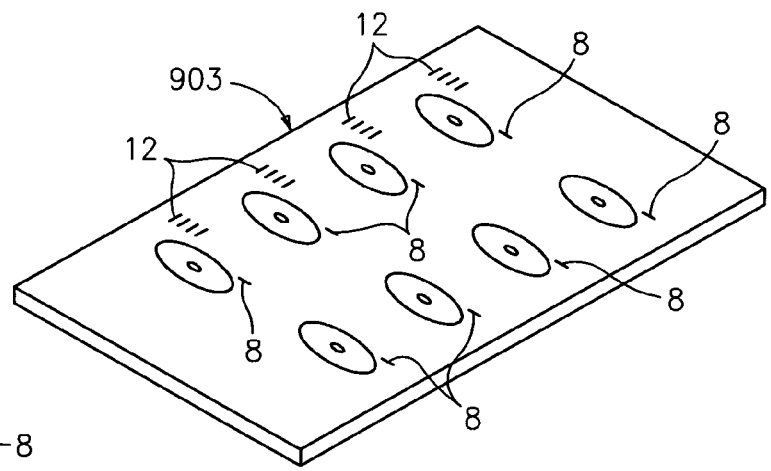
Figure 43:
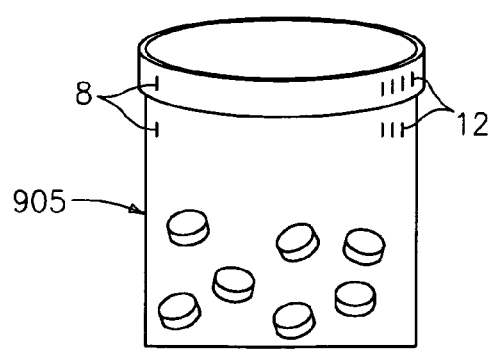

Referring to FIGS. 42, 43, alternatively, one or more of the beads 8 may be placed within the material of a container/package 903, 904 for the pills 900, such as a blister pack 903 (FIG. 42), a pill bottle 905 (FIG. 43), or a liquid medicine container 904 (FIG. 41), or other pill container/package. In that case, the beads 8 may be disposed on or in the container/package material or the grating 12 itself may be embedded directly into the container/package material, e.g., by photo-imprinting the grating 12 directly into the container/package material.

For any of the embodiments herein, if the beads 8 or gratings 12 are disposed against or near a surface that is reflective to the incident light, the codes in the beads 8 or gratings 12 may be read in reflection. For example, in the case of the blister pack 903, a reflective under surface (or coating or backing) 906 may be used. Aluminum foil is commonly used as a backing for blister packs to hold the pills 900 in the blistered/bubbled sections 905 of the package 903, which may be used as a reflective surface. In that case, the beads 8 or grating 12 may be placed within the clear plastic material above the reflective backing, thereby allowing the beads 8 or grating 12 to be read in reflection from the upper surface.

Alternatively, the beads 8 may be coated with a material that reduces interaction with the body, or that allows a human or animal to ingest the beads 8 and pass them through urine or stool or allows the beads 8 to be injected into the body or blood stream and monitored. Alternatively, the beads 8 may be of a material that is chewable or dissolves in the body or made of a material that will not harm the body.

In the case where beads 8 are embedded in the item, the beads can be identified by destroying the item or a portion thereof to obtain the beads 8. For example, in the case of a pill 900, the pill 900 may be placed in a solution that dissolves the pill 900 but does not dissolve the beads 8. For example, for glass beads 8, hot sulfuric acid or other acid may be used to dissolve the pill 900 but will not harm the beads 8. For beads 8 made of other materials, such as polymers, hot water or other solutions may be used to dissolve the pill 900. Once the pill 900 has been dissolved, the liquid containing the dissolved pill 900 and the beads 8 may be pipetted into a bead reader to read the bead codes, such as that described in US patent applications, publication numbers: WO 2004/025559; PCT/US 03/28874 (CV-0038A), WO 2004/024328; PCT/US 03/28862 (CV-0042), WO 2004/066210; PCT/US 04/01685 (CV-0054), and WO 2005/033681; PCT/US 04/032084 (CV-0092), which are all incorporated herein by reference in their entirety. However, any type of reader capable of reading the beads 8 may be used. Alternatively, the liquid may be poured through a filter or screen to isolate the beads 8 then put into a bead reader to read the bead codes.

Referring to FIGS. 44-54 and 44A and 51A, the elements 8 may be embedded into a film (or coating, wrapping, sheet, tape, or the like) 910. In that case, the film 910 would be made of any material that is substantially transparent to the wavelength of incident light used to read the code in the element 8, sufficient to allow the optical code signal to be detected. Some examples are polymers or plastics, but any other material may be used that meets the functional requirements described herein. In that case, the elements 8 would lay substantially flat. The liquid film material may be applied (e.g., by spreading, spraying, extruding, or any other application technique) onto a surface and the elements 8 applied into the liquid and/or the elements 8 may be pre-mixed into the liquid prior to being applied to the surface. The surface may be a final surface to be coated or an intermediate surface from which the film is removed and stored or rolled for later use.

Referring to FIG. 44, the elements 8 may have a random orientation in the film 910. Referring to FIGS. 44A, 45, 46, alternatively, the elements 8 may be aligned in the film 910 along one or more axes along straight lines or curved lines or grid-like, or have any 1-dimensional or 2-dimensional random or non-random pattern or shape, such as those patterns shown in FIG. 45.

Alignment of the elements 8 may be achieved using vibration, pressure waves, acoustic waves, air movement, electric or magnetic fields, and/or centripetal force, when the film 910 is in liquid form prior to curing. In particular, the underlying surface may be disposed on a vibration or shaker table which oscillates back and forth thereby creating a standing wave in the liquid along which the elements 8 will align along a predetermined axis. One technique for bead alignment and or movement is described in copending patent applications Ser. Nos. 60/610,910 and 60/610,833, both filed Sep. 17, 2004, referenced herein and incorporated by reference.

Alternatively, a cover sheet or plate may be placed on the surface of the film and pressure waves created along the liquid film, similar to that discussed in the copending patent applications Ser. Nos. 60/610,910 and 60/610,833, both filed Sep. 17, 2004. referenced herein and incorporated by reference. Alternatively, a pulsed or continuous air stream may be blown across the surface of the liquid, creating a standing wave in the liquid along which the elements 8 will align. Alternatively, for elements 8 having an electric and/or magnetic polarization, as discussed herein with FIG. 36 and/or in the aforementioned patent applications, the elements 8 may be aligned using an electric and/or magnetic field applied across the liquid. Alternatively, centripetal force may be used to align the elements 8 by spinning the surface in a predeteremined direction.

Referring to FIG. 46, the elements 8 may be aligned by using physical mechanical alignment such as grooves (or corrugations or ripples or lines or walls) 912 in the surface of the underlying material 914. In that case, the elements 8 would be laid on the grooved surface would fall into and align along the grooves, and then the coating 916 would be applied over the elements and grooves. Alternatively, the elements 8 may be applied to the material after the coating 916 is applied and the elements 8 would settle into the grooves. The longitudinal axis of the grooves 912 may run along straight lines or curved lines or grid-like, or have any 1-dimensional or 2-dimensional predetermined or random pattern or shape. Some non-limiting examples of groove patterns are shown in FIG. 45, any other patterns may be used if desired. Also, these patterns may be on separate sheets or on one sheet or overlapping or spatially separated. For two-dimensional patterns, the elements 8 may lay in the outline of the pattern or fill in all or any portion of the pattern.

Figure 48:
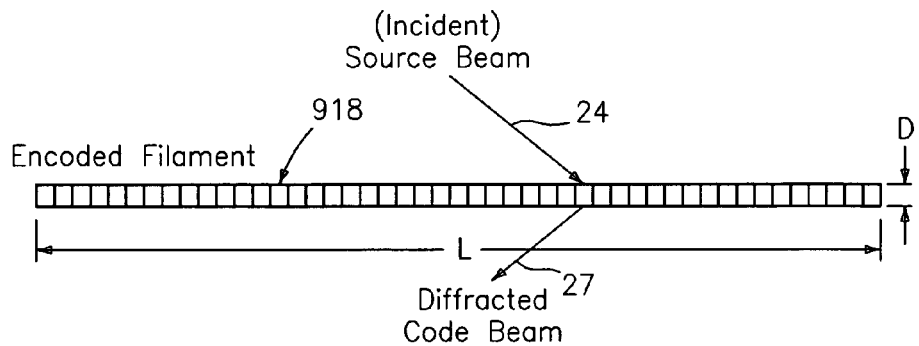

Referring to FIG. 48, the length of the elements 8 are determined by the application. For example, the elements 8 may be particle size (e.g., less than about 1000 microns in length and less than about 1000 microns in diameter), or longer filaments or thread 918 having a length L longer than about 1000 microns and a diameter or thickness D less than about 250 microns.

Referring to FIG. 44A, alternatively, if the elements 8 are filaments 918, the filaments 918 may be held in tension in parallel to create alignment and the coating 916 may be applied to the filaments and, after the coating 916 hardens, the tension may be removed and the filaments will be aligned within the coating.

The patterns discussed herein may be partially or completely made from encoded optical identification elements 8 having a particle size or a longer filament length or a combination of both. The maximum number of bits for each code increases as the length of the filament increases as discussed herein and/or in the copending patent application, publication number: WO 2004/025559; PCT/US 03/28874 (CV-0038A).

Referring to FIGS. 51, 51A, 52, 53, alternatively, the elements 8 may be pre-aligned on or within a substantially transparent adhesive film or adhesive tape 920, similar to standard transparent adhesive tape 920. In that case, the tape 920 may be rolled on itself as shown by a roll (or reel or spool) 922 and then a predetermined amount of tape removed from the roll and adhered to a desired item or package. The film 920 may be made if any material that is substantially transparent to the wavelength of incident light used to read the code in the element 8, sufficient to allow the optical code signal to be detected.

The underlying item or package to which the transparent film/tape 920 is applied may be made of a material that is substantially transparent to the wavelength of incident light used to read the code in the element 8, sufficient to allow the optical code signal to be detected. In that case, the code may be read in transmission, i.e., the incident light on one side of the element and code beam and detector on the other side. However, if the underlying surface material is not sufficiently transparent to read the code in transmission, the code may be read in reflection. In that case, the surface of the underlying material would be made of a material that reflects the diffracted incident light sufficient to allow the code to be detected from the same side as the incident light (discussed more hereinafter).

Also, instead of or in addition to disposing the elements 8 in the film 910, the film may have the diffraction grating 12 disposed directly in or on the film 910. In that case, the diffraction grating 12 would have an orientation and length/dimensions as desired.

Referring to FIG. 47, also, the elements 8 may be mixed with a liquid carrier or resin 926 which may applied to an item 924 to be labeled. The liquid carrier 926 with the elements 8 located therein may be applied using markers, pens, brushes, air brushes, liquid brushes, fluid brushes, injection molding, extrusion or any other device or technique that allows the liquid and beads to be applied. The elements 8 may be used or applied in a spot or coverage area 928 having a predetermined size and geometry using a substantially transparent carrier material that is applied to the surface of the item 924.

Figure 50:
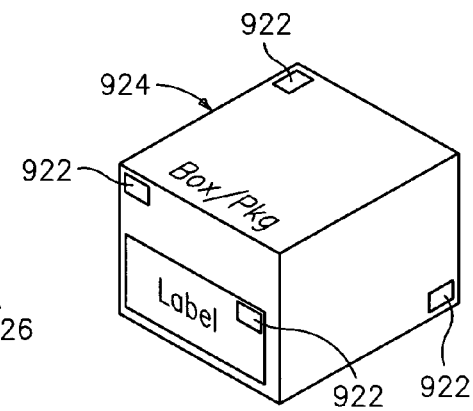

Referring to FIG. 50, the elements 8 may also be used on labels to authenticate a label, e.g., on a box, package, container, document, product, or the like. In that case, any of the techniques discussed herein may be used to apply the elements to the label. It may be used on any kind of label including bar code labels. The elements 8 may also be used on or within seals and shrink-wraps.

The elements 8 may be used in compound resins (such as acrylic, polypropylene, polycarbonate, polyethelene, polystyrene, and the like) as well as plastic resins. Also, the elements 8 can be incorporated into pulp during paper manufacturing processes.

Figure 49:
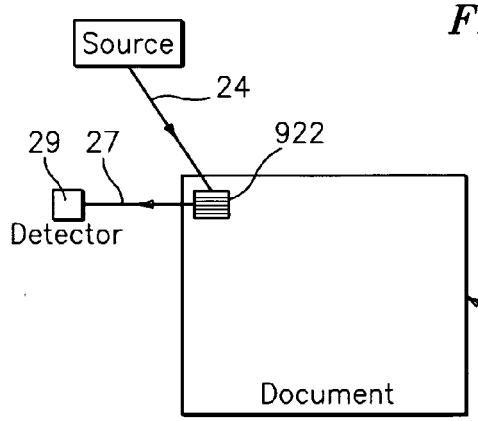
FIGS. 49 and 50 show various embodiments for using the present invention for labeling an item, in accordance with the present invention.

Referring to FIGS. 49 and 50, a piece of the tape 920 can be applied to the surface of the parcel or item 924, 926 and used as a tag 922. Also, the tape 920 can be designed to make it very difficult to find if the location of the tag 922 was not already known, e.g., for a transparent tag. Since both the tape and the encoded filaments within the tape may be transparent to the naked eye and could be made small (1 mm×1 mm) it may be very difficult to locate the tag 922 by eye. Any other size may be used if desired. Once located, the tag 922 would require a special reader to interrogate the code. The tag 922 could be laminated over with any transparent material to ensure that it could not be easily removed once affixed. other size may be used if desired. Once located, the tag 922 would require a special reader to interrogate the code. The tag 922 could be laminated over with any transparent material to ensure that it could not be easily removed once affixed.

Figure 51:
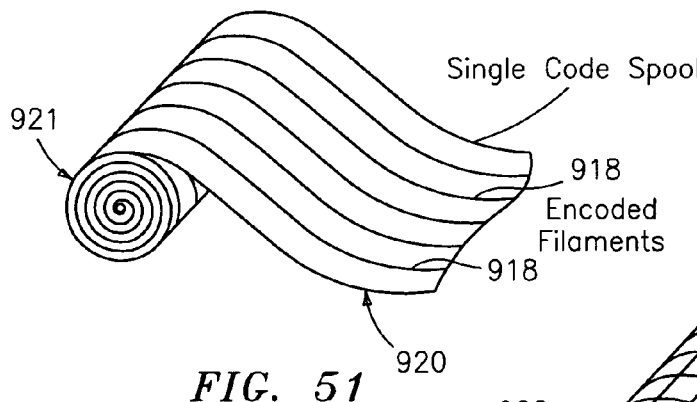
FIGS. 51, 51A, 52, and 53 show various embodiments of encoded tape or film, in accordance with the present invention.
Figure 51A:
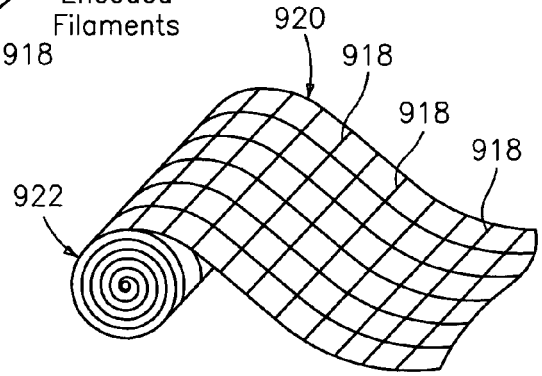
Figure 52:
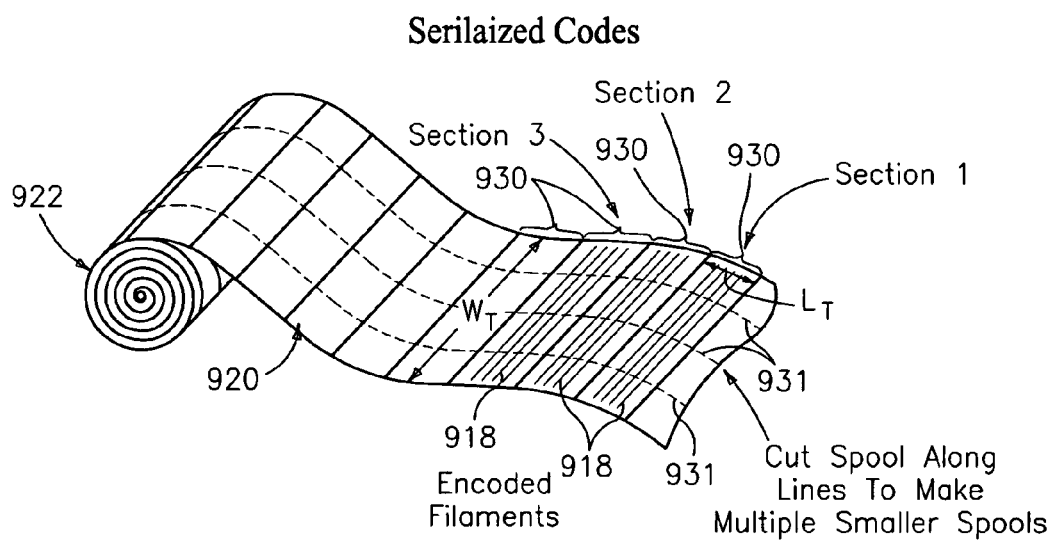
Figure 53:
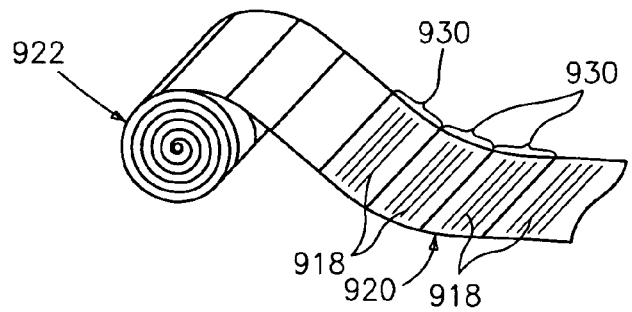

Referring to FIG. 52, the filaments 918 may be embedded perpendicular to the longitudinal axis of the tape 920 to produce a roll or spool 922 of the tape 920 with a series of sections 930 having serialized codes, wherein a given section 930 of predetermined length Lt and width Wt would contain a set of filaments all with the same code. Each of the sections 930 may contain a set of filaments each having a different code. Referring to FIG. 52, to fabricate a large number of such spools, the spool 922 of the tape 920 could be cut along the dashed lines 931 into smaller width spools as shown in FIG. 53. Referring to FIG. 51, if a single spool 922 with the same code is desired, the encoded filaments 918 could be arranged parallel to the longitudinal axis of the tape 920. Referring to FIG. 51A, it is also possible to make the tape roll 920 where the encoded filaments 918 are arranged in multiple orientations, such as parallel, perpendicular, and/or at 45 degrees or any other angular orientations. In that case, the filaments 918 may be laid on top of each other in the various orientations (see FIG. 51A) or on separate areas or portions of the tape 920 or a combination of each.

The codes can be sectioned and segmented however desired. Also, within a section 930 of the tape 920, there may be redundant filaments with the same code for authentication, validation and/or error checking purposes.

The above discussion regarding the tape 920 using elements 8 as filaments may also be used with the elements 8 having a particle size if desired or a combination of each.

Figure 54:
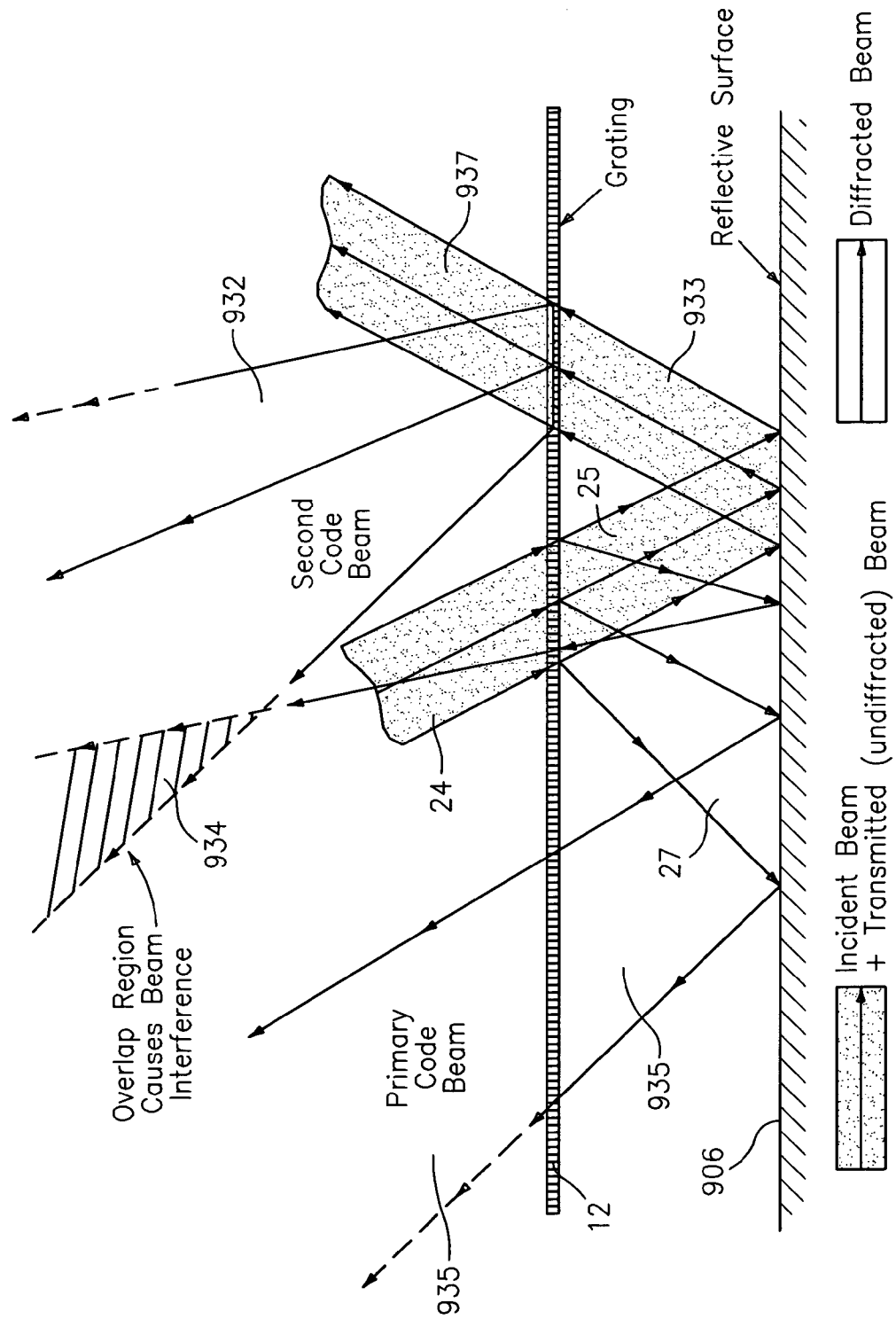

Referring to FIGS. 54-65, when a reflective surface (or layer, coating, backing, or the like) 906 is used under the diffraction grating, various configurations may be used for reading the code. Referring to FIG. 54, in certain configurations, the reflective surface 906 may cause an interference effect between a reflected code beam 935 and a second code beam 932 shown as an overlap area 934. This interference distorts the primary code beam 935 thereby causing a potential error in reading the code.

In particular, the code beam 27 reflects off the reflective surface 906 as a reflected beam 935 which is incident on the back side of the grating 12. A portion of the reflected beam 935 passes straight through the grating 12 as the primary code beam 935. Also, a small portion (not shown) of the reflected beam 935 is diffracted by the grating 12. The beam 25 from the incident beam 24 that passes through the grating 12 is reflected off the reflective surface 906 as a reflected beam 933 which is incident on the back side of the grating 12. A portion of the reflected beam 933 passes straight through the grating 12 as the beam 937 and a small portion of the reflected beam 933 is diffracted by the grating 12 as the second code beam 932. The interference is caused by the intersection of the primary and secondary code beams 935, 932, respectively, cause the interference effect. However, there are several approaches that can minimize or eliminate this effect.

Figure 55:
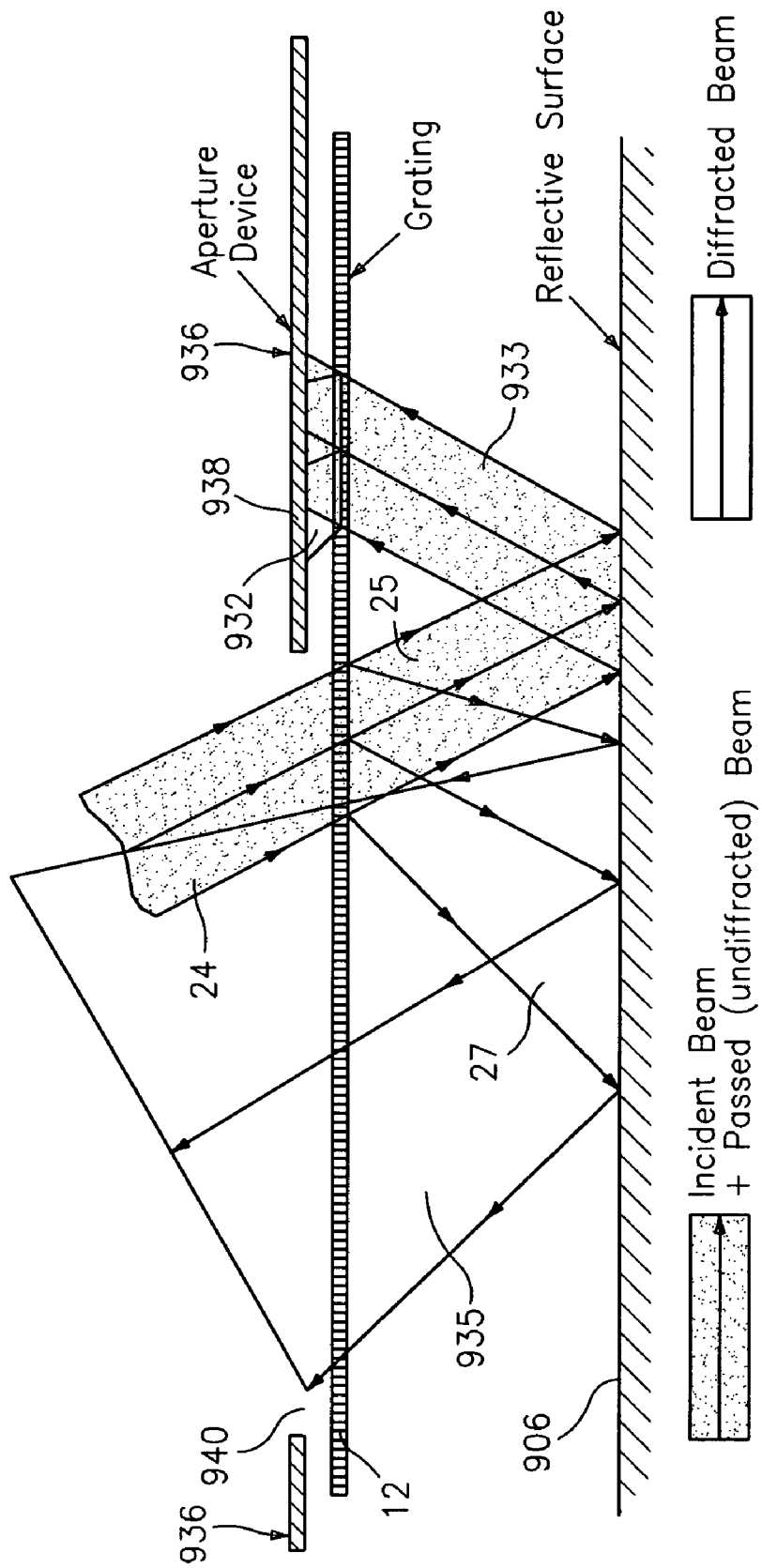

Referring to FIG. 55, one way to minimize or eliminate the interference effect is to put in an aperture device 936 having a blocking section 938 to block the second code beam 932 from interfering with the main code beam 27 and an aperture (or hole) section 940 to allow the incident beam 24 to pass. The aperture 936 may be placed near the element 8. Alternatively, the optical signal at the element 8 may be imaged to another location where the aperture 936 may be placed.

Figure 56:
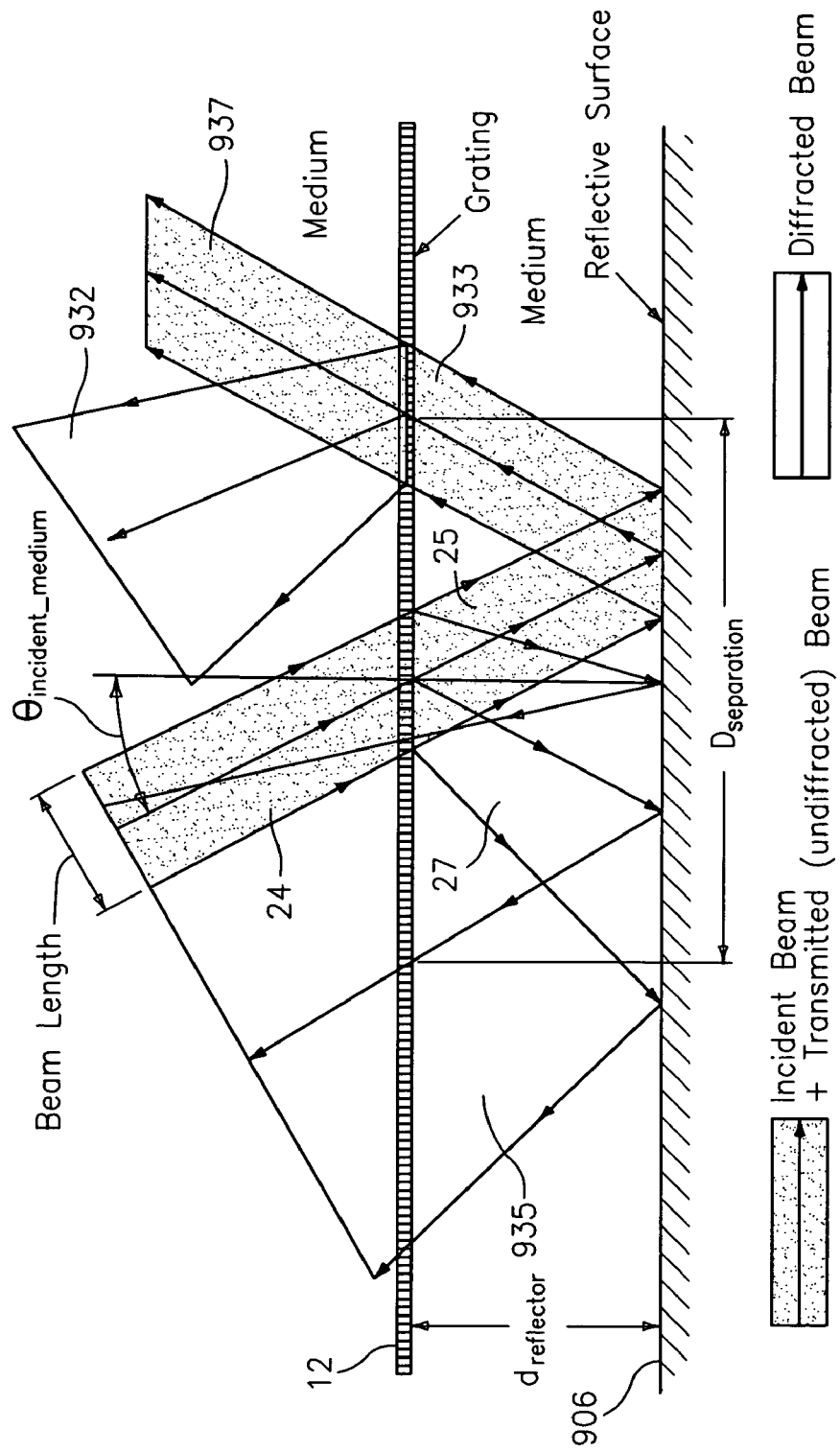

Referring to FIG. 56, alternatively, the spacing or distance (Dseparation) between the diffraction grating 12 and the reflective surface 906 may be made such that the first and second code beams 27,932, respectively, do not interfere. This may be done by making the outer portion 10 of the element 8 large enough or by placing the element 8 far enough away from the reflective surface 906.

The amount and location of overlap (and thus interference) between the primary and secondary beams 935 and 932 may be determined by the distance Dreflector between the grating 12 and the reflective surface 906. If Dreflector is large enough such that the total distance traveled by the passed beam 25 and the reflected beam 933 is greater than about 2 Rayleigh ranges, then the reflected beam 933 has become diverged enough such that the intensity of the second code beam is low enough not to cause significant interference with the primary beam. Thus, in that case, the aperture device 936 is not required. For this "divergent beam" condition to exist the following should be true:

$$Dreflector \gg 1.3 * BeamWidth/4(\sin(\theta incident\_medium)) \quad \text{Eq. 10}$$

where BeamWidth is the $1/e^2$ times the full width of the beam, and $\theta$incident_medium is the angle of the incident beam within the grating 12.

If the distance Dreflector is smaller than the condition set by Eq. 10, some level of interference may occur. In that case, the aperture device 936 discussed hereinbefore may be used, provided the following condition is met:

$$Dbeam\_separation \geq 1.3 * BeamWidth/\cos(\theta incident\_medium)) \quad \text{Eq. 11}$$

where Dbeam_separataion is the distance between the center of the primary and secondary code beams 932,935; and where:

$$D_{beam\_separation} = 4 * D_{reflector} * \tan(\theta_{incident\_medium})  \quad \text{Eq. 12}$$

Therefore, the aperture device 936 can be used when:

$$D_{reflector} \geq 1.3 * BeamWidth/4(\sin(\theta_{incident\_medium})) \quad \text{Eq. 13}$$

Figure 57:
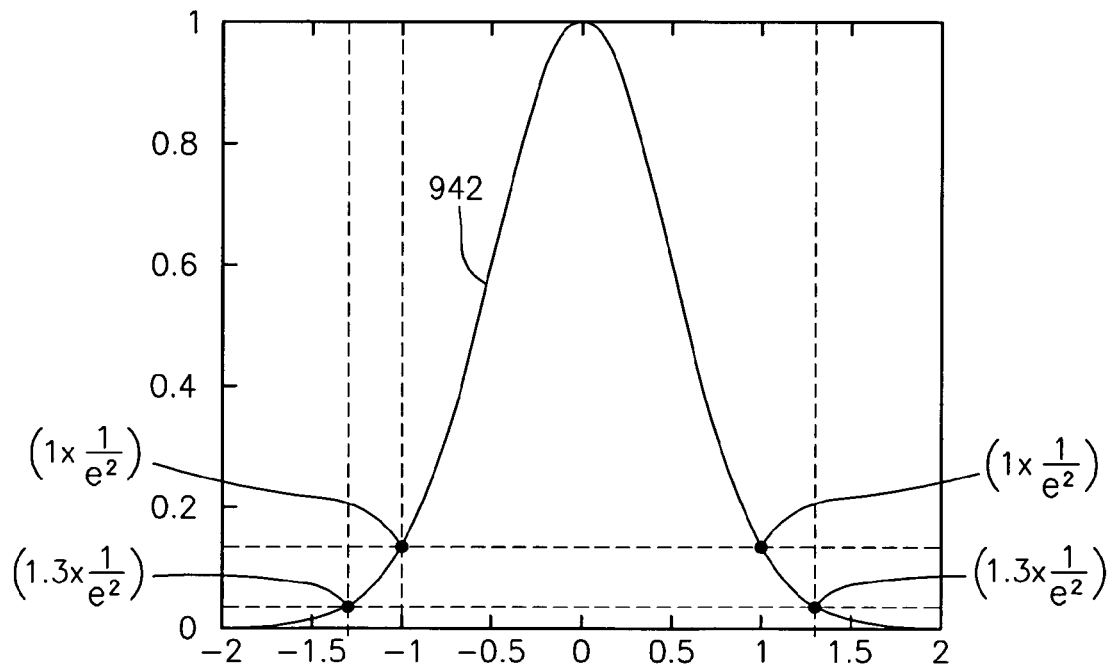

Referring to FIG. 57, a plot 942 of a normalized Gaussian beam having a $1/e^2$ full width of 2 is shown. The factor 1.3 in Eq. 13 is a clearance factor based on the standard minimum aperture hole size used for Gaussian beams in order to minimize aperture effects, such as attenuation, diffraction, beam shape, and the like, in the far field. This shows the decrease in beam power loss when going from a value of 1 to a value of 1.3 for the clearance factor.

Figure 66:
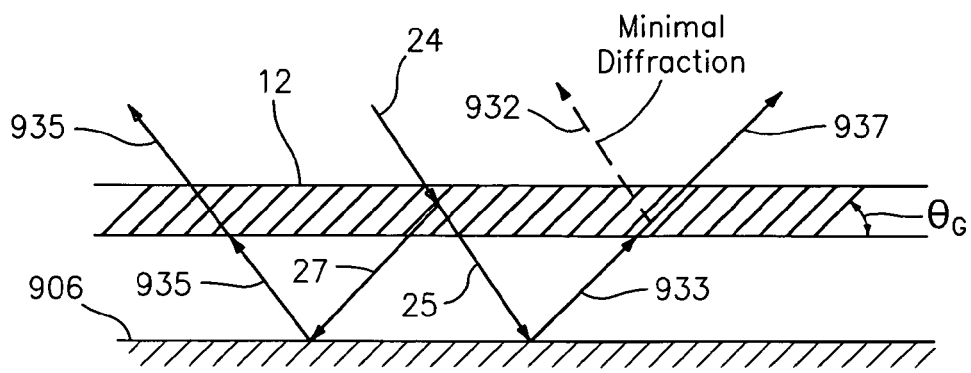

Referring to FIG. 66, alternatively, the grating 12 may be a blazed grating to help avoid the interference between the primary and secondary code beams. Also see FIG. 19 for a description of use of a blazed grating. In particular, the incident beam 24 will diffract off the blazed grating 12 based on the blaze angle $\theta_G$ but the reflected beam 933 does not diffract off the blazed grating as it is more aligned with the blaze angle $\theta_G$ and thus much less diffraction will occur. As a result, the second code beam 932 will have a much lower intensity, resulting in reduced or eliminated interference with the primary code beam 935. It should be understood that in the case of a blazed grating the rotational (or azimuthal) orientation of the grating 12 should be preserved, which may be achieved when the elements 8 are aligned and held in place, such as with a resin or coating or tape as discussed herein.

Figure 58:
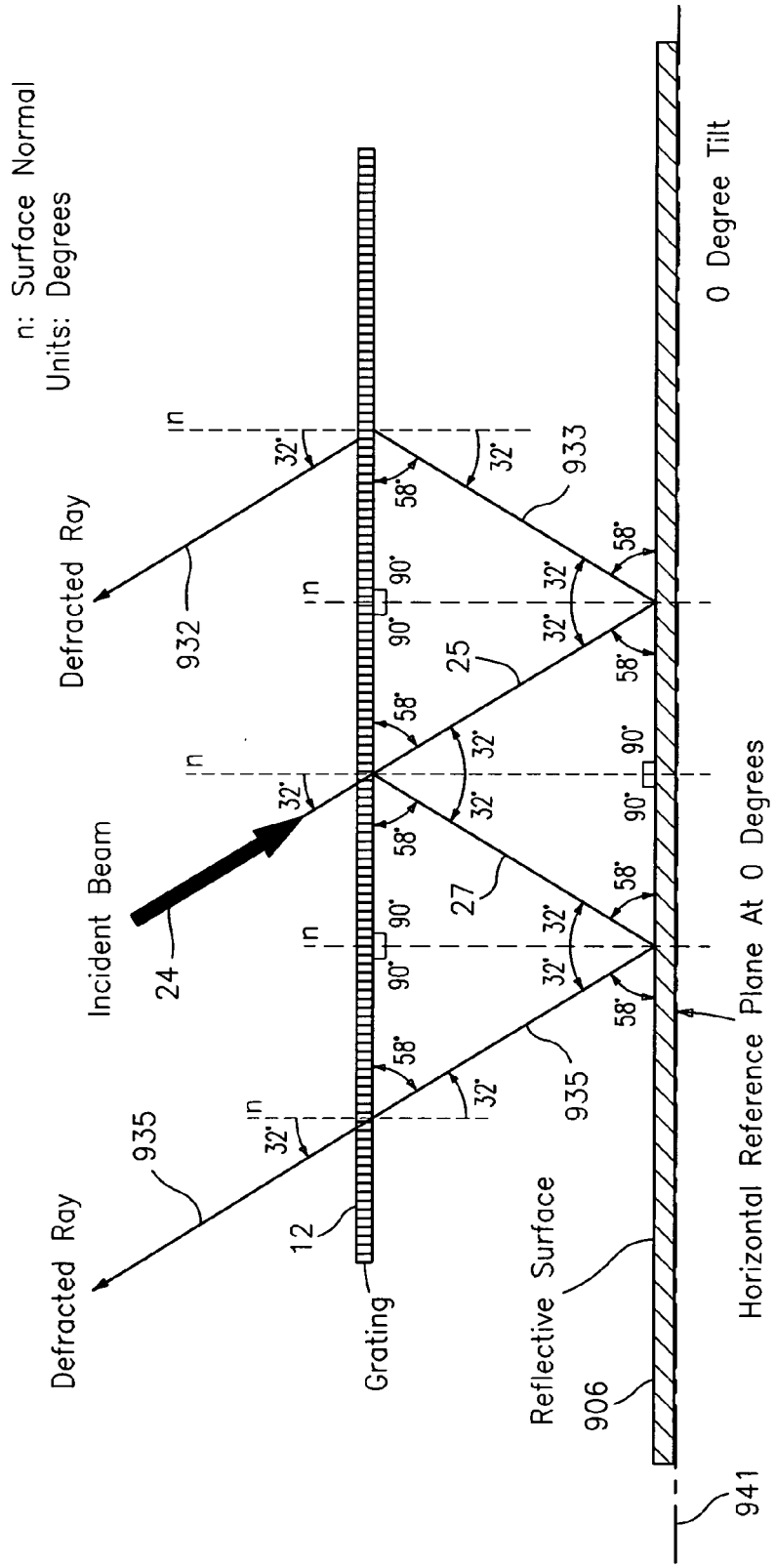
Figure 59:
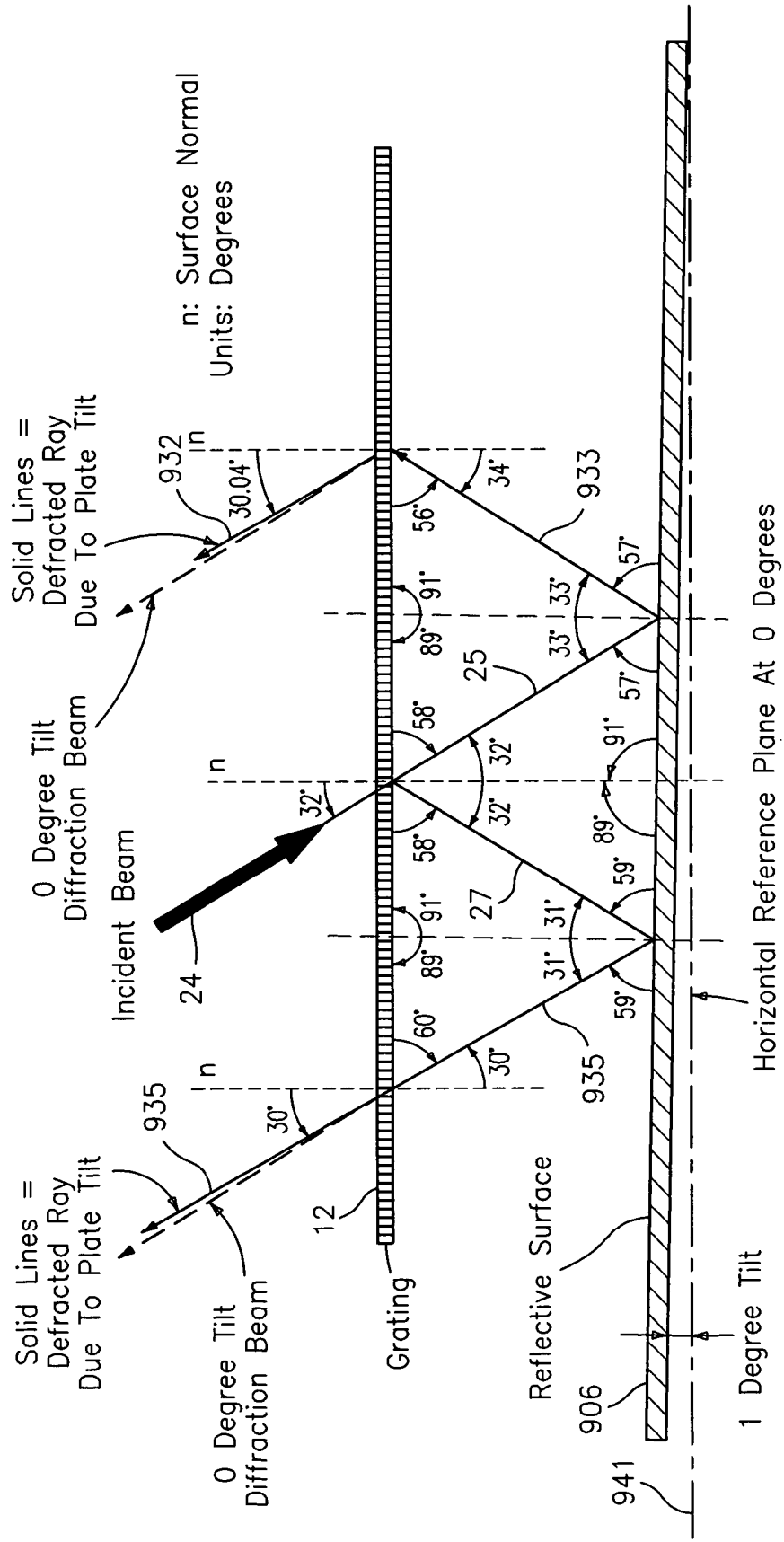
Figure 60:
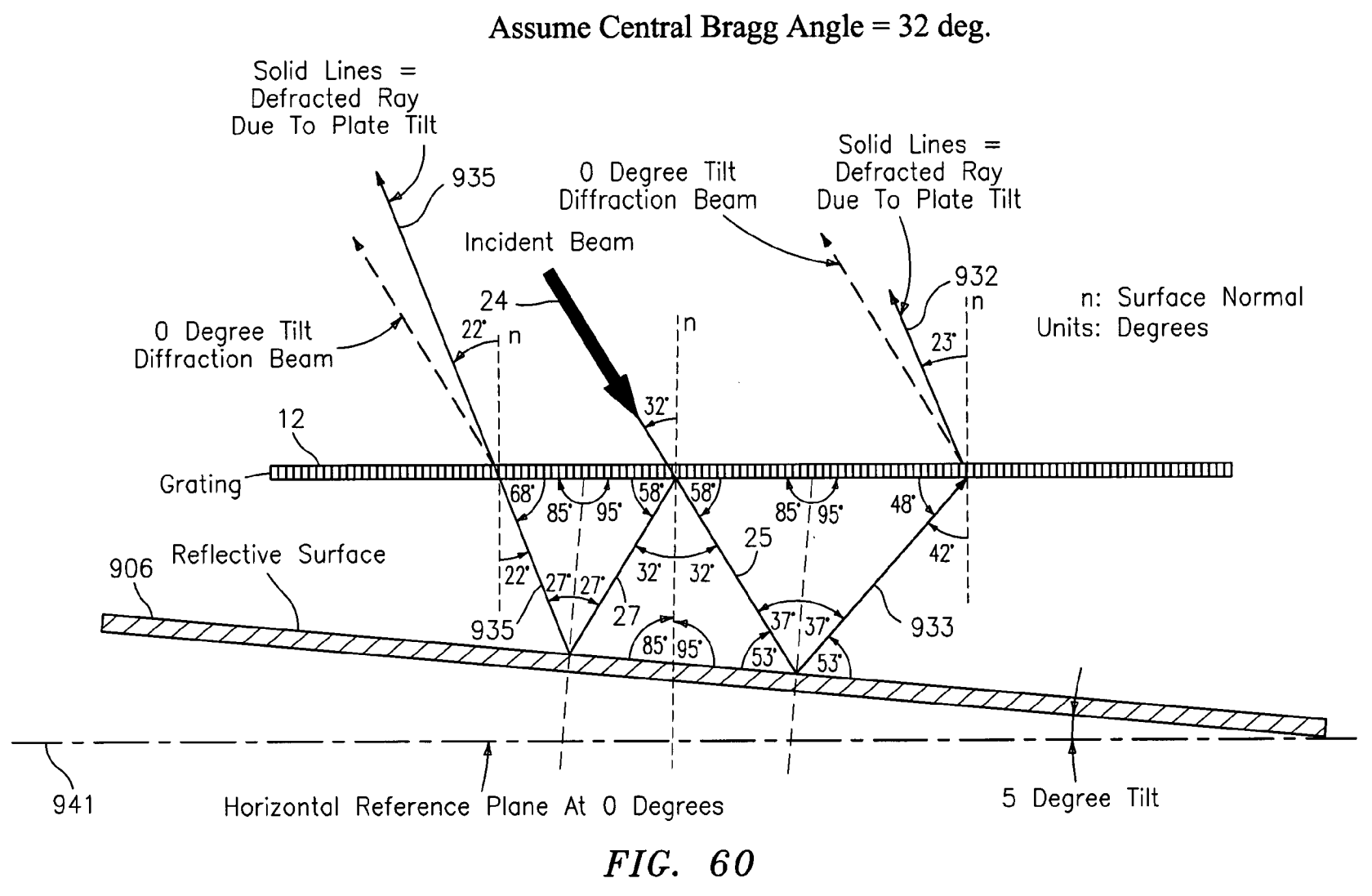

Referring to FIGS. 58,59,60, alternatively, the reflective surface may be tilted relative to a horizontal reference plane 941 to prevent the two code beams from interfering. FIG. 58 shows no tilt (zero degrees) and shows the two code beam angles as the same value of 32 degrees from the normal. Referring to FIG. 59, a 1 degree tilt produces and angle of 30 degrees from the normal fro the primary code beam and 30.04 degrees for the secondary code beam. Referring to FIG. 60, a 5 degree tilt produces an angle of 22 degrees from the normal for the primary code beam and 23 degrees for the secondary code beam. The two code beams will not interfere in the far field if their angles of incidence are sufficiently different and this angle difference is greater than the beam divergence, even if they overlap in space in the near field. For example, in FIG. 59, a 0.04 degree difference with a beam divergence of 0.2 degrees will still interfere in the far field. However, in FIG. 60, a 5 degree difference with a beam divergence of 0.2 degrees will not interfere in the far field even though it may interfere in the near field.

Figure 61:
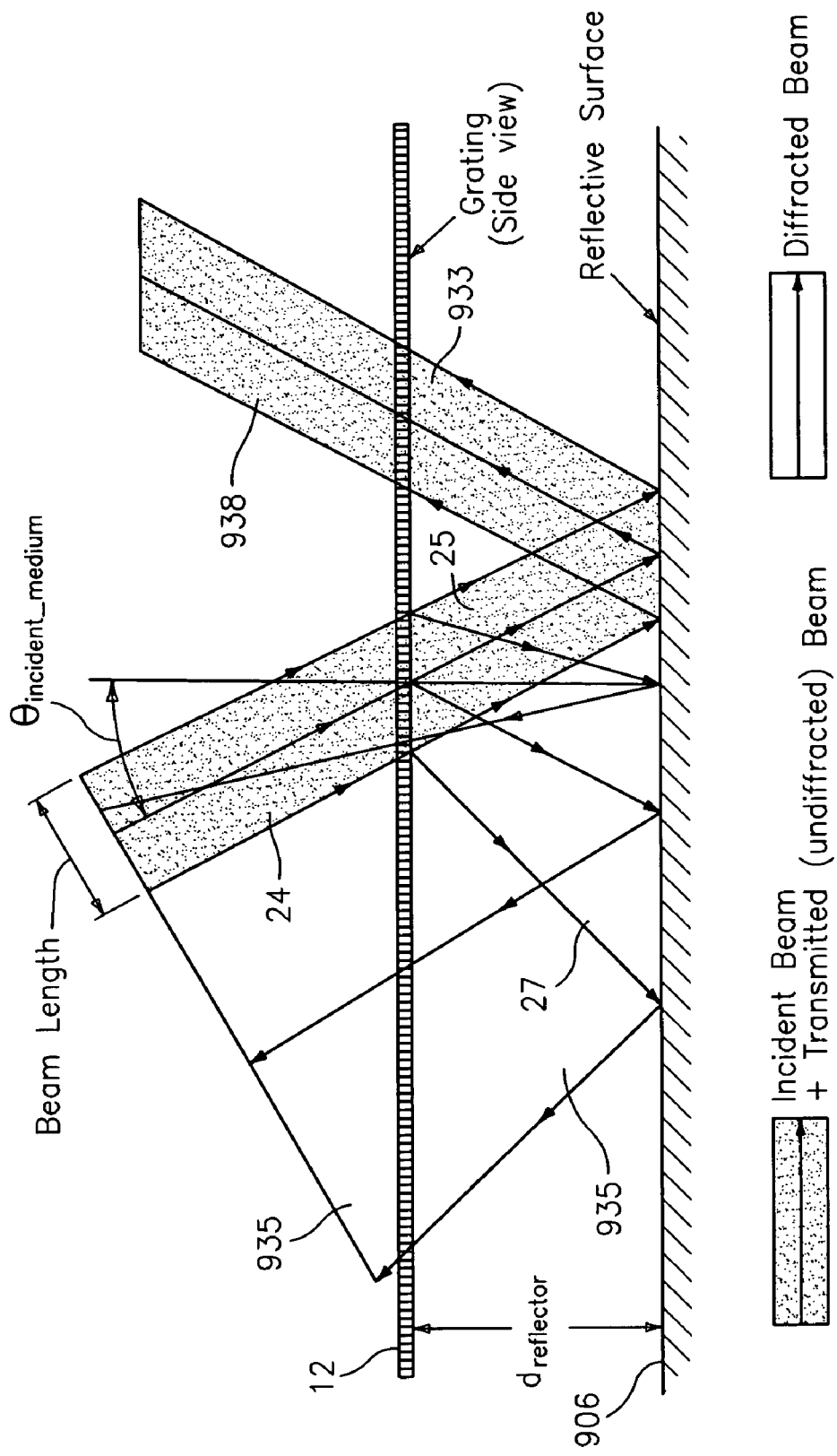
Figure 62:
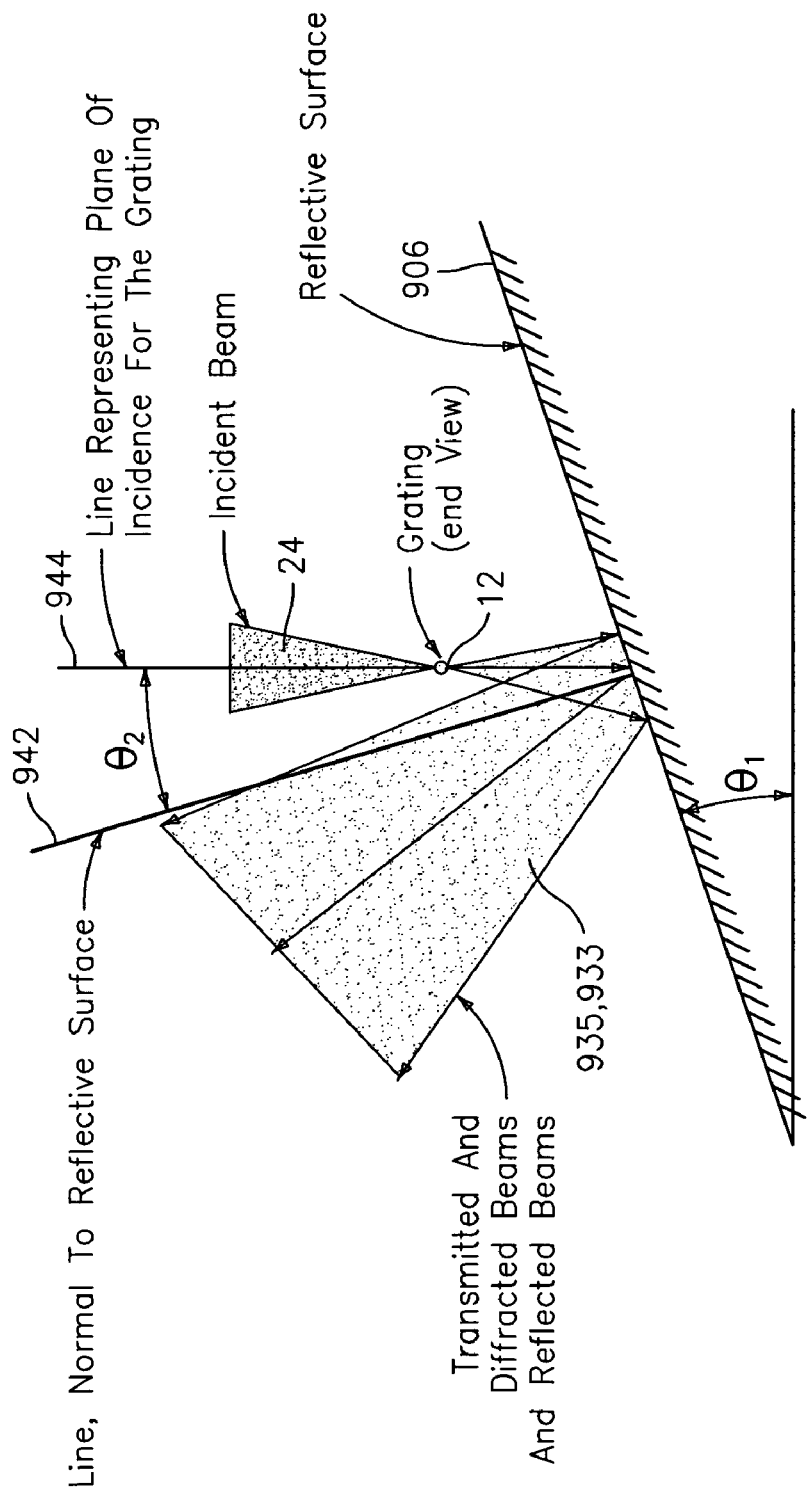

Referring to FIGS. 61,62, alternatively, the reflective surface 906 may be tilted relative to the end view of the element 8 such that the second code beam 932 is never generated. This is accomplished by placing a line normal to the reflective surface out of the plan e of incidence for the grating 12. This occurs because the reflective surface reflects the passed beam away from the grating 12 and allows the incident and reflected beams to pass the grating without re-introducing them to the grating 12. In FIG. 61, consider the plane of the page to be the plane of incidence for the grating 12. The normal to the reflective surface 906 is pointing somewhere out of the plane of the paper, and is not shown in this view.

Figure 63:
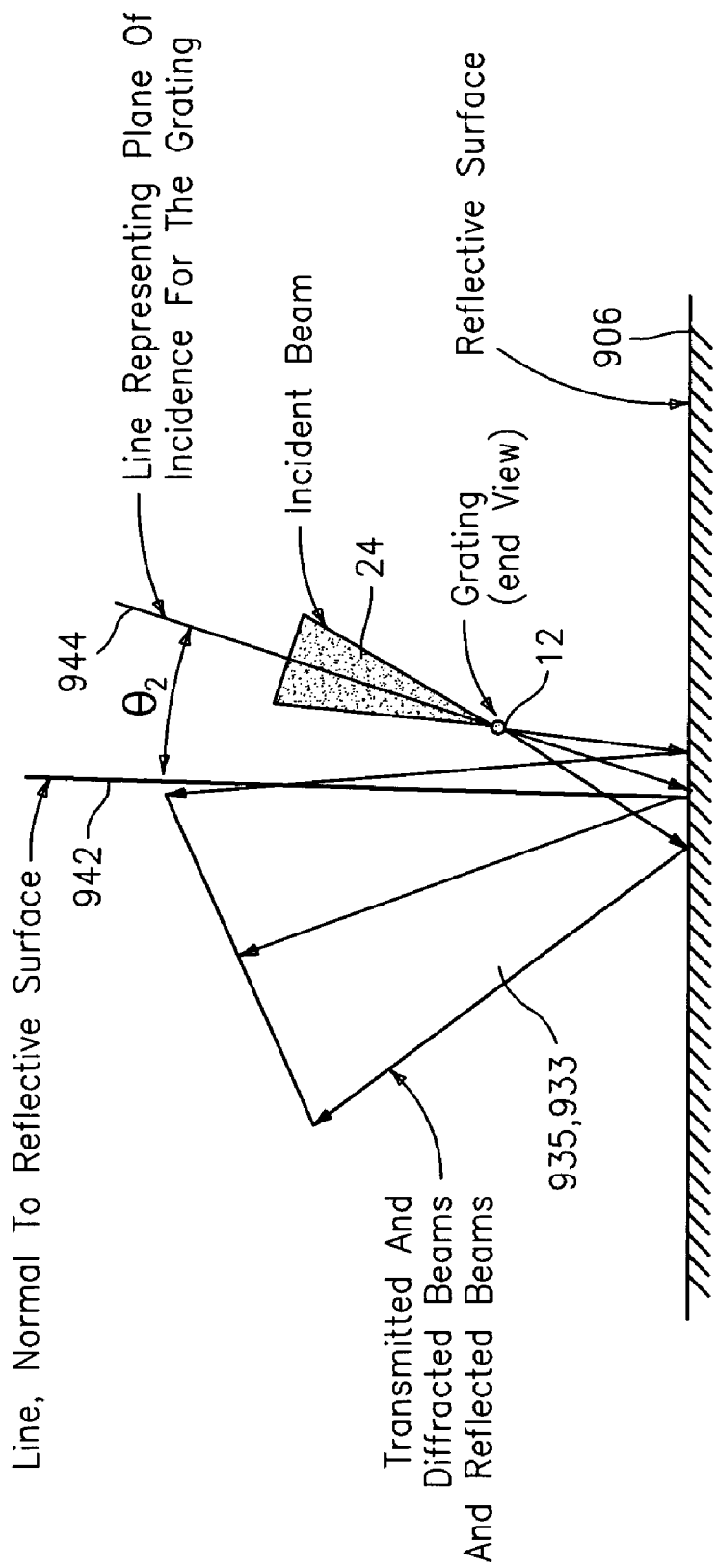

Referring to FIG. 62, the view from the end of the grating 12, the reflective surface 906 is tilted an angle θ1 such that the normal line 942 is tilted away from the plane of incidence 944 by an angle θ2, so that the reflected beams 935 and 933 do not intersect with the grating 12. Accordingly, this avoids the second code beam 932 from being generated and no interference between the two code beams can occur. Referring to FIG. 63, this can also be accomplished by having the out-of-plane angle of the incident beam 24 be tilted an angle θ2 from the line 942 normal to the reflective surface 906.

Figure 64:
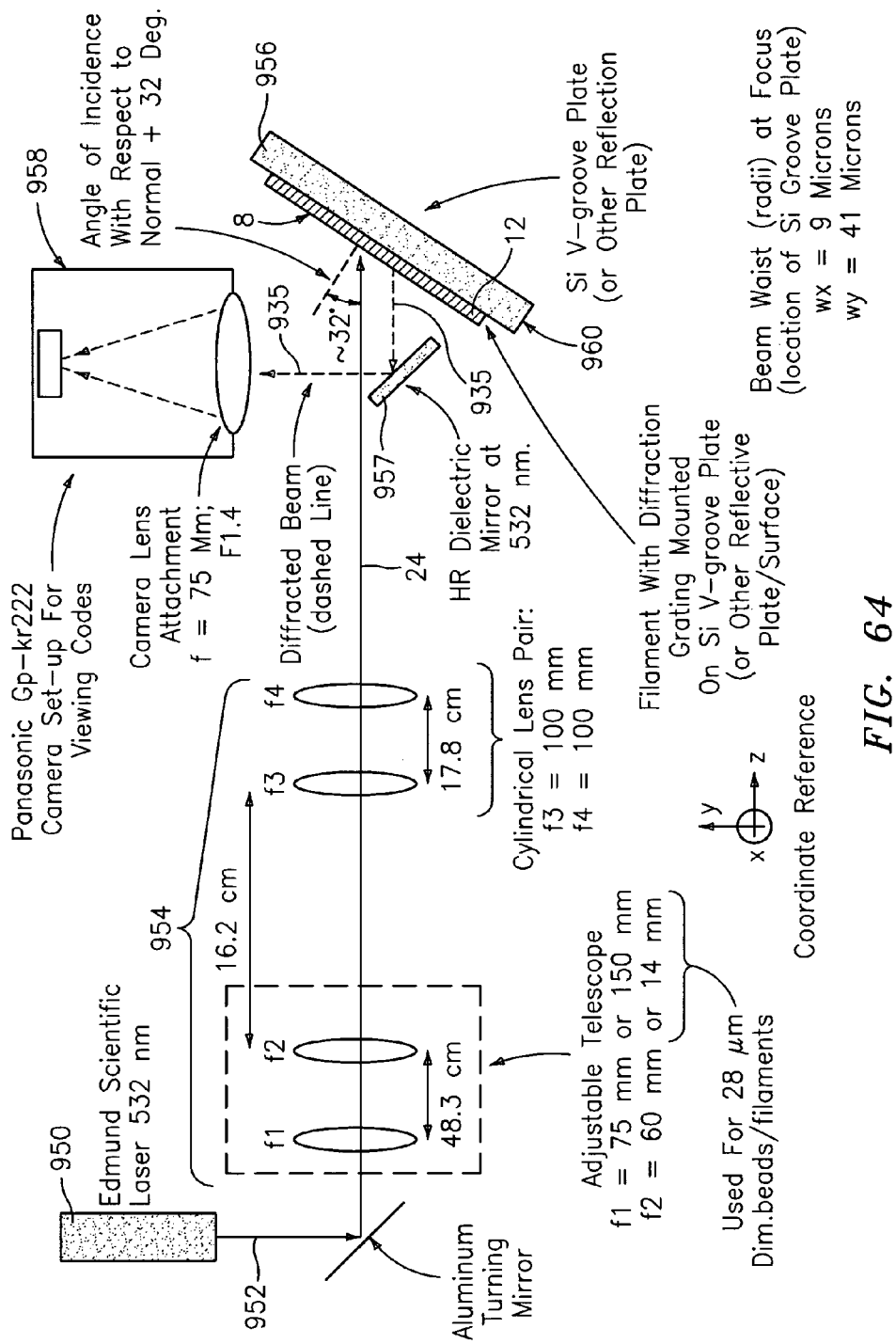
Figure 65:
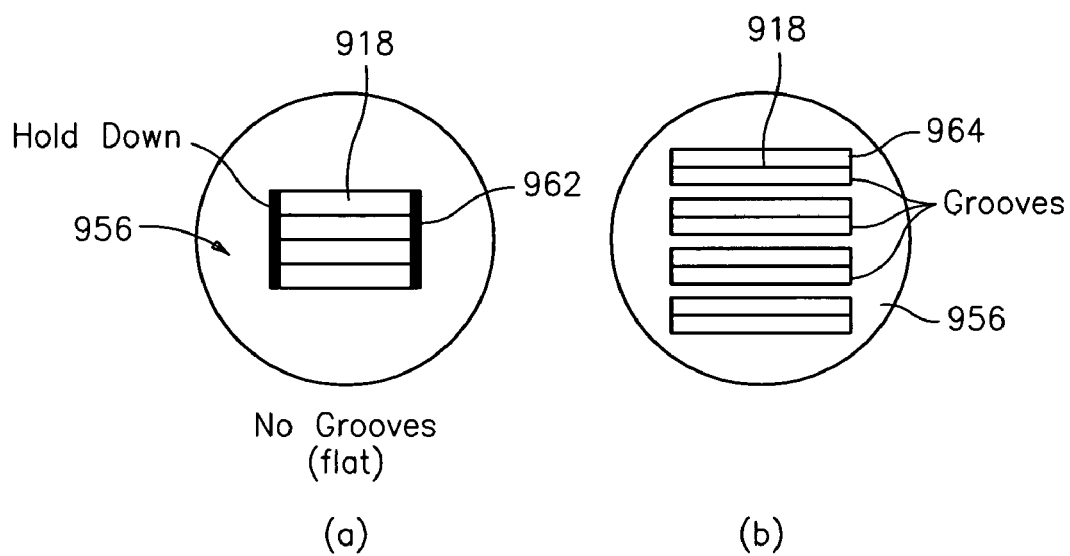

Referring to FIGS. 64 and 65 a set up for reading the code and determining the angle for the reflective surface 906 is shown. In particular, a laser source 950 provides a laser beam 952 through a series of lenses 954 which provides the incident beam 24 to the element 8 which is mounted to a reflective plate 956 (e.g., Si-groove plate or other reflective plate). The code beam 935 emerges from the element 8 and is reflected off a mirror 957 and is incident on a code reader 958. The plate 956 may be able to pivot or tilt about an axis or point 960 to adjust the angle of incident of the incident beam 24. The device for reading the code may be any of those discussed herein or in the referenced copending patent applications or any other reader capable of reading the diffracted optical signal and converting it into a code, such as that described in US patent applications, publication numbers: WO 2004/025559; PCT/US 03/28874 (CV-0038A), WO 2004/024328; PCT/US 03/28862 (CV-0042), WO 2004/066210; PCT/US 04/01685 (CV-0054), and WO 2005/033681; PCT/US 04/032084 (CV-0092), which are all incorporated herein by reference in their entirety. However, any type of reader capable of reading the elements 8 may be used.

Referring to FIG. 65, illustrations (a) and (b), the filaments 918 may be disposed on the reflective plate 956 in various ways. If the plate 956 has no grooves and filaments 918 are used as in illustration (a), the filaments 918 may be attached to the plate with hold downs 962. If the plate 956 has grooves 964, the filaments 918 as in illustration (b), the filaments 918 may be held in place by the grooves and an optional top plate (not shown). In general, the filaments 918 may be glued or taped or attached in any fashion to the reflective plate 956. Also, if the plate 956 lays substantially flat or horizontal, there is no need to secure the filaments or beads in grooves or to the plate 956 for basic interrogation.

In addition, the digital code lends itself naturally to known covert, anti-counterfeit, and/or anti-theft type encoding, authentication, and identification techniques for items. For example, the code may contain an encrypted code that only the manufacturer can read and understand with the proper decryption. Also, a plurality of beads or elements 8 having different codes may be placed in or on a single time and all the codes would have to be read together or in a certain order for them to obtain the intended tracking, identification or authentication information. Alternatively, one of the codes may be a key to de-encrypt the codes on the other beads in the same item. Any other use of a bead combination and/or encryption/decryption techniques may be used if desired.

Some non-limiting examples of digital encryption techniques are described in the following patents, each of which are incorporated herein by reference in their entirety.

| | |
|---|---|
| RE36,752 | Cryptographic authentication of transmitted messages using pseudorandom numbers |
| 5,952,937 | System and method of updating communications in a security system |
| 5,940,002 | Security system with random number remote communication |
| RE36,181 | Pseudorandom number generation and crytographic authentication |
| 5,783,994 | Vehicle security system with combined key fob and keypad anti-driveaway protection |

-continued

| 5,757,923 | Method of generating secret identification numbers |
| 5,696,828 | Random number generating system and process based on chaos |
| 5,649,014 | Pseudorandom composition-based cryptographic authentication process |
| 5,619,575 | Pseudorandom composition-based cryptographic authentication process |
| 5,598,476 | Random clock composition-based cryptographic authentication process and locking system |
| 5,398,284 | Cryptographic encoding process |
| 5,377,270 | Cryptographic authentication of transmitted messages using pseudorandom numbers |
| 5,363,448 | Pseudorandom number generation and cryptographic authentication |

Also see, Numerical Recipes, The Art of Scientific Computing, by William H. Press, et al, Cambridge University Press; 1986; Basic Methods of Cryptography by Jan C. A. van der Lubbe, et al, Cambridge Univ. Press 1998; Applied Cryptography: Protocols, Algorithms, and Source Code in C, by Bruce Schneie, which are incorporated herein by reference in their entirety. Further, as discussed hereinbefore, the code(s) may contain lot or batch numbers, date codes, and/or manufacturer codes. One of the additional security benefits of using encrypted data is that the item manufacturer (e.g., drug company, explosives company, etc) is the only one who knows the meaning of the bead codes, so even the bead code manufacturer will not know what the code represents.

Any of the labeling techniques described herein for labeling items may be used solely with the encoded elements or encoding technique of the present invention or in combination with other labeling, encoding, tracking, identification, authentication, or sorting technology, such as bar codes, RFID, other technologies.

In addition to using the above described techniques with pills or drugs or packages/containers associated therewith, any item being labeled may use these same techniques for identification purposes.

Unless otherwise specifically stated herein, the term "microbead" or "bead" is used herein as a label and does not restrict any embodiment or application of the present invention to certain dimensions, materials and/or geometries and is interchangeable with the term "element" as described generally herein.

The dimensions and geometries for any of the embodiments described herein are merely for illustrative purposes and, as such, any other dimensions may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. An optical identification element for identifying a drug, comprising:
   an optical substrate;
   at least a portion of said substrate having at least one diffraction grating embedded therein or thereon;
   said grating having a resultant refractive index variation at a grating location;
   said grating providing an output optical signal indicative of a code when illuminated by an incident light signal; and
   the element being at least partially disposed on or within said drug; and
   wherein said grating comprises a plurality of gratings having numerous different angular or rotational positions on or within the substrate.

2. The element of claim 1, wherein said refractive index variation comprises at least one refractive index pitch superimposed at said grating location.

3. The element of claim 1, wherein said refractive index variation comprises a plurality of refractive index pitches superimposed at said grating location.

4. The element of claim 1, wherein said code comprises a plurality of bits, each bit having a corresponding spatial location and each bit in said code having a value related to an intensity of said output optical signal at the spatial location of each bit.

5. The element of claim 1 wherein at least a portion of said substrate has a 3-D shape selected from the group: cylinder, sphere, a cube, a pyramid.

6. The element of claim 1 wherein said substrate comprises a particle, filament, thread or bead.

7. The element of claim 1, wherein said drug is a manufactured drug product.

8. The element of claim 7 wherein said manufactured drug product comprises at least one of a pharmaceutical product, a medical product, a health care product, a cosmetics product, a pill, a capsule, a liquid medicine, and a powdered medicine or packages or containers that are supplied therewith.

9. The element of claim 7, wherein the manufactured drug product supports or holds the element in a fixed position.

10. The element of claim 1 wherein said code comprises an encrypted code.

11. The element of claim 1, wherein said substrate comprises one or more of the following: a film, an adhesive film, a shrink wrap film, a label, and a security label.

12. The element of claim 1, wherein said gratings comprise a same code.

13. The element of claim 1, wherein at least two of said gratings intersect each other.

14. The element of claim 1, wherein said plurality of gratings intersect each other at a common central point.

15. An optical identification element for identifying a drug, comprising:
    an optical substrate;
    at least a portion of said substrate being made of a substantially single material and having at least one diffraction grating embedded therein or thereon;
    said grating having a resultant refractive index variation within said single material at a grating location;
    said grating providing an output optical signal indicative of a code when illuminated by an incident light signal propagating in free space; and
    the element being at least partially disposed on or within said drug; and
    wherein said grating comprises a plurality of gratings having a same code written therein at numerous different angular or rotational positions on or within the substrate.

16. A method of reading a code in an optical identification element that is disposed on or within a manufactured drug product, the method comprising:

provide a manufactured drug product having a plurality of optical identification elements disposed therein or thereon, each of said elements including a diffraction grating having a resultant refractive index variation at a grating location indicative of a code, at least two of said elements in or on said manufactured drug product having different orientations so that said gratings are at different angular or rotational positions within or on said manufactured drug product;

illuminating said manufactured drug product with incident light, said grating of at least one element providing an output light signal indicative of the code; and reading said output light signal and detecting the code therefrom.

17. The method of claim 16, wherein said refractive index variation comprises a plurality of refractive index pitches superimposed at said grating location.

18. The method of claim 16 wherein said elements are randomly distributed on or within said manufactured drug product.

19. The method of claim 16 wherein said gratings comprise a same code.

20. The method of claim 16, wherein said code comprises a plurality of bits, each bit having a corresponding spatial location and each bit in said code having a value related to an intensity of said output optical signal at the spatial location of each bit.

21. The method of claim 16, wherein the illuminating said manufactured drug product includes illuminating at least one element with the incident light.

22. The method of claim 16, wherein the manufactured drug product comprises a large pill, a small pill, a capsule, a liquid medicine, or a powdered medicine.

23. A method for labeling a manufactured drug product, comprising:

obtaining an optical identification element having at least one diffraction grating, the grating having a resultant refractive index variation at a grating location;

the grating providing an output optical signal when illuminated by an incident light signal;

the optical output signal being indicative of a code; and disposing the element at least partially on or within the manufactured drug product, wherein said grating is a plurality of gratings having different angular or rotational positions within or on said manufactured drug product.

24. The method of claim 23, wherein the manufactured drug product comprises a large pill, a small pill, a capsule, a liquid medicine, or a powdered medicine.

25. The method of claim 23, wherein said refractive index variation comprises a plurality of refractive index pitches superimposed at said grating location.

26. The method of claim 23, wherein said code comprises a plurality of bits, each bit having a corresponding spatial location and each bit in said code having a value related to an intensity of said output optical signal at the spatial location of each bit.

27. A manufactured drug product comprising:

a membrane that surrounds a medical substance;

at least a portion of said membrane having a diffraction grating embedded therein or thereon;

said grating having a resultant refractive index variation at a grating location; and said grating providing an output optical signal indicative of a code when illuminated by an incident light signal; and wherein said grating comprises a plurality of gratings at numerous different angular or rotational positions on or within the membrane.

28. The drug product of claim 27, wherein said plurality of gratings comprise a same code.

29. The drug product of claim 27, wherein at least two of said gratings intersect each other.

30. The drug product of claim 27, wherein said code comprises a plurality of bits, each bit having a corresponding spatial location and each bit in said code having a value related to an intensity of said output optical signal at the spatial location of each bit.

31. The drug product of claim 27, wherein the code comprises information for identifying or tracking the manufactured drug product.

32. The drug product of claim 27, wherein the medical substance is one of a liquid medicine or a powdered medicine.

33. The drug product of claim 27, wherein the membrane is one of a coating or a casing.

34. The drug product of claim 27, wherein the membrane comprises an outer surface of the manufactured drug product, the gratings being located on said outer surface.

* * * * *

UNITED STATES PATENT AND TRADEMARK OFFICE
CERTIFICATE OF CORRECTION

| | | |
|---|---|---|
| PATENT NO. | : 7,619,819 B2 | Page 1 of 1 |
| APPLICATION NO. | : 11/187262 | |
| DATED | : November 17, 2009 | |
| INVENTOR(S) | : Moon et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 193 days.

Signed and Sealed this

Twenty-sixth Day of October, 2010

David J. Kappos
*Director of the United States Patent and Trademark Office*